United States Patent [19]

Ohara et al.

[11] Patent Number: 5,672,862

[45] Date of Patent: Sep. 30, 1997

[54] OPTICAL APPARATUS HAVING IMAGE SHAKE PREVENTING FUNCTION

[75] Inventors: Toru Ohara; Akihiro Fujiwara; Hidefumi Notagashira; Toshimi Iizuka; Yasuhiro Tamekuni, all of Kanagawa-ken; Yoshiki Kino, Tokyo; Tsuyoshi Morofuji, Kanagawa-ken; Katsumi Azusawa, Saitama-ken; Hidekage Sato, Kanagawa-ken, all of Japan

[73] Assignee: Canon Kabushiki Kaisha, Tokyo, Japan

[21] Appl. No.: 280,470

[22] Filed: Jul. 26, 1994

[30] Foreign Application Priority Data

| Jul. 30, 1993 | [JP] | Japan | 5-190097 |
| Jul. 30, 1993 | [JP] | Japan | 5-190103 |
| Aug. 2, 1993 | [JP] | Japan | 5-208130 |
| Sep. 10, 1993 | [JP] | Japan | 5-225853 |
| Sep. 16, 1993 | [JP] | Japan | 5-230255 |
| Dec. 21, 1993 | [JP] | Japan | 5-322038 |
| Dec. 27, 1993 | [JP] | Japan | 5-333579 |
| Dec. 27, 1993 | [JP] | Japan | 5-333580 |
| Dec. 27, 1993 | [JP] | Japan | 5-333581 |
| Dec. 27, 1993 | [JP] | Japan | 5-333582 |
| Dec. 28, 1993 | [JP] | Japan | 5-337247 |

[51] Int. Cl.[6] .................. G02B 23/00; G02B 27/64
[52] U.S. Cl. .................. 250/204; 250/216; 359/554; 359/556; 359/557
[58] Field of Search .................. 250/216, 201.7, 250/201.2, 201.1, 204; 354/70; 359/407, 410, 557, 556, 555, 554; 396/52, 54, 55

[56] References Cited

U.S. PATENT DOCUMENTS

| 4,235,506 | 11/1980 | Saito | 359/556 |
| 4,720,805 | 1/1988 | Vye | 364/525 |
| 4,945,417 | 7/1990 | Elberbaum | 358/210 |
| 5,039,211 | 8/1991 | Maruyama | 359/557 |
| 5,095,198 | 3/1992 | Nakazawa et al. | 250/201.8 |
| 5,101,230 | 3/1992 | Shikaumi et al. | 354/430 |
| 5,121,978 | 6/1992 | Maruyama | 359/557 |
| 5,140,462 | 8/1992 | Kitagishi | 359/554 |
| 5,166,722 | 11/1992 | Kusaka | 354/408 |
| 5,198,856 | 3/1993 | Odaka et al. | 354/430 |
| 5,280,387 | 1/1994 | Maruyama | 359/554 |

FOREIGN PATENT DOCUMENTS

| 2215568 | 9/1989 | United Kingdom | H04N 7/14 |
| 02287 | 2/1991 | WIPO | G03B 29/00 |

*Primary Examiner*—Edward P. Westin
*Assistant Examiner*—John R. Lee
*Attorney, Agent, or Firm*—Robin, Blecker, Daley & Driscoll

[57] ABSTRACT

An optical apparatus or a control device to be used for a light flux deflecting apparatus is arranged to include at least two light flux deflecting portions and a control portion which control the driving actions of the at least two light flux deflecting portions in such a manner that, with the light flux deflecting portions applied as image shake preventing mechanisms to an optical apparatus using a plurality of light fluxes, such as a binocular, the arrangement effectively prevents such inconveniences as the necessity of using a plurality of control portions in controlling each of the light flux deflecting portions and giving a disagreeable feeling to the user due to a discrepancy arising in the amount of deflection between two light fluxes.

19 Claims, 48 Drawing Sheets

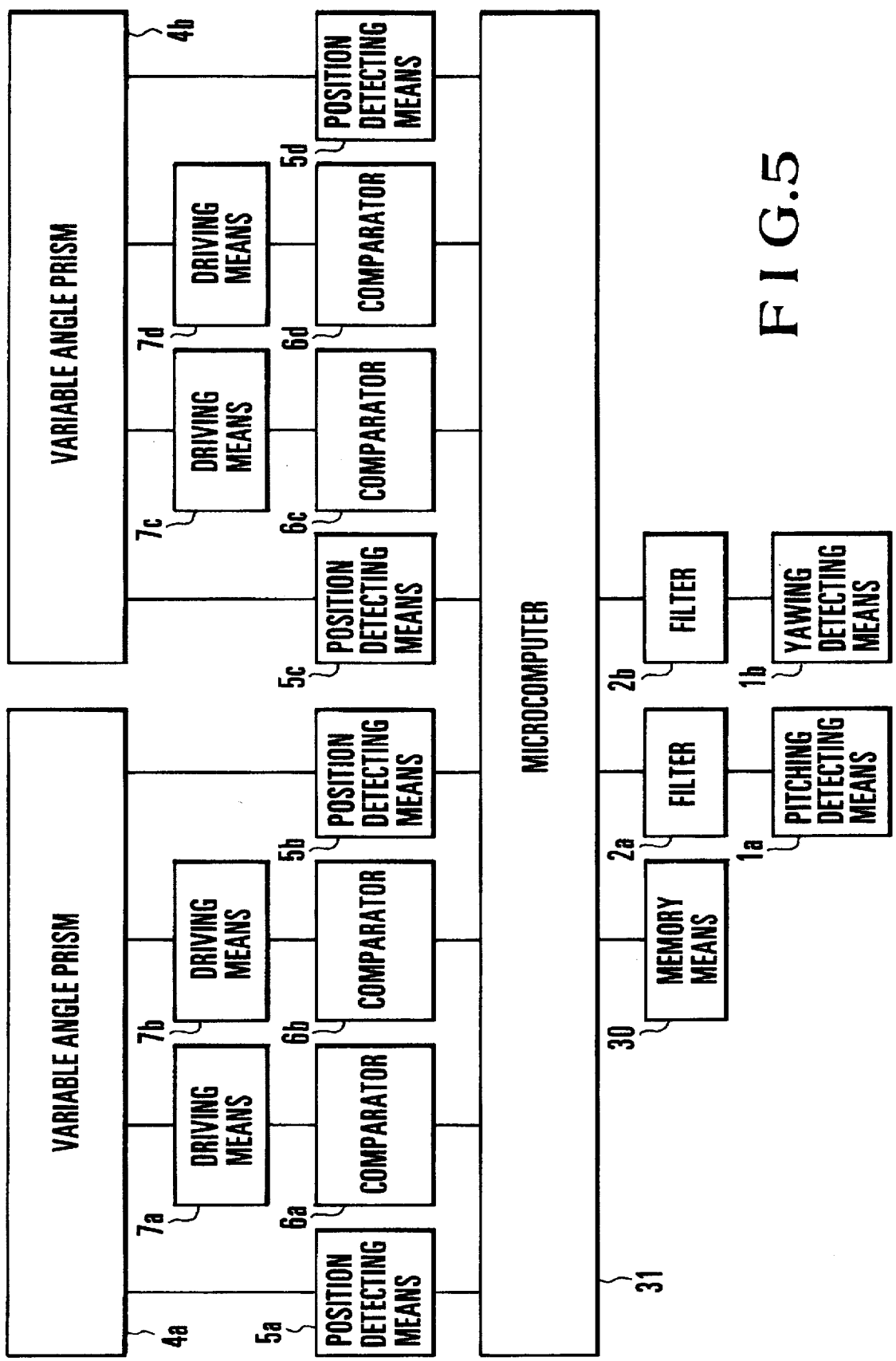
F I G. 5

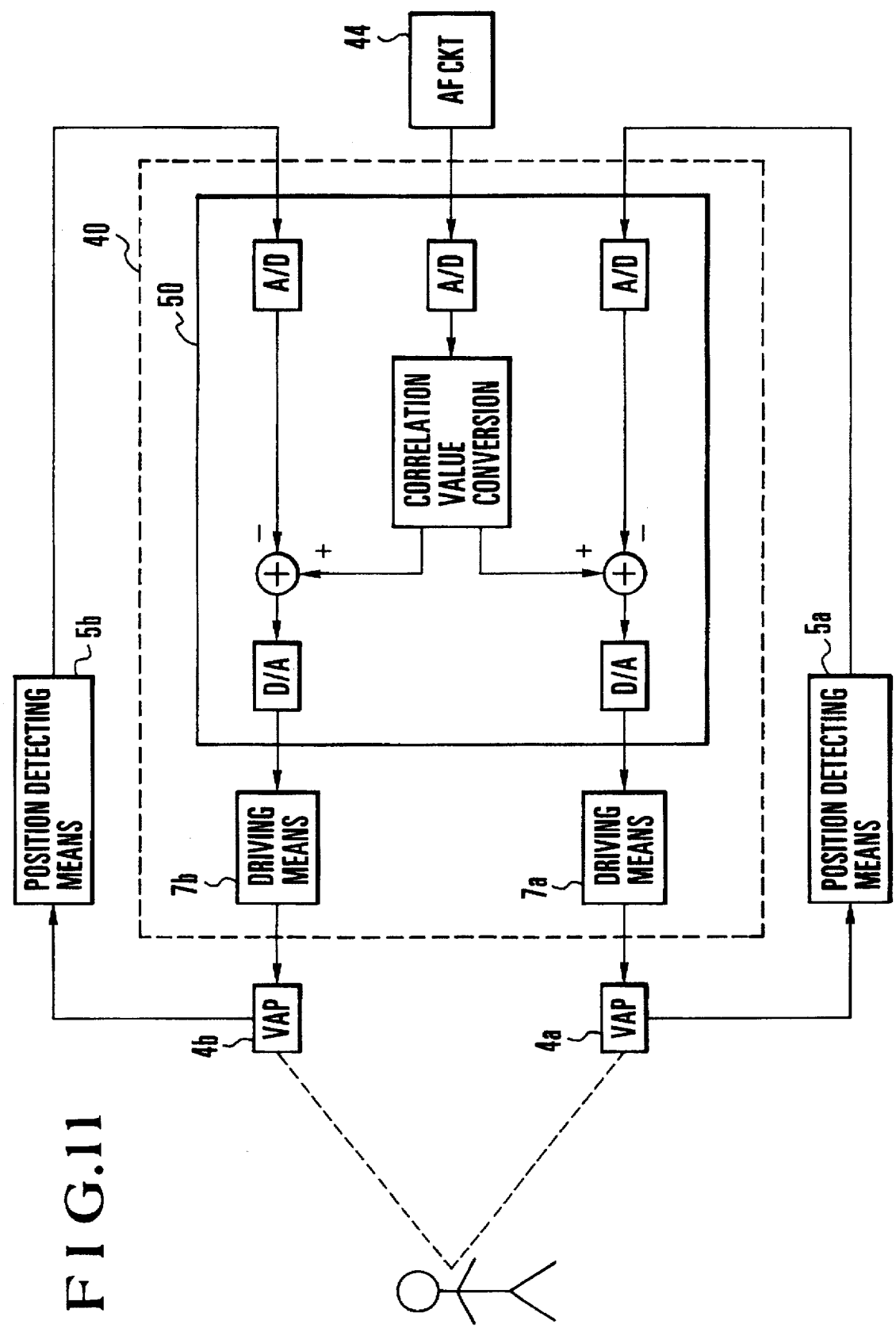
F I G. 11

FIG.37
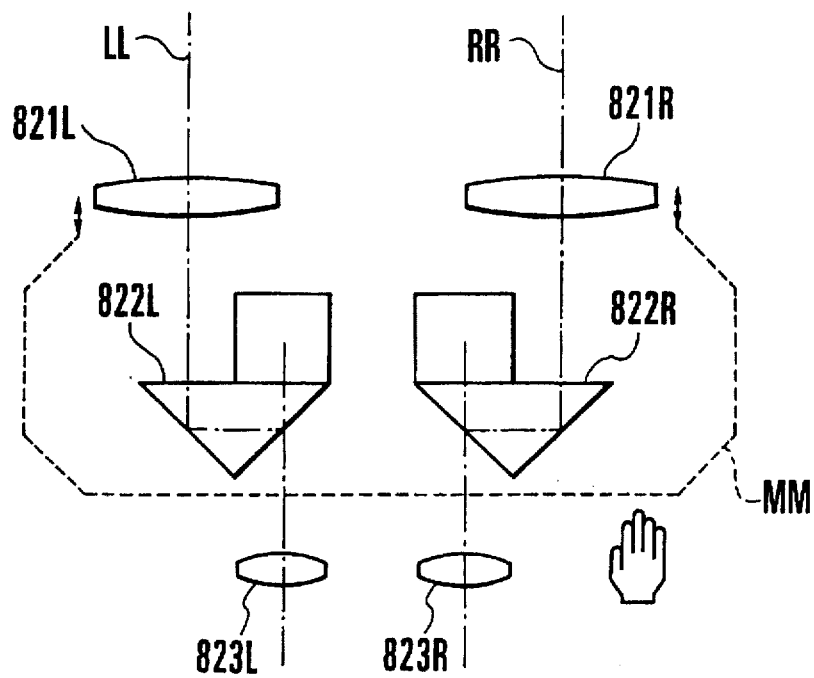
FIG. 38A
FIG. 38C
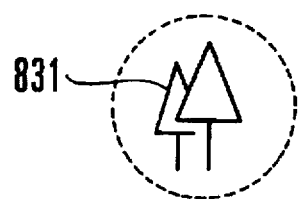
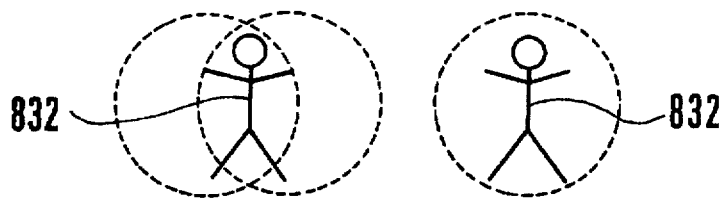
FIG. 38B

OPTICAL APPARATUS HAVING IMAGE SHAKE PREVENTING FUNCTION

BACKGROUND OF THE INVENTION

1. Field of the Invention

This invention relates to an optical apparatus having a function of preventing image shake by optically correcting the image shake.

2. Description of the Related Art

Image shake correcting devices heretofore used for optical apparatuses such as binoculars, etc., include, among others, (i) a product of Carl Zeiss Stiftung wherein an inertia force is used for a shake detecting system, which is coupled with a shake correcting system consisting of an optical lens through a special supporting mechanism called a cardan shaft, and the shake is attenuated in a passive manner; and (ii) a product of FUJI SYASHIN KOKI Co., wherein a free gyro which is arranged to rotate at a high speed is used for a shake detecting system, the free gyro is coupled, into one body, with a shake correcting system consisting of two right and left prisms, and the shake is stabilized through an external gimbal.

Other optical image shake correcting devices which are adapted for apparatuses other than binoculars include, for example, an image shake correcting device wherein a miniature acceleration sensor is used for a shake detecting system, a variable angle prism which is a sort of liquid prism is used for a shake correction system, a shake correction amount is computed and obtained by a microcomputer from information on the result of shake detection, an optical axis is forcibly refracted to a direction opposite to the direction of the shake by deforming the variable angle prism, in such a way as to stabilize the image forming point of the apparatus. The image shake correcting devices of this kind have already been actually applied to video cameras.

FIG. 48 shows the basic control arrangement of the image shake correcting device which uses a variable angle prism (hereinafter referred to as a VAP) and is included in the conventional video camera mentioned above. Referring to FIG. 48, the device includes pitching detecting means 1101a and yawing detecting means 1101b which are miniature gyros or the like and are arranged to detect respectively the pitching and yawing of the whole video camera. The detecting means 1101a and 1101b are disposed in the neighborhood of an image pickup optical system. Filters 1102a and 1102b are arranged to extract only such a frequency band that is generated by shaking of the video camera from the frequency components of signals outputted from the pitching and yawing detecting means 1101a and 1101b. Computing means 1103, such as a microcomputer, is arranged to detect the frequencies of pitching and yawing detection signals which pass through the filters 1102a and 1102b and to obtain shake correction amounts suited for the states of these signals. A VAP 1104 which is employed as shake correcting means consists of, for example, a high refractive index liquid 1201 and glass plates 1202a and 1202b and bellows parts 1203a and 1203b which are arranged to confine the liquid 1201 within a space defined jointly by them as shown in FIG. 49.

Position detecting means 1105a is arranged to detect the vertical movement of the VAP 1104 and position detecting means 1105b to detect the horizontal movement of the VAP 1104. For example, PSD sensors or the like are employed as the position detecting means. A pitching correction comparator 1106a is arranged to compare the output signal of the VAP vertical position detecting means 1105a with a pitching correction signal coming from the computing means 1103. A yawing correction comparator 1106b is likewise arranged. Each of these comparators 1106a and 1106b is composed of an operational amplifier. Each of driving means 1107a and 1107b consists of a driving circuit and an actuator which is an electromagnetic coil or the like. The driving means 1107a and 1107b are controlled in such a way as to keep the image forming point of the optical axis to be unvarying against shaking by moving the VAP 1104 on the basis of the shake correction outputs of the comparators 1106a and 1106b.

FIG. 50 shows the VAP 1104 as in a state of having been incorporated in a lens barrel. The drawing includes an image pickup lens 1301, an electromagnetic coil 1302 and a front protection glass plate 1303.

As described above, the image shake correcting device which has conventionally been used for a binocular necessitates use of a complex and large-scale arrangement as shake correcting means, including such mechanical parts as the cardan shaft, the gimbal frame, etc. Therefore, the image shake correcting device has been not only expensive but also difficult to arrange it in a compact size. Further, in case where the image shake correcting device of the kind using a VAP is applied to a binocular, the visual line chiasm adjustment of a stereoscopic image pickup device necessitates large-scale work in rearranging two cameras according to any change in object distance.

SUMMARY OF THE INVENTION

One aspect of this invention lies in the provision of a control device which is adapted for an optical apparatus or for a light flux deflecting device. The control device has at least two light flux deflecting portions for deflecting mutually different light fluxes and a control portion for controlling driving of each of at least two light flux deflecting portions. With the control portion thus arranged, such inconveniences that arise in the case where the light flux deflecting portions are applied to an optical apparatus using a plurality of light fluxes, such as a difference in the amount of deflection between two light fluxes, etc., can be effectively prevented by the arrangement.

Another aspect of this invention lies in that the above-stated control portion is arranged to make the driving states of at least two light flux deflecting portions substantially equal to each other.

A further aspect of this invention lies in that the control portion is arranged to cause the power of one and the same power source to be supplied to at least two light flux deflecting portions. The arrangement obviates the necessity of having an additional power source, so that the apparatus can be compactly arranged.

A still further aspect of this invention lies in that the above-stated control portion is provided with means for removing any adverse influence that might be produced over one of at least two light flux deflecting portions as a result of occurrence of a relative displacement between the light flux deflecting device or a part of the optical apparatus and one of the light flux deflecting portions. The provision of the removing means effectively prevents any erroneous action of the one of the light flux deflecting portions from being caused by the relative displacement.

The above and other aspects and features of this invention will become apparent from the following detailed description of embodiments thereof taken in conjunction with the accompanying drawings.

BRIEF DESCRIPTION OF THE DRAWINGS

FIG. 5 is a block diagram showing the basic arrangement of a second embodiment of this invention.

FIG. 11 is a block diagram showing the circuit arrangement of the fourth embodiment of this invention.

FIG. 37 is a schematic diagram showing the optical arrangement of the conventional binocular.

FIGS. 38A-38C show the visual field of a binocular.

DETAILED DESCRIPTION OF THE PREFERRED EMBODIMENTS

The embodiments of this invention which are obtained by applying this invention to image stabilizing type binoculars are described below with reference to the accompanying drawings:

(First Embodiment)

Figure 1:
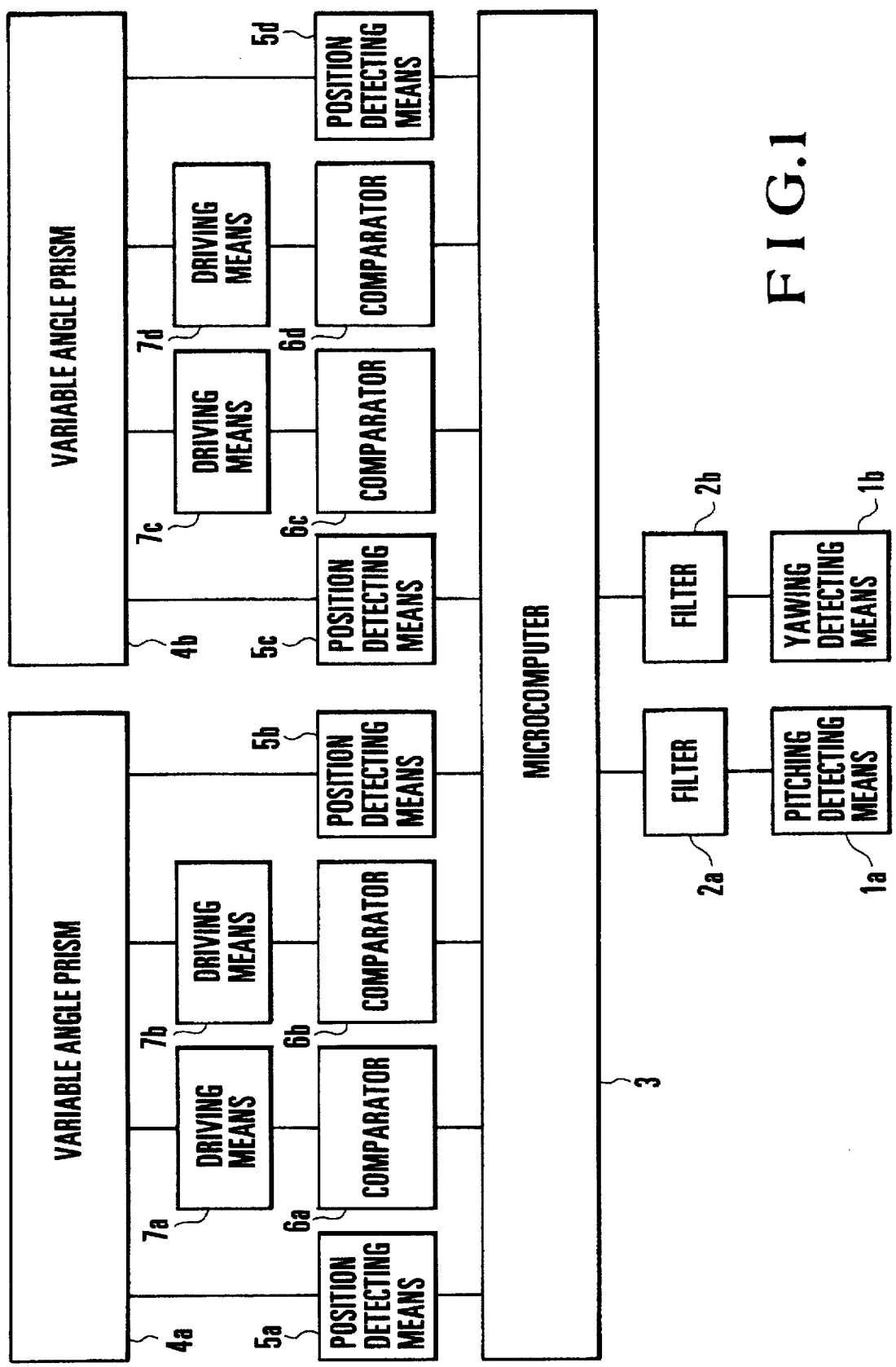
FIG. 1 is a block diagram showing the basic arrangement of a first embodiment of this invention.

FIG. 1 shows the basic control arrangement of a first embodiment of this invention. Referring to FIG. 1, miniature vibrating gyros 1a and 1b are a sort of angular velocity sensors using the theory of Coriolis. The gyro 1a is provided for detecting the pitching of the whole binocular and the gyro 1b for detecting the yawing of the whole binocular. Band-pass filters 2a and 2b are arranged to pass only a frequency band, from 0.5 Hz to 20 Hz, which is attributable to shaking of the binocular among the frequency components of signal outputs of the miniature gyros 1a and 1b which detect the pitching and yawing.

A microcomputer 3 is arranged to compute the amounts of changes taking place in an optical axis. Each of shake detection signals obtained through the filters 2a and 2b is taken in through an A/D (analog-to-digital) converter disposed within the microcomputer 3. The shake detection signal thus obtained is integrated and computed to convert the signal which is an angular velocity signal into an angular displacement signal. The frequency of the shake detection signal is detected and the amount of change of the optical axis is computed according to the current state of the frequency. Information on the amount of change of the optical axis thus computed is outputted through a D/A (digital-to-analog) converter disposed within the microcomputer 3.

Figure 4:
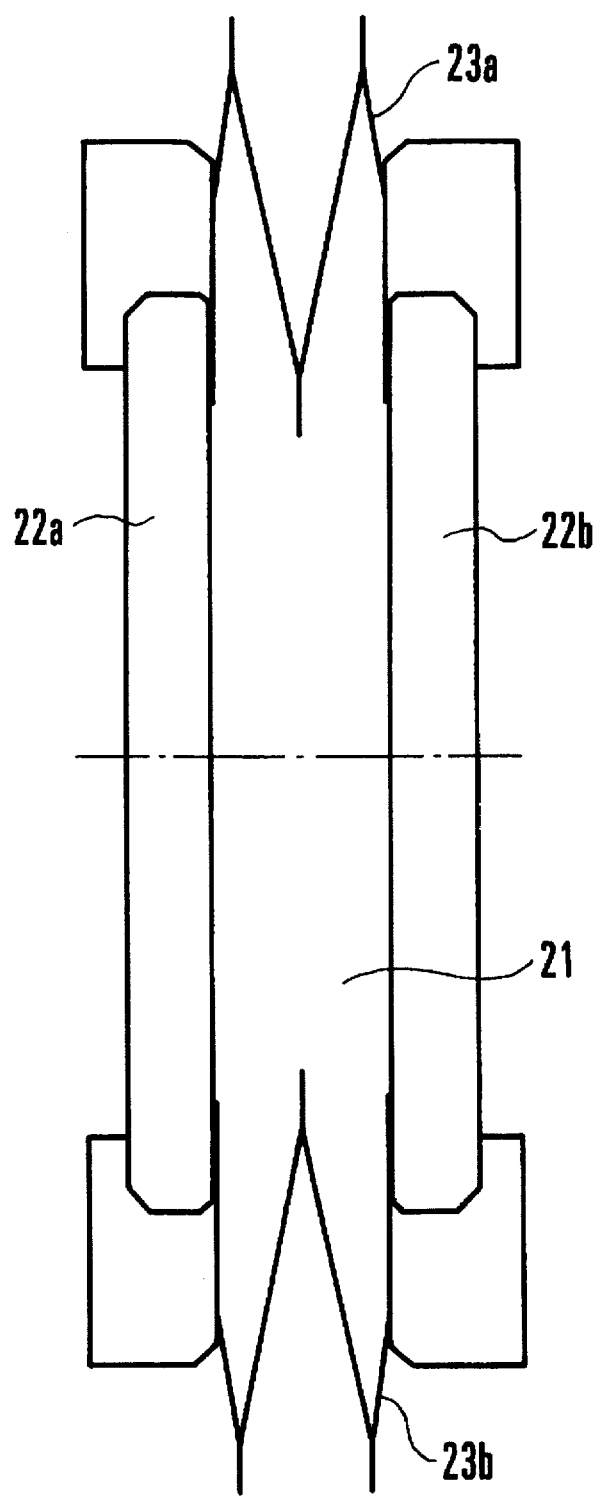
FIG. 4 shows in outline a variable angle prism.

A VAP element (variable angle prism) 4a is arranged to be means for changing the optical axis of the left eye of the operator. Another VAP element 4b is arranged to be means for changing the optical axis of the right eye of the operator. Each of these VAP elements 4a and 4b is arranged as shown in FIG. 4. As shown, the VAP is composed of a liquid 21 which is of a high refractive index and glass plates 22a and 22b and bellows parts 23a and 23b which are arranged to confine the high refractive index liquid 21 within a space jointly defined by them.

Each of the above-stated optical axes is changeable by varying the balance between the two glass plates 22a and 22b (their tilting angles).

Position detecting means 5a is arranged to detect the vertical movement of the VAP element 4a for the left eye. Position detecting element 5b is arranged to detect the horizontal movement of the left eye VAP element 4a. Position detecting element 5c is arranged to detect the vertical movement of the right eye VAP element 4b. Position detecting element 5d is arranged to detect the horizontal movement of the VAP element 4b. In the case of this embodiment, each of these detecting means is composed of an infrared emitting diode and a PSD sensor.

A comparator 6a is arranged to compare the signal output of the detecting means 5a for detecting the vertical position of the VAP element 4a with a left eye ordinate control signal from the microcomputer 3 which is computing means. A comparator 6b is arranged to compare the signal output of the detecting means 5b for detecting the horizontal position of the VAP element 4a with a left eye abscissa control signal from the microcomputer 3. A comparator 6c is arranged to compare the signal output of the detecting means 5c for detecting the vertical position of the VAP element 4b with a right eye ordinate control signal from the microcomputer 3. A comparator 6d is arranged to compare the signal output of the detecting means 5d for detecting the horizontal position of the VAP element 4b with a right eye abscissa control signal coming from the microcomputer 3. Each of these comparators 6a, 6b, 6c and 6d is composed of an operational amplifier.

Driving means 7a, 7b, 7c and 7d are arranged to receive optical axis varying control signals outputted from the comparators 6a, 6b, 6c and 6d, respectively, and to move the left and right VAP elements 4a and 4b as necessary according to these optical axis varying control signals. Each of the driving means 7a, 7b, 7c and 7d consists of an actuator and an electromagnetic coil.

Figure 2:
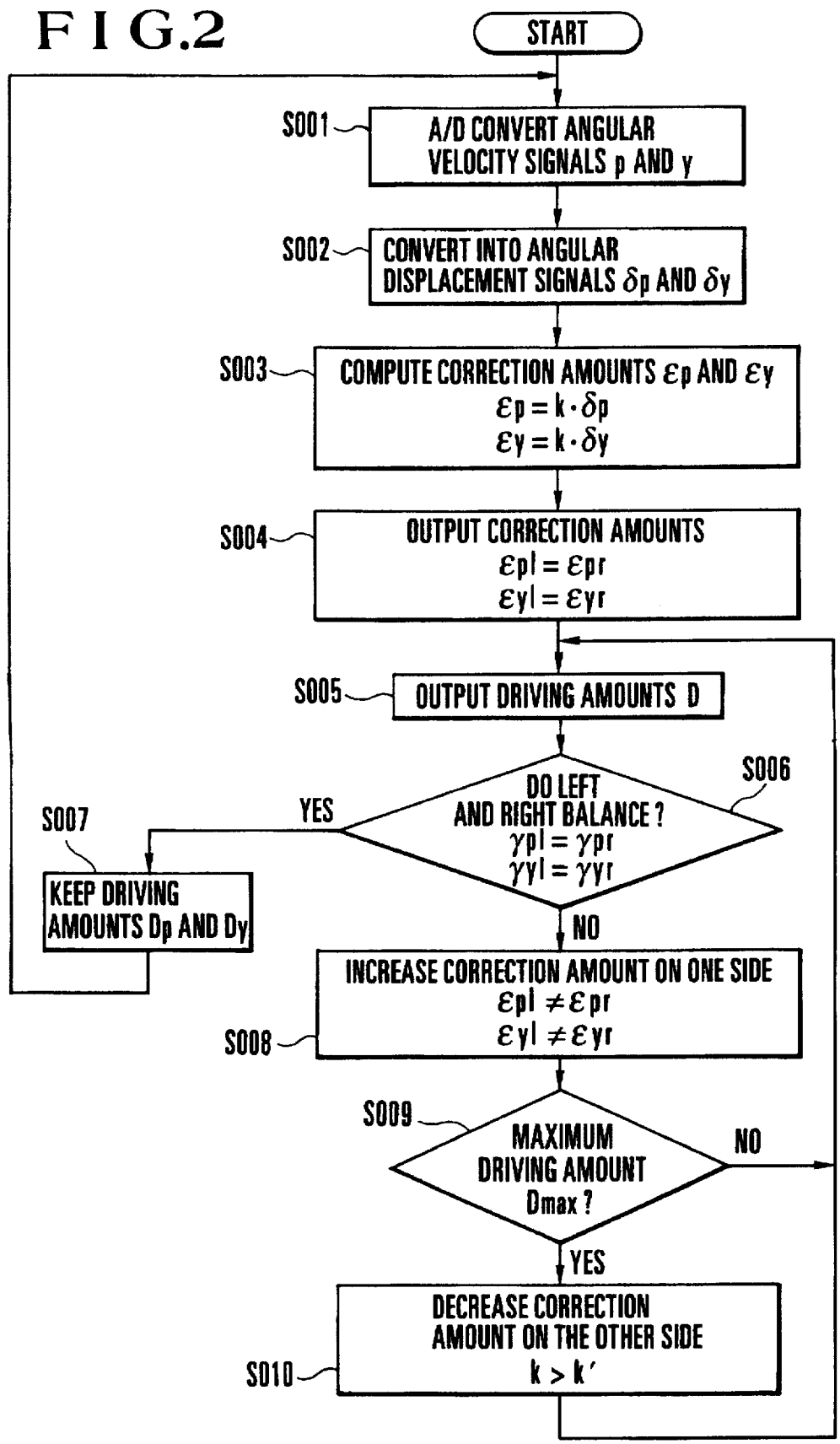
FIG. 2 is a flow chart showing the operation of the first embodiment of this invention.

A control operation to be performed individually on the VAP elements 4a and 4b of two shake correcting systems by using one shake detecting means is described as follows with reference to FIG. 2 which is a flow chart:

At a step S001, the shake detecting angular velocity signals of the vibrating gyro 1a which is pitching (shake) detecting means and the vibrating gyro 1b which is yawing (shake) detecting means passes through the filters 2a and 2b. Only necessary shake frequencies are then taken into the A/D converter. At a step S002, the shake detecting angular velocity signals are digitized by the A/D converter. The digital signals are processed by an integrating computation (digital integration) and thus converted into a pitching shake angular displacement signal δp and a yawing shake angular displacement signal δy. At a step S003, the shake detecting angular displacement signals δp and δy are checked for frequencies and, after that, are multiplied by a displacement constant k to obtain a pitching (shake) correction amount εP and a yawing (shake) correction amount εy.

At a step S004, the vertical shake correction amount εp is supplied respectively to the comparators 6a and 6c as the left eye ordinate control signal εpl and the right eye ordinate control signal εpr. The horizontal shake correction amount εy is supplied to the comparators 6b and 6d respectively as the right eye abscissa control signal εyl and the left eye abscissa control signal εyr. In this instance, the values of the optical axis varying control signals for the left and right eyes are equal to each other (εpl=εpr, εyl=εyr).

At a step S005, the comparators 6a, 6b, 6c and 6d respectively compare the optical axis varying control signals εpl, εpr, εyl and εyr which are supplied from the microcomputer 3 with detection signals γpl, γpr, γyl and γyr which are supplied from the VAP element position detecting means 5a, 5b, 5c and 5d. The VAP elements 4a and 4b which are optical axis varying means are driven as necessary through the electromagnetic coils which are VAP driving means according to the results of comparison. The driving amounts D decided on the basis of the outputs of the comparators 6a, 6b, 6c and 6d include a left eye VAP element vertical driving amount Dpl, a right eye VAP element vertical driving amount Dpr, a left eye VAP element horizontal driving amount Dyl and a right eye VAP element horizontal driving amount Dyr.

At a step S006, a check is made to find if the optical axes of the left and right VAP elements 4a and 4b are changed at the same amount of displacement, by reading the position detection signal γpl, γpr, γyl and γyr into the microcomputer. The check is thus made for a state of (γpl=γpr, γyl=γyr). If the left and right vertical position signals γpl and γpr are found to be equal and the left and right horizontal position signals γyl and γyr are also found to be equal to each other, the flow comes to a step S007. At the step S007, the control operation is allowed to be carried on under the same condition.

Steps S008 - S009 - S006 - S007: If the left and right vertical position signals γpl and γpr and the left and right horizontal position signals γyl and γyr are respectively not equal, one side of the computed shake correction amounts εp and εy (εpl or εpr and εyl or εyr) are increased until they becomes equal to other values.

The left and right position signals γp and γy fail to become equal if the loaded characteristics of the left and right VAP elements 4a and 4b are not equal.

Steps S010 - S006 - S007: If the left and right position signals γp and γy fail to coincide with each other (γpl≠γpr or γyl≠γyr) even with the optical axis varying control amounts εpl, εpr, εyl and εyr increased up to maximum driving amounts Dmax, the displacement constant k is changed in such a way as to adjust the larger values of the position signals γp and γy to the smaller values and to make the movement of one of the left and right VAP elements 4a and 4b coincide with that of the other.

Further, a difference in deflection angle between the VAP elements obtained by maximum driving (the maximum deflection angles) may be temporarily detected and stored in a memory which is provided for detection and the value in storage (displacement constant k) may be taken out every time maximum driving control is made.

In case where two VAP elements are arranged as left and right optical axis varying means like in the case described above, the shake correcting control over the optical axes is performed with priority given to the balance between the left and right VAP elements.

Figure 3:
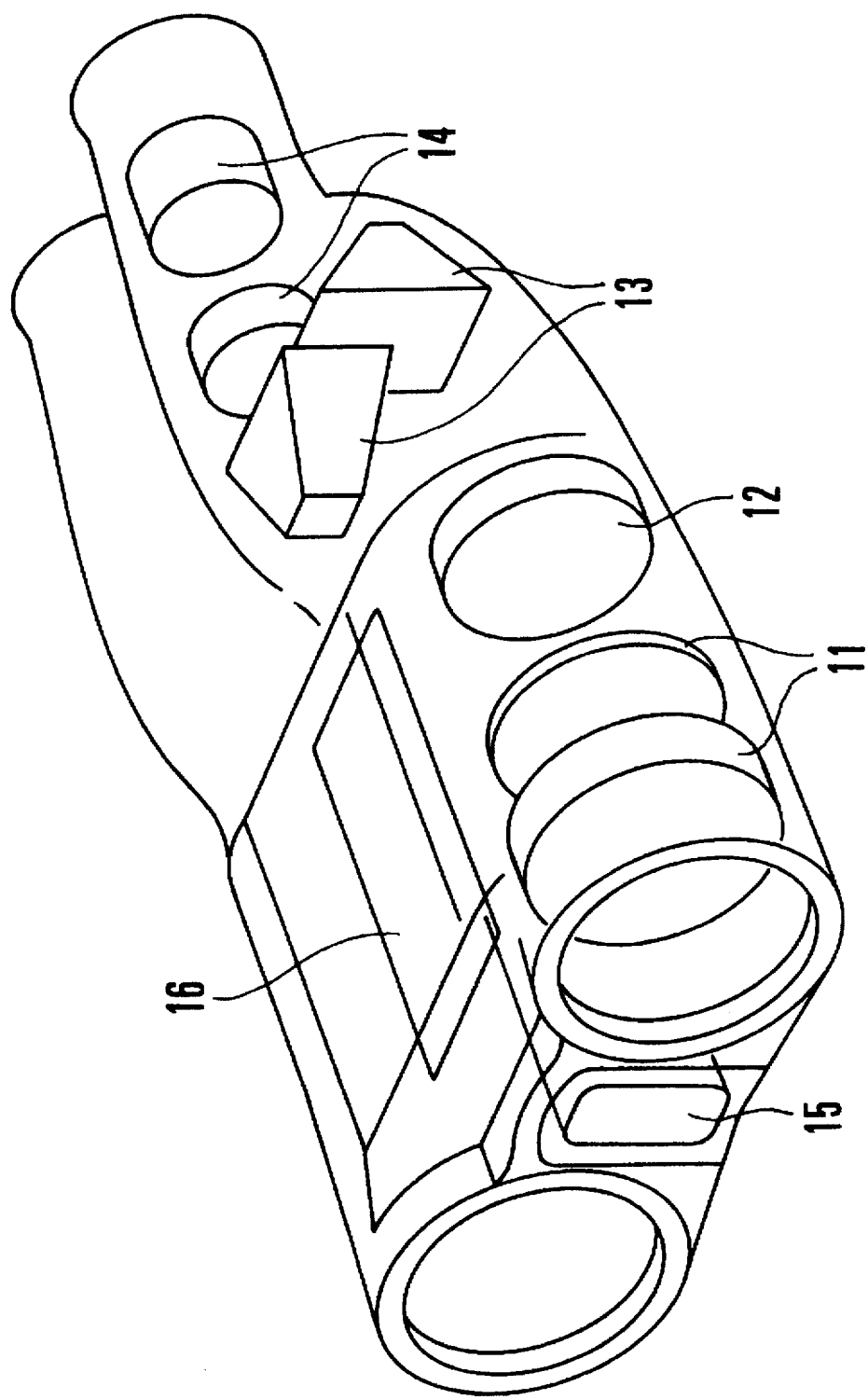
FIG. 3 is a layout view of the first embodiment.

FIG. 3 shows by way of example a case where the optical axis control device is arranged for a binocular.

In FIG. 3, a reference numeral 11 denotes a front objective lens group including a focusing lens. A numeral 12 denotes a VAP element. A numeral 14 denotes an eyepiece lens group. A numeral 15 denotes a secondary power source (battery) which is provided for controlling and driving the optical axis control device. A numeral 16 denotes a control circuit board.

(Second Embodiment)

In the first embodiment, the moving positions of the left and right VAP elements are detected serially or in a specific cycle. When a difference in deflection angle arises, the left and right VAP elements are driven and controlled in such a way as to equalize the difference when a shake correcting action is performed next time.

In the case of the second embodiment, data of driving characteristics of the left and right VAP elements are respectively stored in a memory means beforehand or at the time of initial adjustment. The data in storage is added to an optical axis varying control value computed and obtained from the output of shake detecting means such as gyros or the like and the control is accomplished in such a way as to equalize the movements of the left and right VAP elements. FIG. 5 shows the basic control arrangement of the second embodiment which is the same as that of the first embodiment shown in FIG. 1 except that the memory means is added to the arrangement of FIG. 1.

In FIG. 5, a reference numeral 30 denotes the memory means which includes a nonvolatile memory such as an EEPROM. The data of the driving characteristics of the VAP elements 4a and 4b is arranged to be taken into the memory means 30 according to the following procedures:

At the time of initial adjustment of the control circuit, several points of specific driving potentials are applied to the VAP elements 4a and 4b through the comparators 6a, 6b, 6c and 6d. The amounts of change of the optical axes of the left and right VAP elements 4a and 4b obtained at that time are temporarily inputted to the microcomputer 3 through the vertical position detecting means 5a and 5c for ordinate correcting angles and through the horizontal position detecting means 5b and 5d for abscissa correcting angle.

Figure 7:
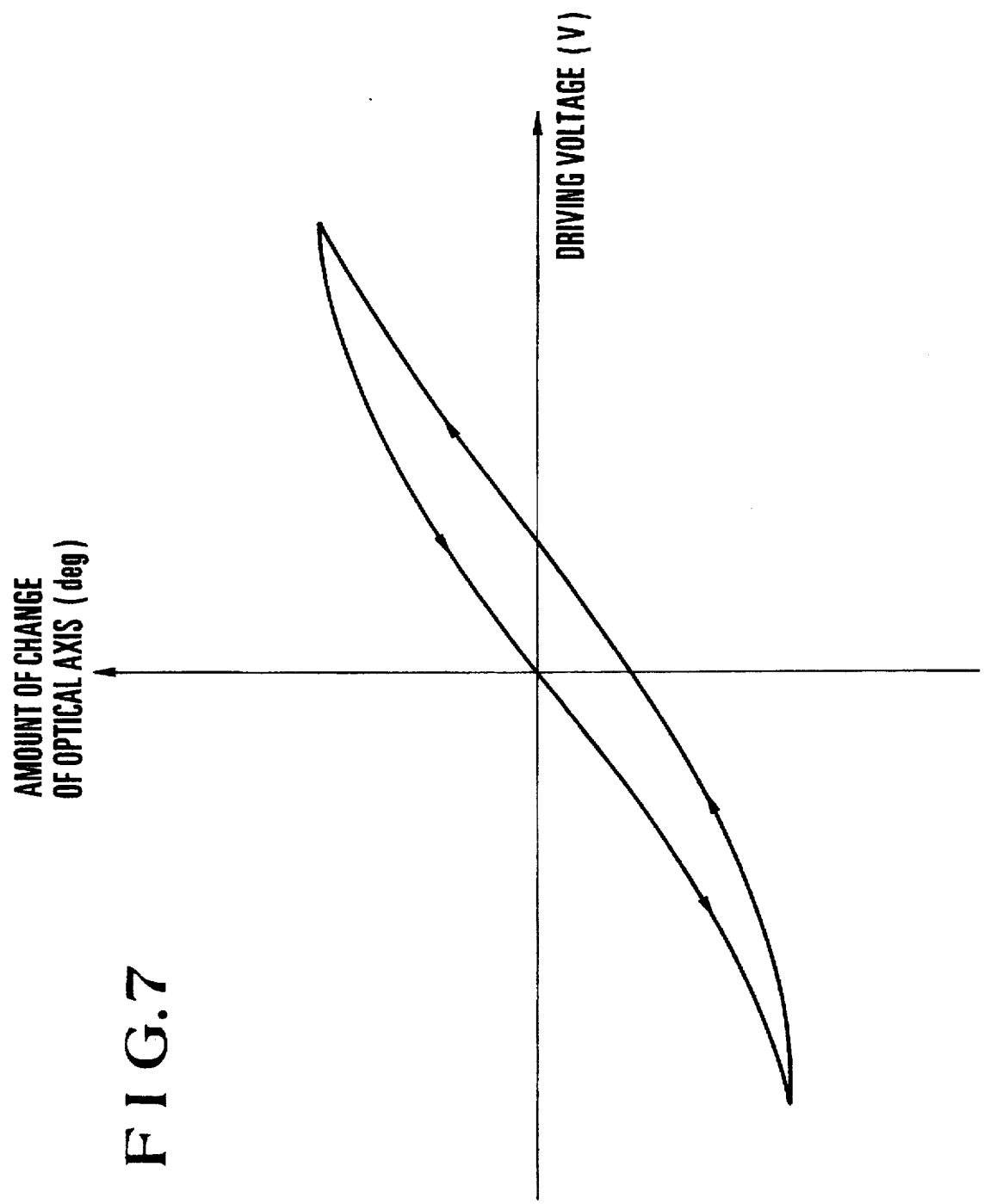
FIG. 7 shows the VAP driving characteristic of the second embodiment of this invention.

FIG. 7 shows by way of example a deflection angle-driving potential characteristic which is obtained by the above-stated procedures.

The data of the characteristic inputted to the microcomputer 3 is normalized as a balance adjustment coefficient $\beta$. The balance adjustment coefficient $\beta$ is stored in the memory means 30 in the form of a table data. Further, with the displacement amount of the deflection angle of the right VAP element 4b used as a reference, the balance adjustment coefficient $\beta$ of the left VAP element 4a obtained at a specific potential is normalized in accordance with the following formula:

$$\beta = \frac{\gamma l - \gamma r}{\gamma l} + 1$$

Figure 6:
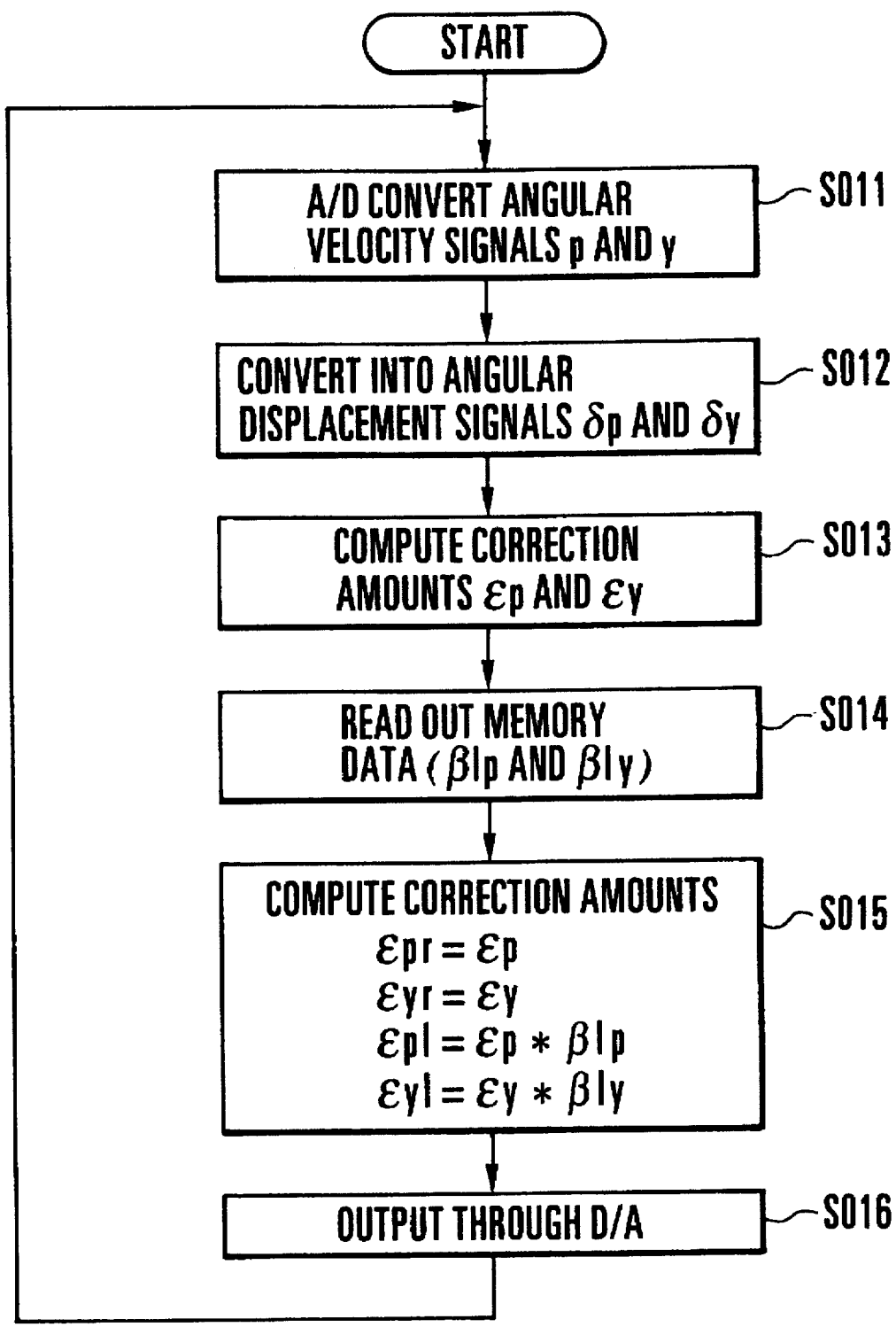
FIG. 6 is a flow chart showing the operation of the second embodiment of this invention.

A shake correcting operation to be performed by extracting the balance adjustment coefficient $\beta$ from the memory means 30 for controlling the two VAP elements 4a and 4b is described below with reference to FIG. 6 which is a flow chart:

At a step S011, the shake detection angular velocity signal of the vibrating gyro 1a which is the pitching detecting means and that of the vibrating gyro which is the yawing detecting means respectively pass through the filters 2a and 2b. Then, only the necessary shake frequencies are taken into the A/D converter.

At a step S012, the shake detection angular velocity signals digitized by the A/D converter are integrated and computed (digital integration) into a pitching detection angular displacement signal $\delta p$ and a yawing detection angular displacement signal $\delta y$.

At a step S013, the shake detection angular displacement signals $\delta p$ and $\delta y$ thus obtained are checked for frequency and, after that, are multiplied by a phase compensation constant t to temporarily obtain a pitching correction amount $\epsilon p$ and a yawing correction amount $\epsilon y$.

At steps S014-S015: The data stored in the memory means 30 is read to extract a balance adjustment coefficient $\beta l p$ which corresponds to the pitching correction amount $\epsilon p$ and a balance adjustment coefficient $\beta l y$ which corresponds to the yawing correction amount $\epsilon y$.

The pitching and yawing correction amounts $\epsilon p$ and $\epsilon y$ are multiplied respectively by the balance adjustment coefficients $\beta l p$ and $\beta l y$. While the optical axis varying control values for the VAP element 4b are left as they are ($\epsilon pr = \epsilon p$, $\epsilon yr = \epsilon y$), the optical axis varying control values for the VAP element 4a are set again ($\epsilon pl = \epsilon p * \beta l p$, $\epsilon yl = \epsilon y * \beta l y$) and are outputted from the microcomputer 31.

At a step S016, the comparators 6a, 6b, 6c and 6d compare the optical axis varying control signals $\epsilon pl$, $\epsilon pr$, $\epsilon yl$ and $\epsilon yr$ with signals $\gamma pl$, $\gamma pr$, $\gamma yl$ and $\gamma yr$ outputted from the VAP element position detecting means 5a, 5b, 5c and 5d. The VAP elements 4a and 4b which are optical axis varying means are driven, according to the results of comparison, by the electromagnetic coils which are VAP element driving means.

(Third Embodiment)

The first and second embodiments are arranged to use electromagnetic coils as driving means 7a, 7b, 7c and 7d for driving the VAP elements 4a and 4b which are optical axis varying means. However, it is possible to use motors as power sources in place of the electromagnetic coils. In the case of a third embodiment of this invention, the optical axis is controlled by using stepping motors as the driving means.

Figure 8:
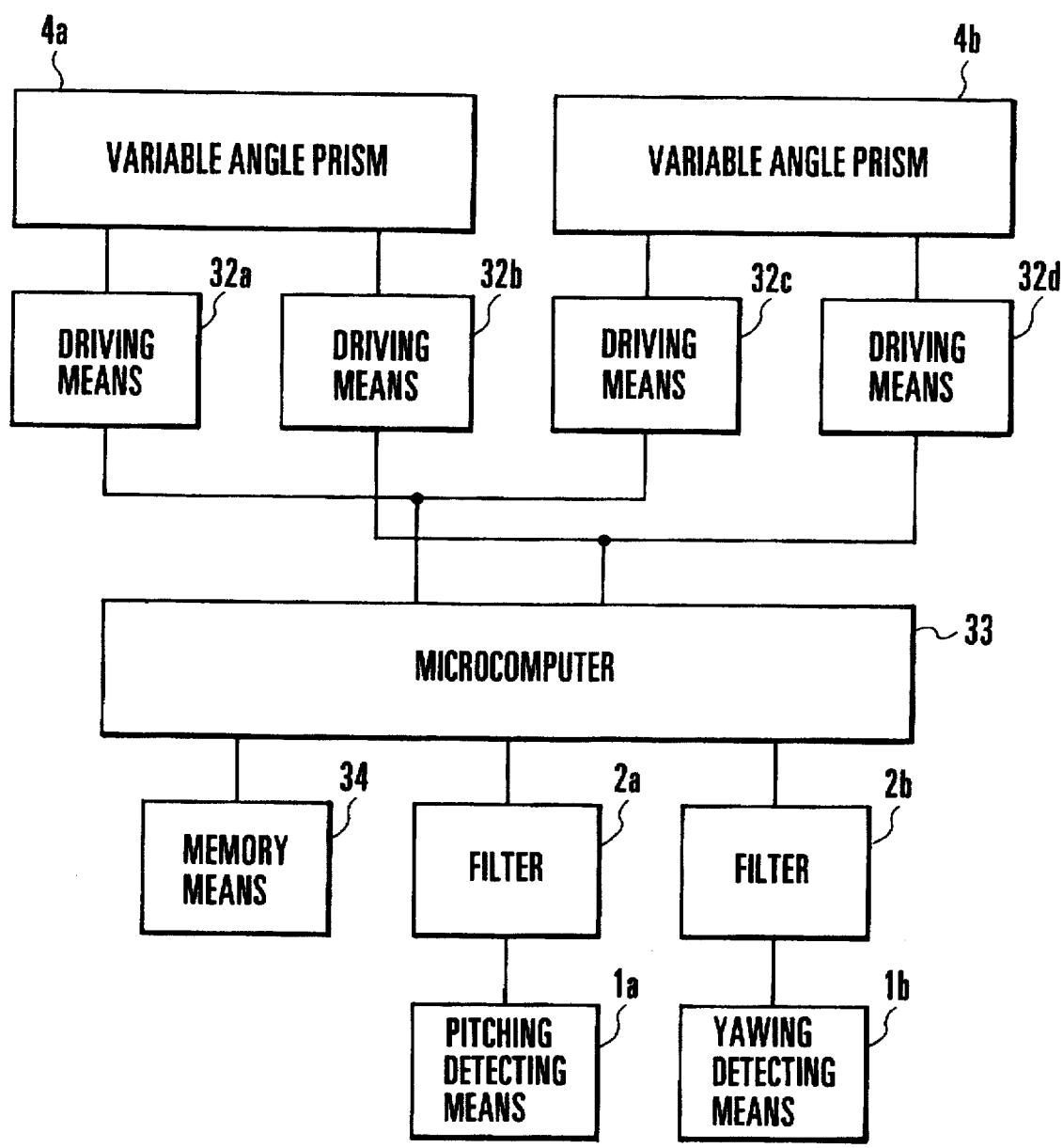
FIG. 8 is a block diagram showing the basic arrangement of a third embodiment of this invention.
Figure 9:
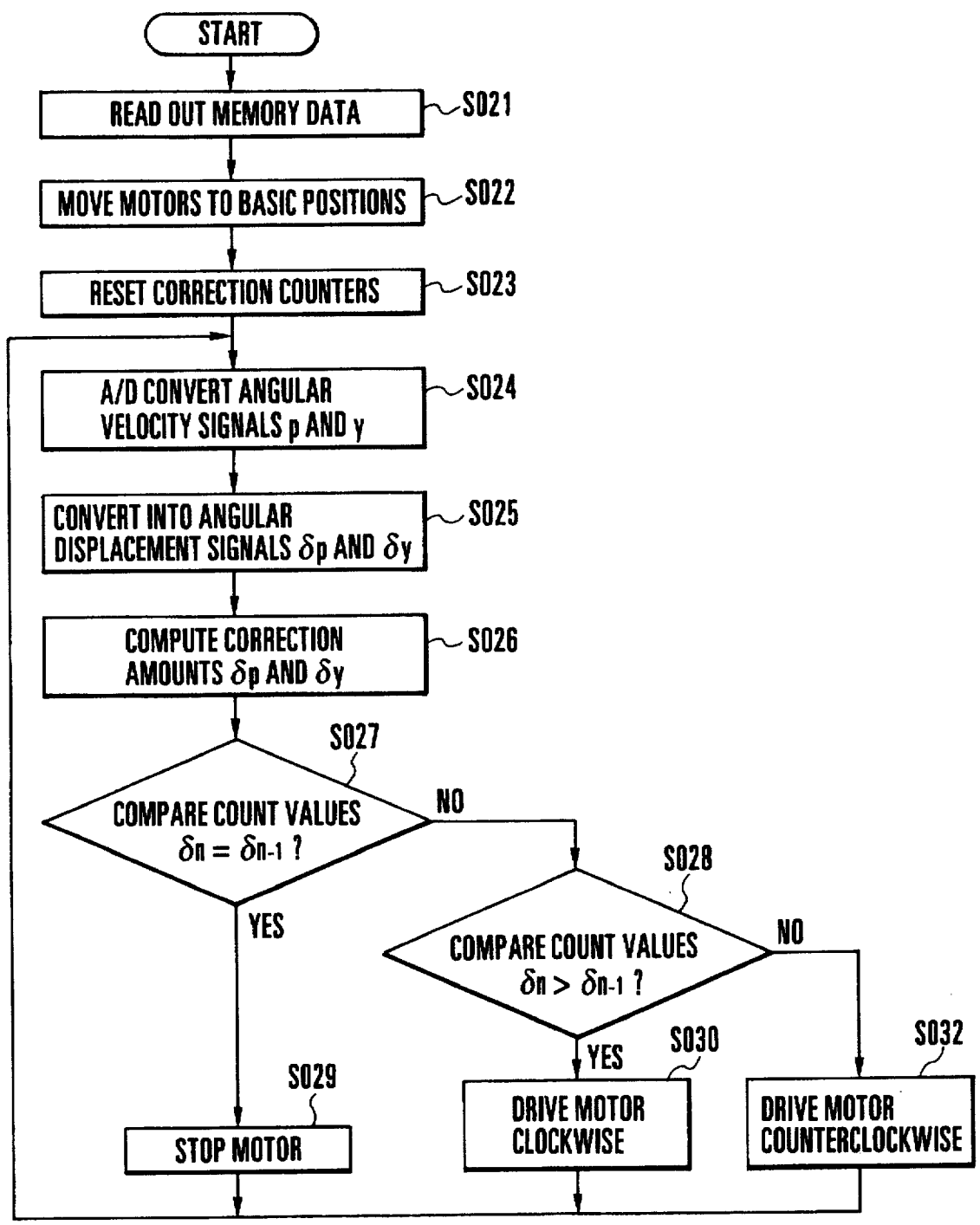
FIG. 9 is a flow chart showing the operation of the third embodiment of this invention.

FIG. 8 shows in a block diagram the basic control arrangement of the third embodiment. FIG. 9 shows in a flow chart the internal operation of a microcomputer.

Referring to FIG. 8, driving means 32a is provided for vertically moving the left VAP element 4a. Driving means 32c is provided for vertically moving the right VAP element 4b. Driving means 32b is provided for horizontally moving the left VAP element 4a. Driving means 32d is provided for horizontally moving the right VAP element 4b. Each of these driving means consists of a stepping motor and a driving circuit.

A microcomputer 33 is arranged to compute and obtain shake correction amounts from shake detection signals obtained through the filters 2a and 2b and to control the left and right VAP elements 4a and 4b through the driving means 32a, 32b, 32c and 32d.

Memory means 34 is composed of a nonvolatile memory such as an EEPROM or the like and is arranged to store the datum position of each of the left and right VAP elements 4a and 4b. In other words, the memory means 34 stores the positions of the VAP elements 4a and 4b where the amount of change in their optical axes is zero.

A shake correcting operation performed at the microcomputer 33 by controlling the stepping motors is next described with reference to the flow chart of FIG. 9.

At steps S021–S022: Data in storage is read out from the memory means 34 and each motor is moved to its datum or normal position accordingly. The data read out includes a stepping motor reference value npl which is to be used for vertically moving the left VAP element 4a, a stepping motor reference value npr for vertically moving the right VAP element 4b, a stepping motor reference value nyl for horizontally moving the left VAP element 4a, and a stepping motor reference value nyr for horizontally moving the right VAP element 4b.

At a step S023, the count values of counters which are provided for replacing the shake correction amounts σp and σy with stepping motor moving amounts are respectively reset at zero. At a step S024, the shake detection angular velocity signal indicating the shake of the vibrating gyro 1a which is employed as pitching detecting means and the shake detection angular velocity signal indicating the shake of the vibrating gyro 1b which is employed as yawing detecting means are respectively allowed to pass the filters 2a and 2b. As a result, only the necessary shake frequencies are supplied to the A/D converter to be converted into digital signals.

At a step S025, the digital shake detection angular velocity signals are integrated and computed (digital integration) to be converted into a pitching angular displacement signal δp and a yawing angular displacement signal δy.

At a step S026, the shake detection angular displacement signals δp and δy are checked for frequency and, after that, are multiplied by the phase compensation constant t. This computing process gives an ordinate varying control value up and an abscissa varying control value σy. At steps S027–S029: The current count values are compared with previous count values. If these counts values are found to be equal, the stepping motors are brought to a stop. At steps S028–S030: with the current count values compared with the previous count values, if the current count values are found to be larger than the previous count values, the stepping motors are driven to turn around clockwise.

At steps S028–S032: with the current count values compared with the previous count values, if the current count values are found to be smaller than the previous count values, the stepping motors are driven to turn around counterclockwise.

As described above, the control over the VAP elements 4a and 4b with the stepping motors can be done by controlling the absolute values of VAP element correcting angles. Thererfore, in cases where a plurality of VAP elements are to be controlled likewise, they can be easily balanced with each other.

(Fourth Embodiment)

Figure 10:
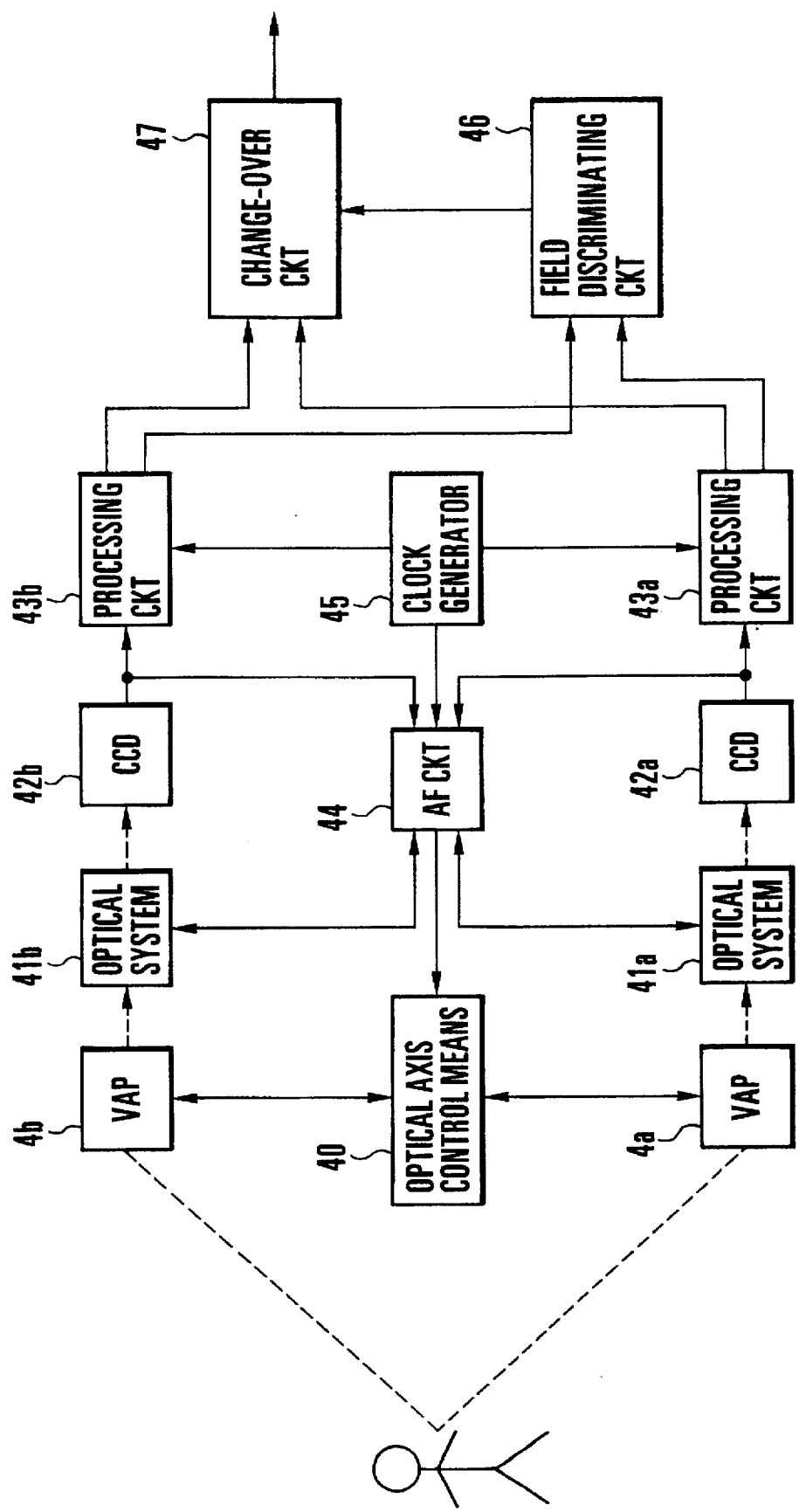
FIG. 10 is a block diagram showing the basic arrangement of a fourth embodiment of this invention.
Figure 12:
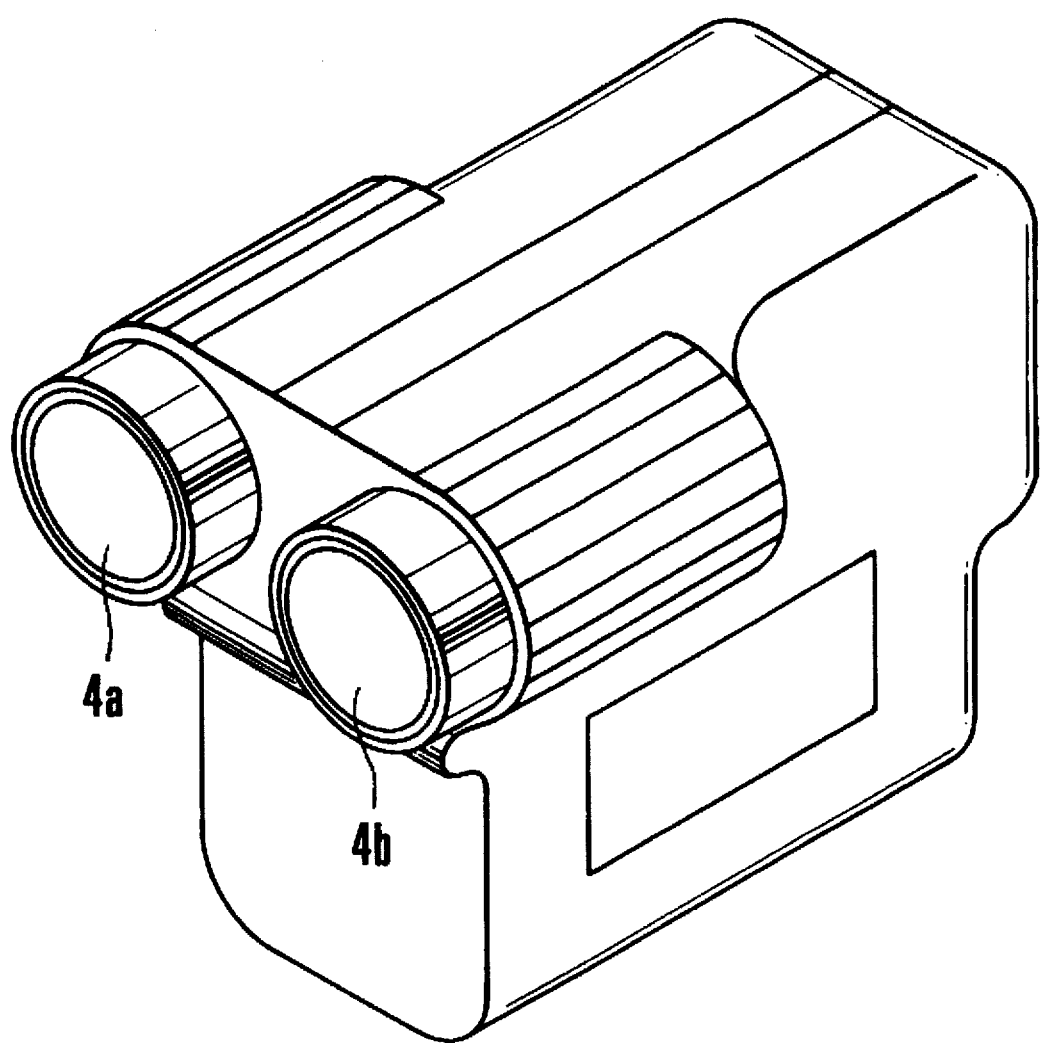
FIG. 12 is an oblique view showing the appearance of the fourth embodiment of this invention.

The following describes a fourth embodiment of this invention. In this case, this invention is applied to a visual line chiasm adjustment device adapted for a stereoscopic camera. The appearance of the camera is as shown in FIG. 12. FIG. 10 shows in a block diagram the basic arrangement of the fourth embodiment.

A left VAP element 4a is optical axis varying means for varying, according to an object distance, the optical axis of an image obtained when the object is seen from a left direction. A right VAP element 4b is another optical axis varying means for varying the optical axis of an image obtained when the object is seen from a right direction according to the object distance.

Optical axis control means 40 which is composed of a microcomputer is arranged to control the optical axes to cause them to intersect each other at the object by driving the left and right VAP elements 4a and 4b on the basis of an object distance signal. A left side optical system 41a is arranged to cause an incident image from the left VAP element 4a to be imaged on an image pickup plane. A right side optical system 41b is arranged to cause an incident image from the right VAP element 4b to be imaged on another image pickup plane.

A left side CCD 42a is arranged to provide an image forming plane for the left side optical system 41a. A right side CCD 42b is arranged to provide an image forming plane for the right side optical system 41b.

A left image processing circuit 43a is arranged to process, into a video signal, an image which is obtained for the left eye of the operator and photoelectric converted by the left side CCD 42a. A right image processing circuit 43b is arranged to process, into a video signal, an image obtained for the right eye and photo-electric converted by the right side CCD 42b.

A clock (pulse) generator 45 is arranged to give a synchronizing signal to the left and right image processing circuits 43a and 43b. Object distance detecting means 44 is an automatic focus control circuit (hereinafter referred to as an AF circuit). The AF circuit 44 is arranged to detect the spatial frequency of the object from image signals and the position detection signals of the optical systems 41a and 41b and to control the focal length of the camera.

A field discriminating circuit 46 is arranged to distinguish the fields of the left and right image processing circuits 43a and 43b from each other. A change-over circuit 47 is arranged to receive a signal from the field discriminating circuit 46 and to switch the left and right video signals from one over to the other for every field. Upon receipt of an object distance signal from the AF circuit 44, the optical axis control means 40 controls the left and right VAP elements 4a and 4b to vary their optical axes mutually inward at about equal optical axis varying amounts according to the object distance indicated by the object distance signal.

FIG. 11 is a block diagram showing the circuit arrangement of the optical axis control means 40 of FIG. 10. Referring now to FIG. 11, the optical axis control means 40 includes a microcomputer 50 in which correlation values representing distances and optical axis varying amounts are stored beforehand. The microcomputer converts distance information into an optical axis varying amount on the basis of the data stored. The converted value of the optical axis varying amount is added to the signal output of a left VAP position detecting means 5a and that of a right VAP position detecting means 5b. Addition signals which are obtained by this addition are outputted.

The addition signals are applied to driving means 7a and 7b each of which consists of an actuator and a driving circuit. The left and right VAP elements 4a and 4b are moved through these driving means 7a and 7b in such a way as to vary the optical axes of them as necessary.

The polarity of the above-stated conversion value varies according to whether it is for the left-eye system or for the right-eye system. A negative converted value is added for the right-eye system and a positive converted value is added for the left-eye system. Each of the optical axes is thus refracted inward by the addition. The angle of convergence is thus caused to automatically vary to ensure an optimum right and left visual line chiasm even in the event of a moving object.

While the first to fourth embodiments of this invention described in the foregoing are arranged to use VAPs (variable angle prisms) as shake correcting means, the shake correcting means usable in accordance with this invention is not limited to the VAP. For example, the VAP may be replaced with some other correcting means that are arranged to make correction by moving an optical member orthogonally with respect to an optical axis in such a way as to deflect a light flux as desired.

Further, while the embodiments described are arranged to use vibrating gyros as shake detecting means, the use of the gyro may be changed to some other suitable detecting means such as an angular accelerometer, an accelerometer, a velocimeter, or a displacement gauge.

Each of the first to fourth embodiments is arranged to use one detecting means for detecting each of the pitching and yawing shakes. However, the arrangement may be changed to use three or more detecting means instead of using two detecting means. The arrangement may be changed to use only one detecting means for detecting shakes in the direction in which shakes tend to take place. It is also possible to use such a sensor that is arranged to detect shakes taking place in a plurality of directions by using a single detecting means (such as a biaxial detecting vibrating gyro). It is further possible to apply the invented arrangement to a stereoscopic image pickup system using two image pickup units which are arranged in separate places away from each other.

Further, in the fourth embodiment, the AF circuit is arranged by way of example to operate according to a TV signal AF method of utilizing a signal obtained from an image pickup plane (of a CCD). This method may be replaced with some two-image-coincidence AF method, such as a passive type AF method or an active AF method which uses an infrared light.

While the magnetic coils or stepping motors are used as actuators for moving the VAPs in the embodiments described, these actuators may be replaced with some other suitable actuators such as miniature DC motors.

In each of the embodiments described, the shake detecting means or object distance detecting means is used as means for generating control signals. However, some other suitable detecting means may be employed in place of these detecting means if two different optical axes are to be caused to vary approximately equally to each other.

Figure 13:
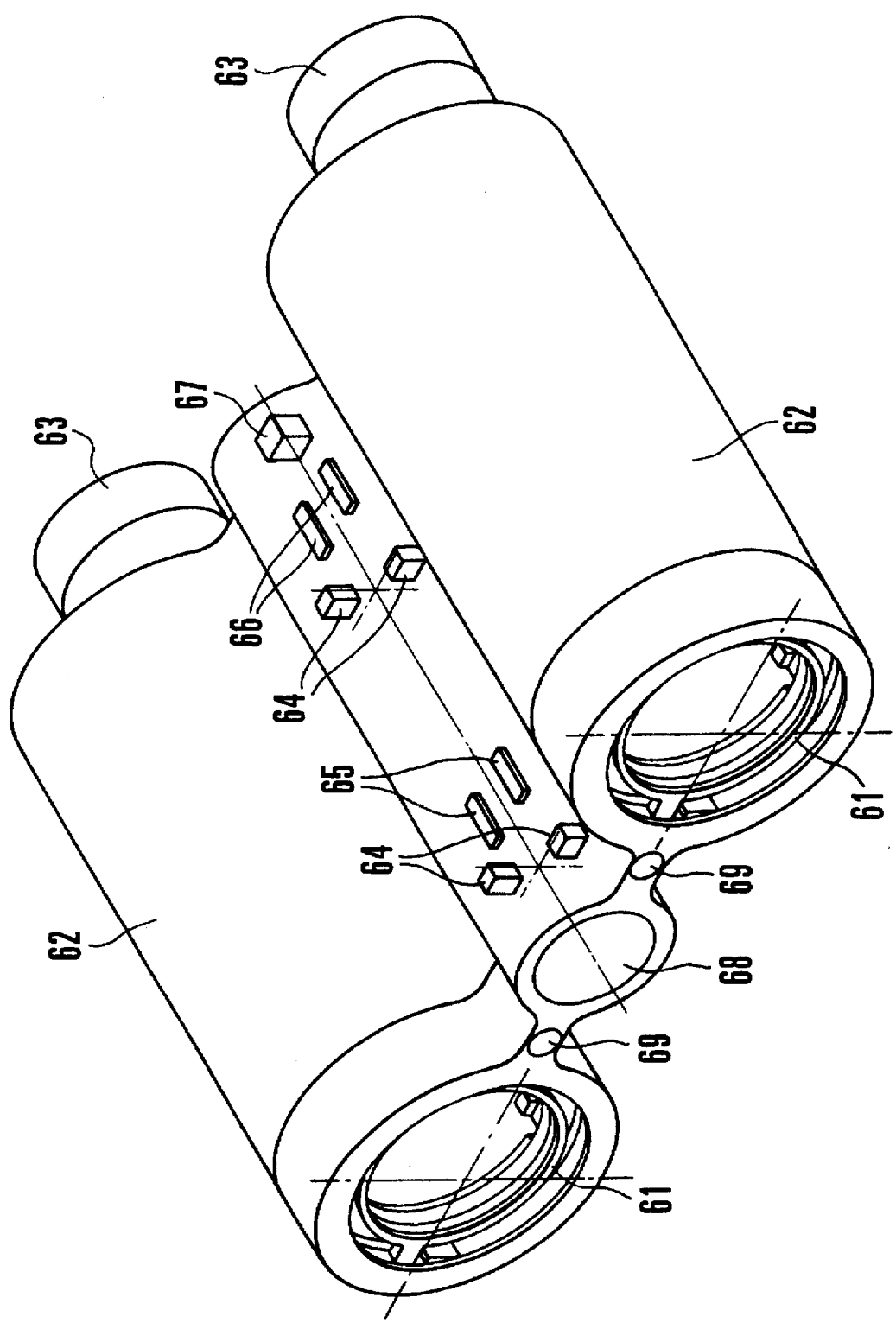
FIG. 13 is an oblique view showing in outline a binocular having an image shake suppressing mechanism which includes variable angle prisms.
Figure 14:
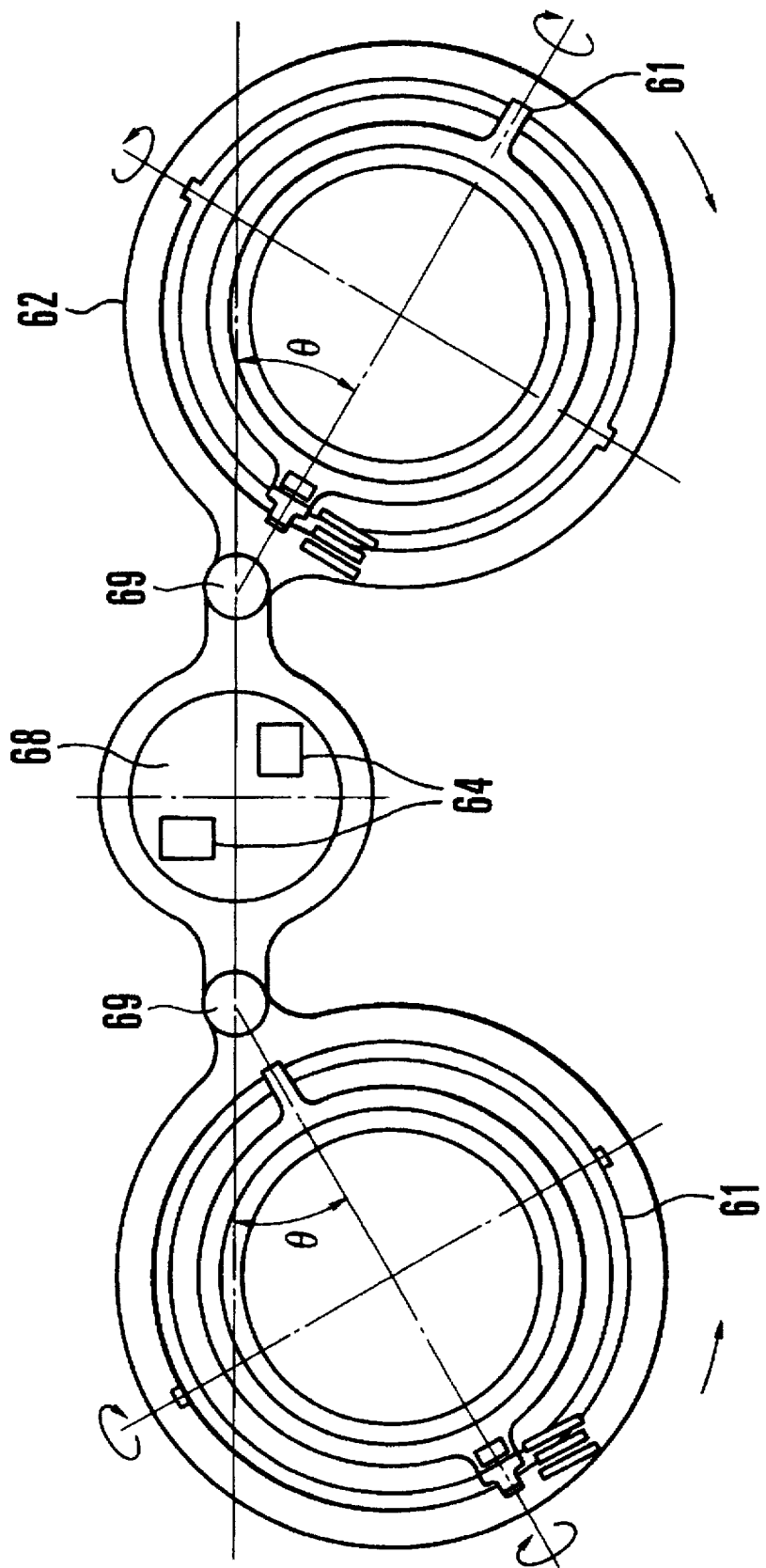
FIG. 14 is a front view showing the binocular of FIG. 13 as in a pupil distance adjusted state.

Simple and mere use of variable angle prisms for a binocular would bring about the following problems:

FIG. 13 shows by way of example a case where image shake suppressing mechanisms including variable angle prisms (VAPs) are mounted on a binocular. In FIG. 13, the illustration includes the image shake suppressing mechanisms 61, objective lens barrels 62 which consists of objective optical systems, eyepiece lens barrels 63 which are secured to the objective lens barrels 62 in such a way as to have their optical axes coincide with those of the latter and include ocular optical systems, two sets of detectors 64 which are provided for detecting shakes taking place in the directions of pitching and yawing, control circuits 65 which are arranged to control the whole apparatus, coil driving circuits 66 which are arranged to drive coils in accordance with driving signals coming from the control circuits 65, a power supply 67 which is arranged to supply power to each applicable part, a neutral shaft 68 which is provided for arranging the shake detectors 64, the control circuits 65, the coil driving circuits 66 and the power supply 67, and connecting shafts 69 which are arranged to connect the neutral shaft 68 to the left and right objective lens barrels 62. When the pupil distance of this binocular is adjusted, however, the image shake suppressing mechanisms 61 turn around on the connecting shafts 69 while the shake detectors 64 do not move as they are disposed within the neutral shaft 68. In other words, as shown in FIG. 14, an axis on which each of the shake detectors 64 is disposed and a shaft on which each of the suppressing means (image shake suppressing mechanisms) 61 is driven come to form an angle θ between them. When a signal indicating shaking of the binocular is sent from the shake detector 64 to the control circuit 65, the presence of this angle tends to cause an inappropriate signal to be applied to the control circuit 65. When some vibrations are applied to the binocular, therefore, the vibrations cannot be adequately suppressed.

Fifth to twelfth embodiments of this invention are arranged to solve this problem among other problems.

(Fifth Embodiment)

Figure 15:
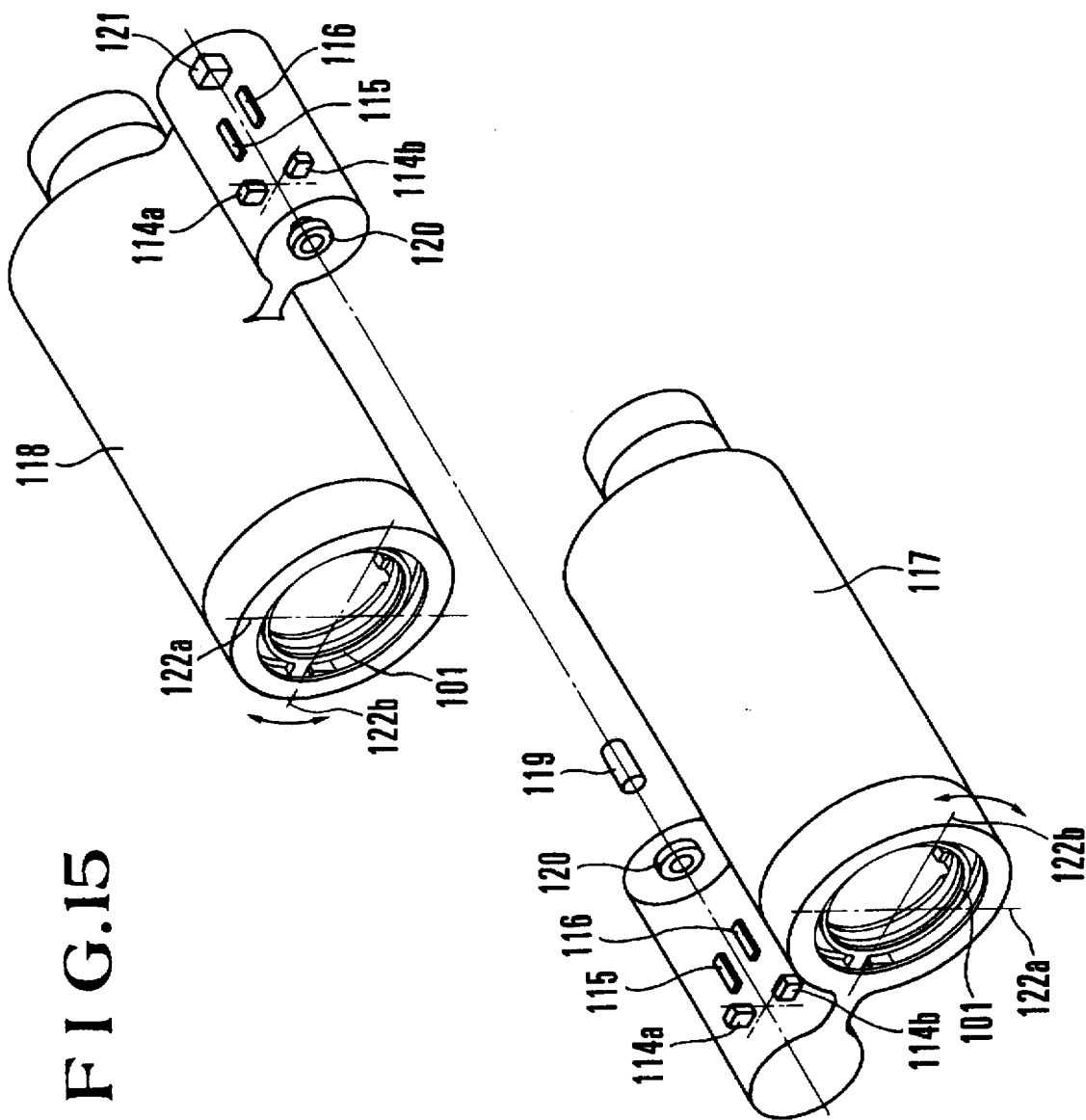
FIG. 15 is an exploded oblique view showing a binocular which is a fifth embodiment of this invention.
Figure 16:
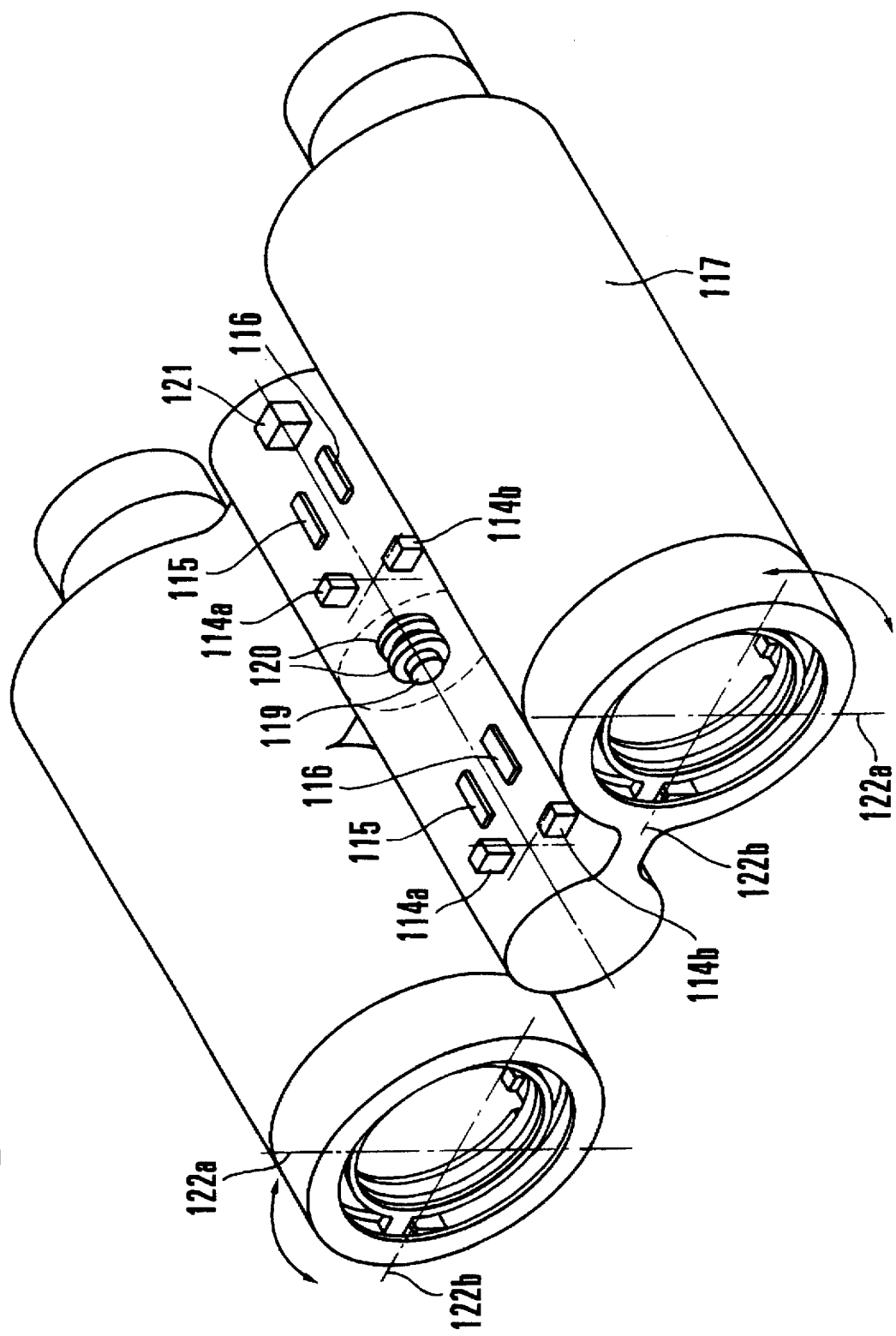
FIG. 16 is an oblique view showing the fifth embodiment of this invention as in a assembled state.
Figure 17:
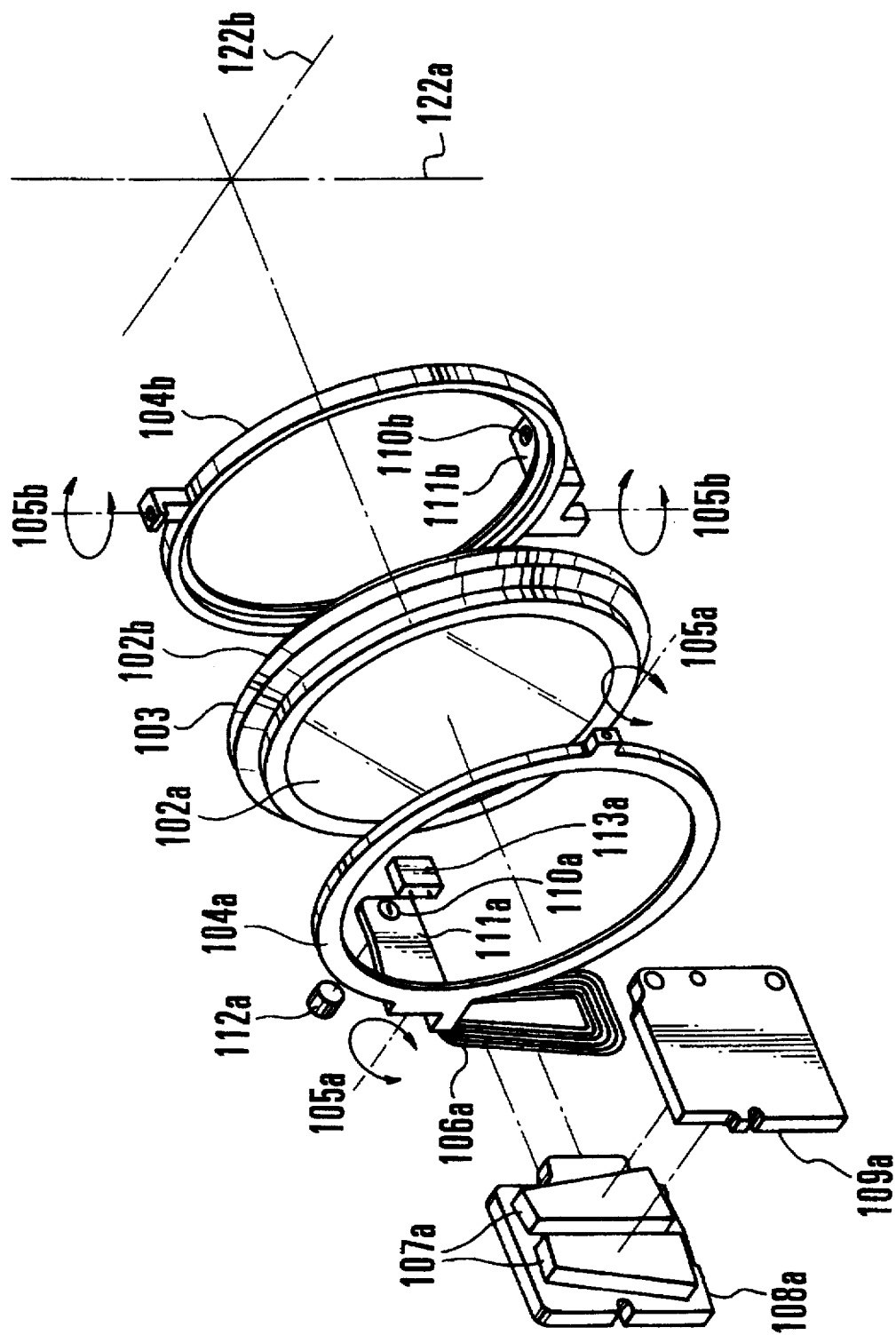
FIG. 17 is an oblique view showing in outline the arrangement of an image shake suppressing mechanism adapted for the binocular which is the fifth embodiment.

FIGS. 15, 16 and 17 show in outline the arrangement of a binocular which is arranged as the fifth embodiment of this invention to have the image shake suppressing mechanisms. FIG. 15 is an exploded oblique view of the binocular which is the fifth embodiment. FIG. 16 shows it in an oblique view as in an assembled state. In FIGS. 15 and 16, a reference numeral 101 denotes the image shake suppressing mechanisms which are provided for correcting image shakes caused by the vibrations or the like of the binocular. FIG. 17 is an exploded oblique view showing the details of each of the image shake suppressing mechanisms. The arrangement of the image shake suppressing mechanisms of the binocular of the fifth embodiment is first described with reference to FIG. 17.

Referring to FIG. 17, two transparent plates 102a and 102b are opposed to each other to have a space between them. A transparent film 103 is arranged to have the space filled with a high refractive index liquid (not shown) and sealed by the film 103 in conjunction with the transparent plates 102a and 102b. These parts 102a, 102b and 103 jointly form a variable angle prism (VAP). The variable angle prism is sandwiched in between frames 104a and 104b. These frames 104a and 104b are arranged to carry the transparent plates 102a and 102b which are parts of the variable angle prism in such a way as to permit them to turn around on pitching and yawing axes which are orthogonally intersecting their common axis. Image shakes taking place in the directions of pitching and yawing (represented respectively by lines 122a and 122b in FIG. 17) can be corrected by causing the transparent plates 102a and 102b to turn round respectively on the pitching axis 105a and the yawing axis 105b as necessary. In other words, the transparent plates 102a and 102b are arranged to be image shake correcting optical members respectively on the pitching side and on the yawing side. A flat-type coil 106a is secured to one end of a front frame body 114a on the pitching side. Permanent magnets 107a and yokes 108a and 109a are disposed in a shape of being opposed to both sides of the flat-type coil 106a. A closed magnetic circuit is formed jointly by these parts. An arm part 111a is formed in one body with the frame body 104a. A slit 110a is formed in the arm part 111a. A light emitting element 112a which is, for example, an IRED or the like and a light receiving element 113a which is, for example, a PSD or the like and is arranged to vary its output according to the position of a spot obtained by a light flux emitted from the light emitting element 112a are arranged to confront each other across the slit 110a. The light flux emitted from the light emitting element 112a is arranged to fall on the light receiving element 113a after passing through the slit 110a.

Although, parts disposed on the yawing side of the shake suppressing mechanism are omitted from FIG. 17, a flat-type coil 106b, a permanent magnet 107b, yokes 108b and 109b, a slit 110b, an arm part 111b, a light emitting element 112b and a light receiving element 113b are arranged on the yawing side in the same manner as their corresponding parts on the pitching side described above.

The arrangement of the whole binocular which is the fifth embodiment is described with reference to FIGS. 15 and 16 as follows: referring to FIGS. 15 and 16, the left side lens barrel 117 of the binocular is arranged to include therein an objective lens, an eyepiece lens and an erecting lens which are not shown. The binocular includes also the image shake suppressing mechanisms 101 which are arranged as shown in FIG. 17, shake detectors 114a and 114b, a control circuit 115 which is arranged to control the image shake suppressing mechanisms 101, and a driving circuit 116 which is arranged to drive the coils 106a and 106b according to driving signals outputted from the control circuit 115.

The shake detectors 114a and 114b are arranged respectively to permit detection of shakes taking place in specific directions. Each of the shake detectors 114a and 114b is arranged in such a position that the direction in which the deflection of the detector is detectable coincides with the pitching direction 122a or the yawing direction 122b of the image shake suppressing mechanism 101. In the case of the shake detector 114a, for example, the transparent plate 102a of FIG. 17 is a pitching side image shake correcting optical member which is arranged to correct an image shake taking place in the pitching direction 122a in accordance with the output of the shake detector 114a. The shake detector 114a is thus arranged to be capable of detecting a shake taking place in the pitching direction 122a. The other shake detector 114b is likewise arranged to be capable of detecting a shake taking place in the yawing direction 122b.

A right (side) lens barrel 118 includes, like the left lens barrel 117, an objective lens, an eyepiece and an erecting lens which are not shown. The right lens barrel 118 further includes the image shake suppressing mechanism 101, the shake detectors 114a and 114b, the control circuit 115 and a driving circuit 116. A power supply 121 is arranged to supply power to each applicable part. Like the left lens barrel 117, the right lens barrel is also arranged to detect shakes taking place in the pitching direction 122a and the yawing direction 122b.

A connection shaft 119 is arranged to connect the left and right lens barrels 117 and 118 to each other. A bearing 120 is arranged to receive the connection shaft 119. The left and right lens barrels 117 and 118 are thus arranged to be turnable in the directions of arrows on the connection shaft 119.

The image stabilizing operation of the binocular arranged as shown in FIGS. 15, 16 and 17 as the fifth embodiment of this invention is described as follows:

When the binocular shakes, the shake is detected by the shake detectors 114a and 114b as shaking amounts in the pitching and yawing directions. The shaking amounts thus detected are supplied to the control circuit 115. The control circuit 115 then decides driving amounts for driving the variable angle prism. Information on the driving amounts thus decided is transmitted to the coil driving circuit 116. The coil driving circuit 116 then converts the driving amounts into drivable amounts for driving the coils 106a and 106b. Meanwhile, signals which are obtained from the light receiving elements 113a and 113b with light fluxes emitted from the light emitting elements 112a and 112b and received through the slits 110a and 110b are supplied to the control circuit 115. The control circuit 115 then compares the amounts to which the variable angle prism should be driven with the amounts to which the variable angle prism is actually driven. A difference obtained through the comparison is supplied to the coil driving circuit 116.

The image shake suppressing procedures to be taken when the binocular shakes are as described above. Next, an image suppressing operation to be performed when the pupil distance is adjusted by the user is described as follows: in this instance, as mentioned above, the left and right lens barrels 117 and 118 are turned around in the directions of arrows on the connection shaft 119. The shake detectors 114a and 114b, therefore, turn around on the connection shaft 119. The image shake suppressing mechanism also turns around on the connection shaft 119. However, since the shake detectors 114a and 114b turn around in the same manner, the turning movement of the image shake suppressing mechanism brings about no change in its relation to the shake detectors 114a and 114b. Therefore, no such problem that has been mentioned with reference to FIG. 14 takes place, so that the image shake can be reliably suppressed. With the shake of the binocular thus detected by the shake detectors 114a and 114b, the variable angle prism is driven in accordance with the procedures described in the foregoing.

The problem mentioned in the foregoing thus can be solved by the arrangement of the fifth embodiment. In addition to this advantage, since the shake detectors 114a and 114b are arranged outside of the optical systems, the optical systems can be compactly arranged.

(Sixth Embodiment)

Figure 18:
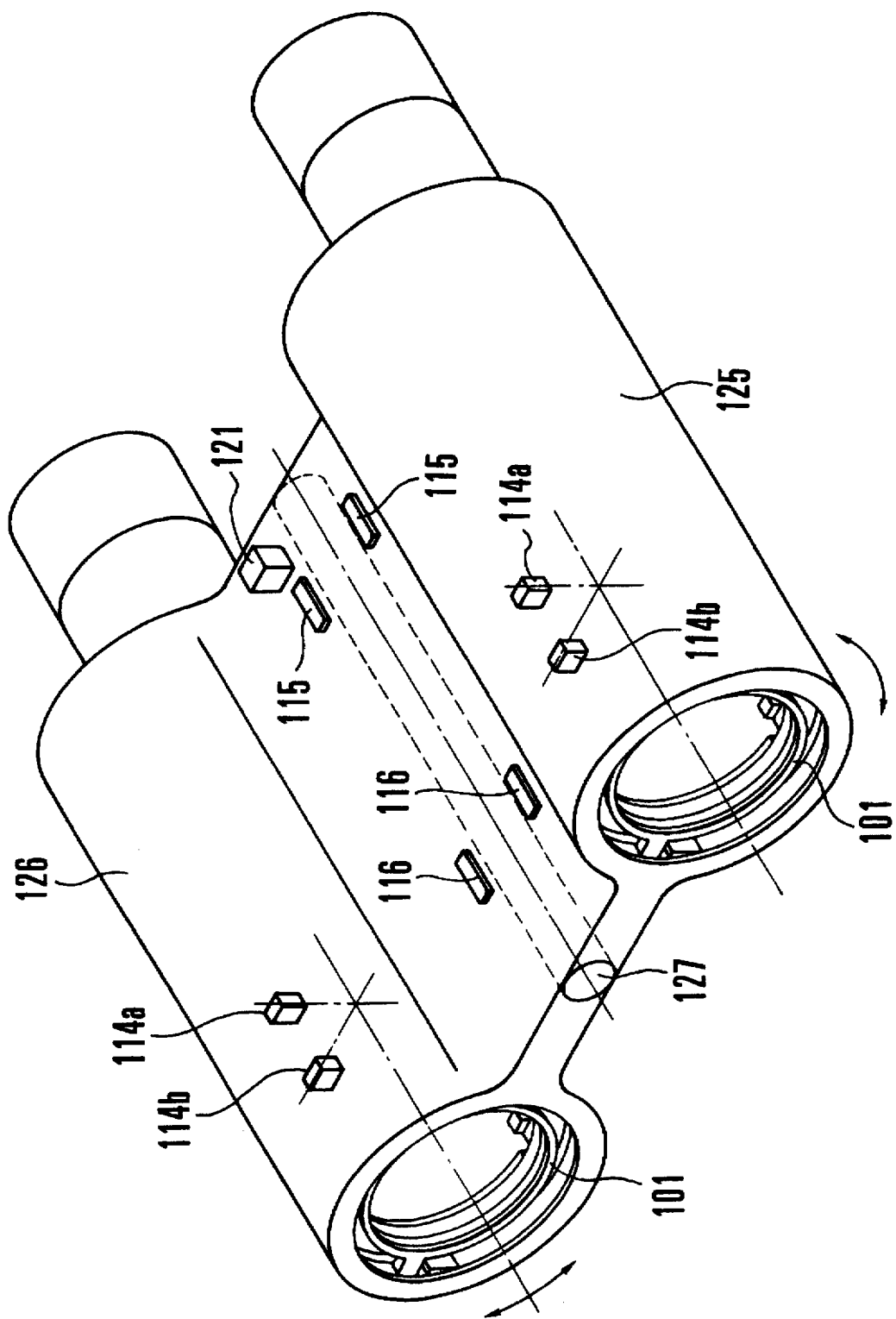
FIG. 18 is an oblique view showing in outline a binocular which is a sixth embodiment of this invention.

FIG. 18 shows in outline the arrangement of a binocular which is a sixth embodiment of this invention.

In FIG. 18, the same reference numerals as those of FIGS. 15 and 16 indicate parts arranged in the same manner. Therefore, the details of these parts are omitted from the following description. A lens barrel 125 includes therein an image suppressing mechanism 101, shake detectors 114a and 114b, an eyepiece (not shown), an objective lens (not shown), an image erecting prism (not shown), a control circuit 115, a driving circuit 116 and a power supply 121. The power supply 121 is arranged to supply power to the image shake suppressing mechanism 101, the shake detectors 114a and 114b, the control circuit 115 and the driving circuit 116. For the power supply 121, a primary battery, a secondary battery, an AC adapter, a DC adapter or the like can be used.

Like the fifth embodiment, one of each pair of parts, except the power supply 121, is disposed on the side of the left lens barrel 125 and the other on the side of a right lens barrel 126. The shake detectors 114a and 114b and the image shake suppressing mechanism are arranged in the same positional relation as in the fifth embodiment. A connection shaft 127 is arranged to interconnect the left and right lens barrels 125 and 126. These lens barrels 125 and 126 are arranged not only to be interconnected by the connection shaft 127 but also to be turnable on the connection shaft 127 in the directions of arrows. In the case where the user makes pupil distance adjustment, the lens barrels 125 and 126 are turned around relative to each other on the connection shaft 127.

The image stabilizing operation of the sixth embodiment is similar to that of the fifth embodiment and is therefore omitted from description. Like in the fifth embodiment, the relative positions of the shake detectors 114a and 114b and the image shake suppressing mechanism remain unchanged also in the sixth embodiment, so that the image stabilizing operation can be reliably accomplished.

The problem mentioned in the foregoing thus can be solved by the arrangement of the sixth embodiment.

The shake detectors 114a and 114b may be arranged inside of the optical system (in a part where the image is not eclipsed) as long as the relation mentioned above can be retained. Such modification is advantageous in respect to space saving.

Figure 19:
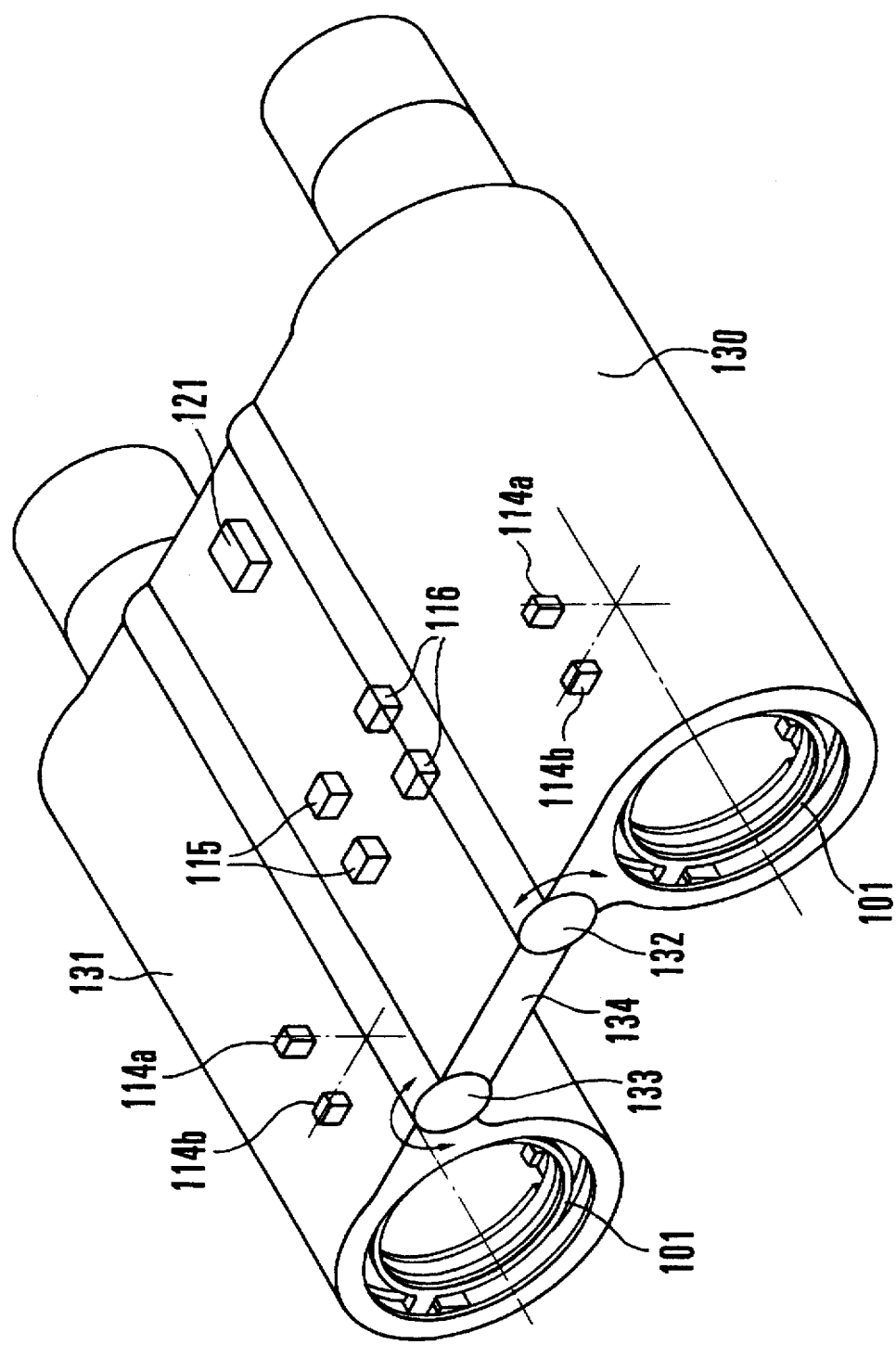
FIG. 19 is an oblique view showing in outline an example of modification of the sixth embodiment.

As regards another conceivable modification, the invention may be applied to a so-called double-joint bridge type binocular which is arranged as shown in FIG. 19. In the case of FIG. 19, shafts 132 and 133 are provided for connecting lens barrels 130 and 131 to a bridge 134 which is arranged to couple these lens barrels 130 and 131 with each other. Control circuits 115, coil driving circuits 116 and a power supply 121 are arranged within the coupling bridge 134.

The lens barrels 130 and 131 are individually turnable respectively on the connecting shafts 132 and 133 as indicated by arrows in FIG. 19. The shake detectors 114a and 114b are arranged in two pairs, one pair of shake detectors 114a and 114b being arranged on the lens barrel 130 and the other on the other lens barrel 131. This arrangement enables the user to see one image independently of the other image after a blurred state of the image is canceled even in the case where the lens barrels are opened by turning them around away from the coupling bridge 134 at different angles. With the binocular arranged in the double-joint bridge type in this manner, the binocular can be folded up into a very compact shape.

(Seventh Embodiment)

Figure 20:
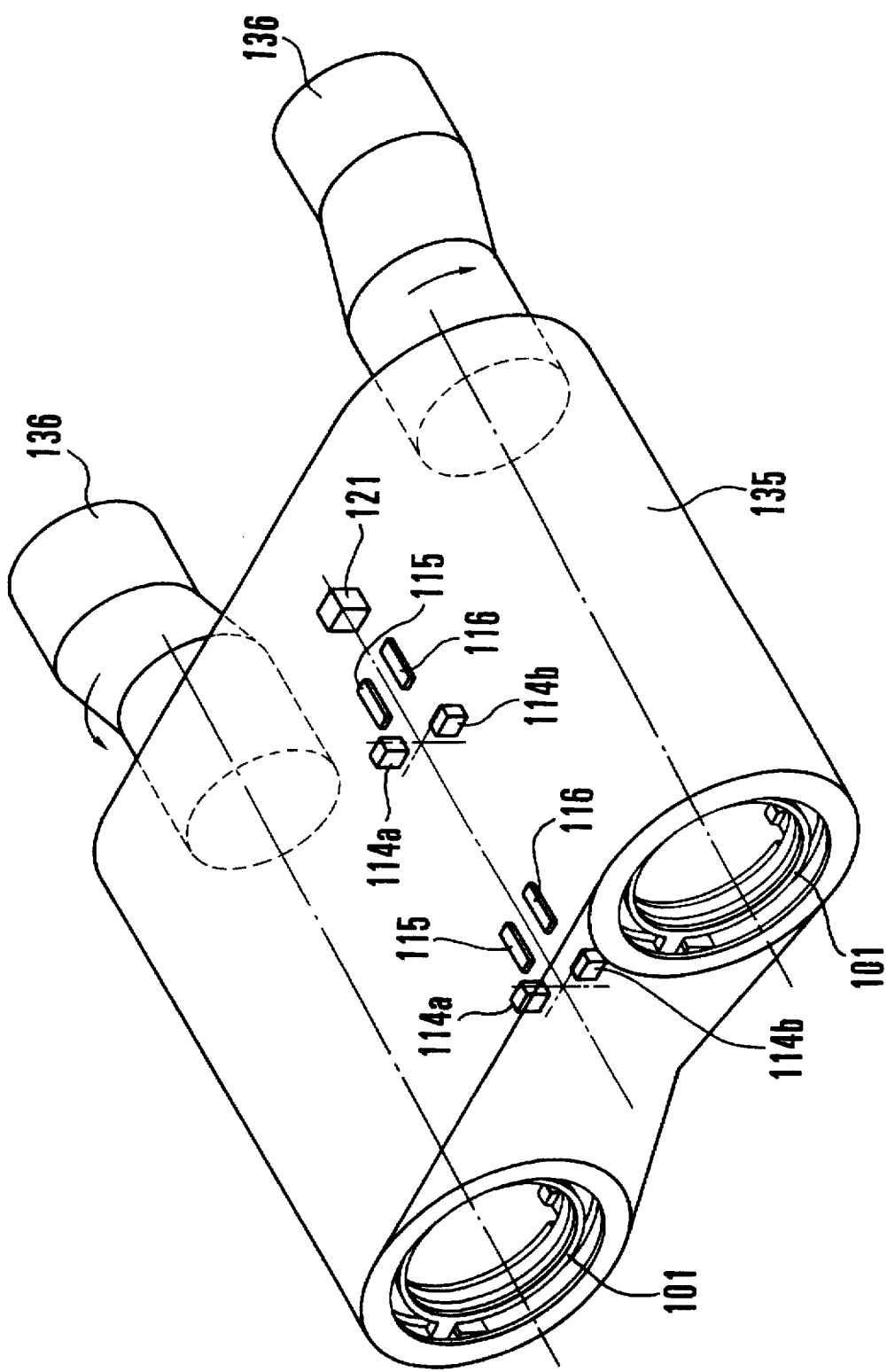
FIG. 20 is an oblique view showing in outline a binocular which is a seventh embodiment of this invention.

FIG. 20 shows in outline a binocular arranged as a seventh embodiment of this invention. In FIG. 20, the same reference numerals as those of FIGS. 15 and 16 indicate the parts arranged in the same manner as the parts already described. Therefore the details of them are omitted from the following description..

Referring to FIG. 20, an objective lens barrel 135 includes therein an erecting prism which is not shown but is arranged to erect an image formed by an objective lens, shake detectors 114a and 114b, a control circuit 115, a driving circuit 116, a power supply 121 and an image shake suppressing mechanism 101. With the exception of the power supply 121, these parts are paired with parts identical with them. One of each pair of these parts is arranged for a left lens barrel while the other is arranged for a right lens barrel. The positional relation of the shake detectors 114a and 114b to the image shake suppressing mechanism 101 is identical with the positional relation obtained in the fifth embodiment. Eyepiece lens barrels 136 which include eyepieces (not shown) are rotatably attached to the objective lens barrel 135 and are arranged to be turned around in the directions of the arrows in adjusting a pupil distance.

The image stabilizing operation of the seventh embodiment is similar to that of the fifth embodiment which has already been described and is therefore omitted from the following description. However, the seventh embodiment differs from the fifth embodiment in the following point: in the case of the seventh embodiment, the image shake suppressing mechanisms, the optical systems, the two shake detectors 114a and 114b are arranged in two sets within one objective lens barrel 135. Therefore, when the eyepiece lens barrels 136 are turned around for pupil distance adjustment, the two pairs of the shake detectors 114a and 114b do not turn around as they are arranged within the objective lens barrel 135. Their positional relations to the image shake suppressing mechanisms 101 thus do not change. Therefore, no erroneous driving amounts will be transmitted to the coils 106a and 106b.

The problem mentioned in the foregoing thus can be solved by this arrangement. Further, since the shake detectors 114a and 114b can be freely disposed in desired positions within the objective lens barrel 135, the arrangement gives some space allowance.

(Eighth Embodiment)

Figure 21:
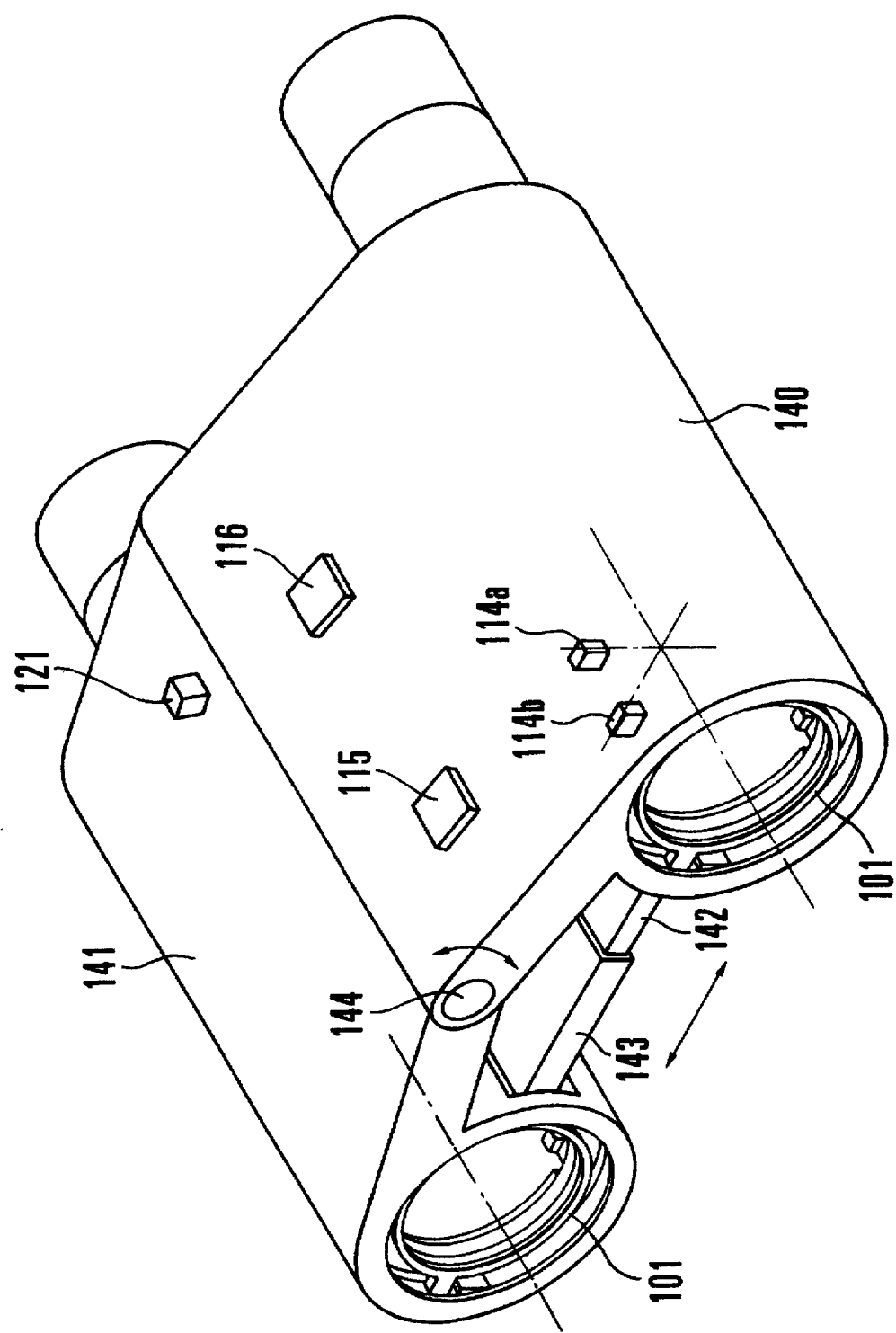
FIG. 21 is an oblique view showing in outline a binocular which is an eighth embodiment of this invention.

FIG. 21 shows in outline a binocular which is an eighth embodiment of this invention. In FIG. 21, the same reference numerals as those used for the fifth embodiment indicate the same parts. These same parts are therefore omitted from the following description.

In FIG. 21, reference numerals 140 and 141 denote lens barrels. Within these lens barrels 140 and 141, eyepieces, objective lenses and erecting prisms which are not shown and image shake suppressing mechanisms 101 are respective arranged in pairs. Further, a control circuit 115, a driving circuit 116 and a power supply 121 are also arranged within the lens barrels 140 and 141. These parts may be disposed inside of either of the lens barrels 140 and 141. The shake detectors 141a and 141b are secured to some part of each of the image shake suppressing mechanisms 101.

The image stabilizing operation of the eighth embodiment is performed in the same manner as the fifth embodiment and is, therefore, omitted from description. The positional relation of the shake detectors 114a and 114b to the image shake suppressing mechanisms 101 is the same as the relation mentioned in the foregoing with respect to the fifth embodiment. A connecting shaft 142 is connected to the image shake suppressing mechanisms passing through a cutout part which is not shown but is provided in the lens barrel 141. A connecting tube 143 which is arranged to slide over and in parallel to the connecting shaft 142 in the direction of arrow, as shown in FIG. 21, is also connected to the image shake suppressing mechanisms 101 passing through a cutout part of the lens barrel 140 in a manner similar to the connecting shaft 142. A pivot shaft 144 is arranged to pivotally interconnect the lens barrels 140 and 141.

When the pupil distance of the binocular which is the eighth embodiment is changed, the binocular operates as follows: the lens barrels 140 and 141 turn around on the pivot shaft 144 in the directions of arrows. At the same time, the image shake suppressing mechanisms 101 slide in parallel to each other in the directions of arrows indicated in the lower part of the drawing. Since the shake detectors 114a and 114b are secured to each of the image shake suppressing mechanisms 101, they just slide also in parallel. Image shakes, therefore, can be correctly suppressed even when the pupil distance is adjusted in the above-stated manner.

With the binocular arranged in this manner, the problem mentioned in the foregoing can be solved.

(Ninth Embodiment)

Figure 22:
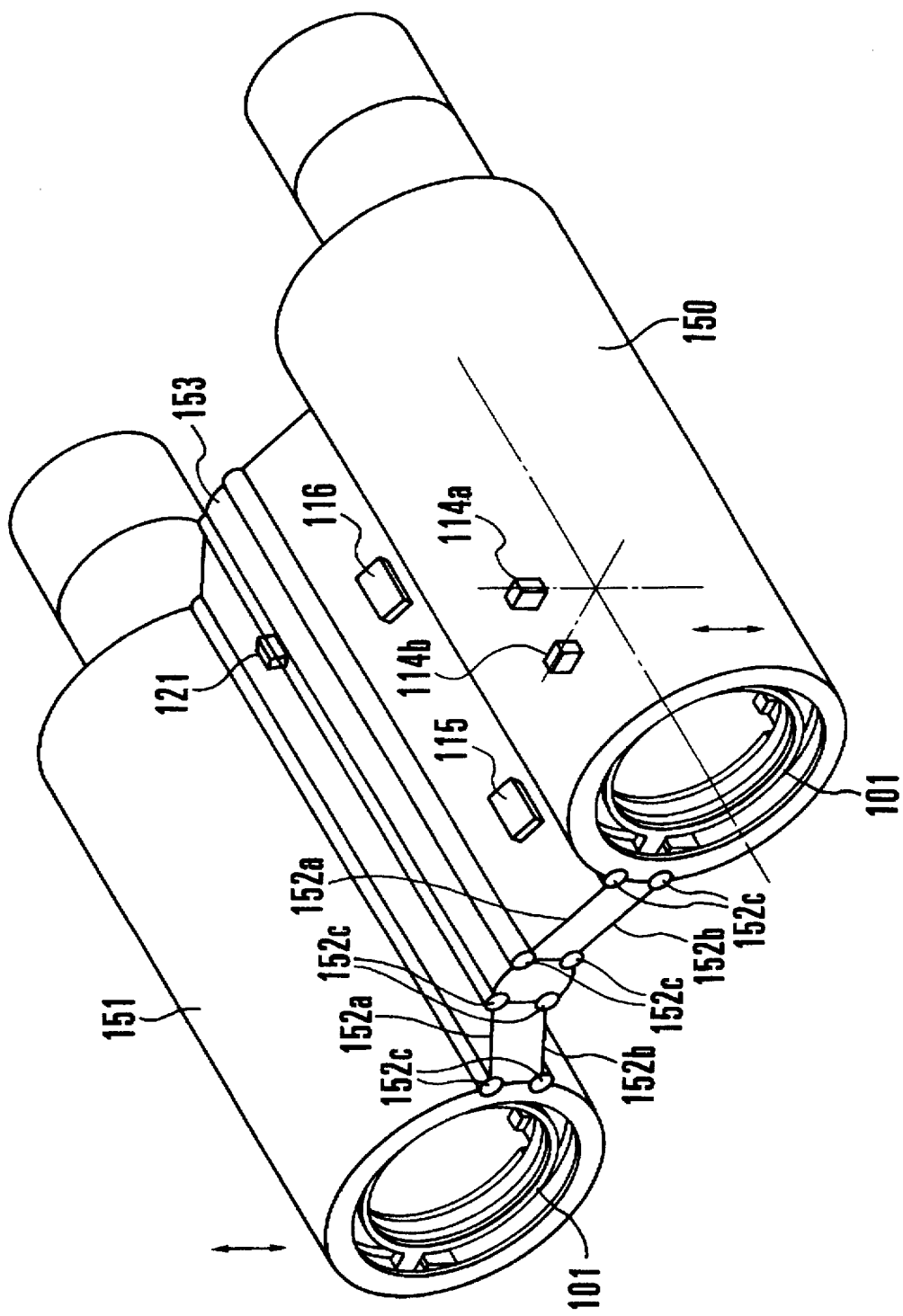
FIG. 22 is an oblique view showing in outline a binocular which is a ninth embodiment of this invention.

FIG. 22 shows in outline a binocular which is arranged as a ninth embodiment of this invention. In FIG. 22, parts indicated by the same reference numerals as in FIGS. 15 and 16 are the same parts already described in the foregoing. Therefore, the details of these parts are omitted from the following description.

Referring to FIG. 22, lens barrels 150 and 151 include therein eyepieces, objective lenses and erecting prisms which are not shown and image shake suppressing mechanisms 101 which are respectively arranged in pairs. The shake detectors 114a and 114b are disposed at either of the pair of lens barrels. The relation of the shake detectors 114a and 114b to the image shake suppressing mechanism 101 is similar to the relation obtained in the fifth embodiment. Connecting beams 152a and 152b are arranged to form parallelograms in conjunction with connecting shafts 152c. The connecting shafts 152c are arranged respectively at a pivot shaft 153 and the lens barrels 150 and 151. The connecting beams 152a and 152b have equal lengths. The connecting shafts 152c which are connected in pairs respective to the lens barrels 150 and 151 and the pivot shaft 153 are also equal in length to each other. Although FIG. 22 is simplified for the sake of illustration of operation, the connecting beams 152a and 152b are covered with elastic members which are not shown. The control circuit 115, the driving circuit 116 and the power supply 121 are disposed within spaces formed by the connecting beams 152a and 152b. These parts of course never come out of order when the lens barrel 151 is moved on the pivot shaft 153.

When the pupil distance is changed, the ninth embodiment operates as follows: the lens barrels 150 and 151 move on the pivot shaft 153 through the connecting beams 152a and 152b and the connecting shafts 152c. Since the parallelograms are formed as mentioned above, the lens barrel 151 does not rotate. In other words, the pupil distance adjustment only causes the lens barrels 150 and 151 to move upward and downward in parallel to each other. The relation of the shake detecting directions of the shake detectors 114a and 114b to the pitching and yawing directions of each image shake suppressing mechanism 101 remains unchanged by the pupil distance adjustment, so that image shakes can be adequately suppressed.

The problem mentioned in the foregoing thus can be solved by the arrangement of the ninth embodiment.

(Tenth Embodiment)

Figure 23:
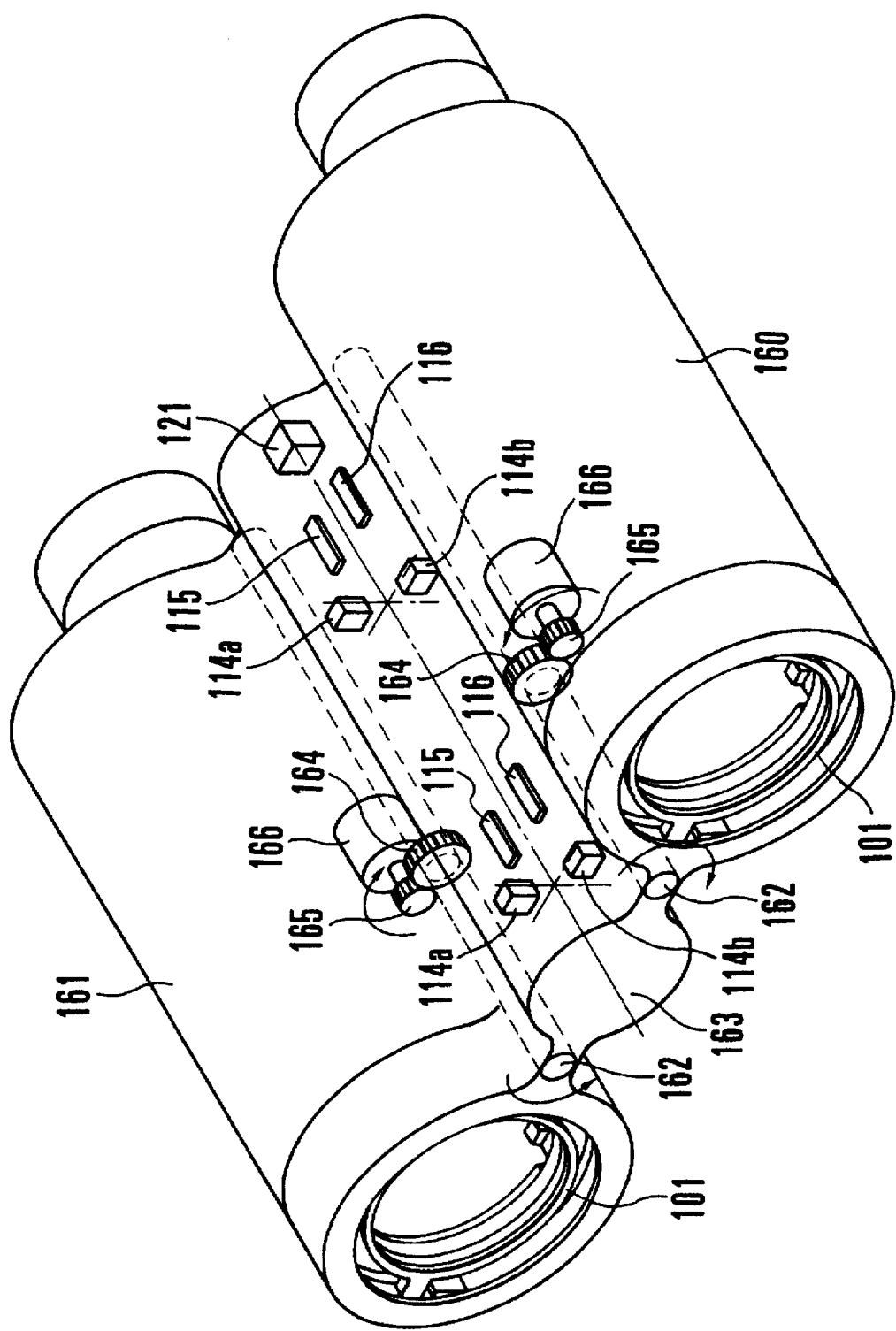
FIG. 23 is an oblique view showing in outline a binocular which is a tenth embodiment of this invention.

FIG. 23 shows in outline a binocular which is arranged as a tenth embodiment of this invention. In FIG. 23, parts indicated by the same reference numerals as in FIGS. 15 and 16 are the same parts that have already been described and, therefore, the details of them are omitted from the following description.

Referring to FIG. 23, lens barrels 160 and 161 contain eyepieces, objective lenses and erecting prisms which are not shown, image shake suppressing mechanisms 101 and rotary encoders 166 and gears 165. Connecting shafts 162 are arranged to connect the pair of lens barrels 160 and 161 to a pivot shaft 163. Gears 164 are secured to the connecting shafts 162. When the lens barrel 160 and 161 are turned around on the pivot shaft 163, the connecting shafts 162 rotate relative to the pivot shaft 163. The pivot shaft 163 contains therein shake detectors 114a and 114b, control circuits 115 and driving circuits 116, which are respectively arranged in pairs. The rotary encoder 166 are secured to the inside of the lens barrels 160 and 161.

The image stabilizing operation of the tenth embodiment is described as follows: when the binocular shakes, the shake is detected by the shake detectors 114a and 144b as deflection amounts. At each of the rotary encoders 166, an angle formed between the lens barrel 161 and the pivot shaft 163, i.e., a relative angle between an axis defined by the shake detectors 114a and 114b and an axis defined by the coils 106a and 106b, is detected. The deflection amounts and the relative angle are inputted to the control circuit 115. At the control circuit 115, a driving amount at which the variable angle prism (VAP) is to be driven is decided according to the deflection amounts and the relative angle. The driving amount thus decided is transmitted to the coil driving circuit 116. At the coil driving circuit 116, the driving amount is converted into a coil driving amount to which the coils 106a and 106b can be driven. Meanwhile, signals which are obtained with light fluxes emitted from light emitting elements 112a and 112b (not shown) and coming to the light receiving elements 113a and 113b through the slits 110a and 110b are supplied to the control circuit 115. The control circuit 115 compares the VAP driving amount and the actual driving amount. A difference between the two amounts is supplied to the coil driving circuit 116. The above-stated angle is detected in the following manner: in changing the pupil distance of the binocular, the lens barrels 160 and 161 are turned around on the pivot shaft 163. The connecting shafts 162 rotate simultaneously with the lens barrels 160 and 161. The gears 164 which are secured to the connecting shafts 162 also rotate at the same time. Further, since the gears 164 engages the gears 165, the gears 165 also rotate. The rotary encoders 166 then output angle signals corresponding to the amounts of rotation of the gears 165. The tenth embodiment is thus arranged to electrically detect an angle by means of the rotary encoder and to decide the VAP driving amount according to the angle and the detected amount obtained by the shake detector 114a when the pupil distance of the binocular is changed. Therefore, image shakes can be adequately suppressed, because no erroneous information on the driving amount is transmitted.

The tenth embodiment is thus arranged to be capable of solving the problem mentioned in the foregoing.

(Eleventh Embodiment)

Figure 24:
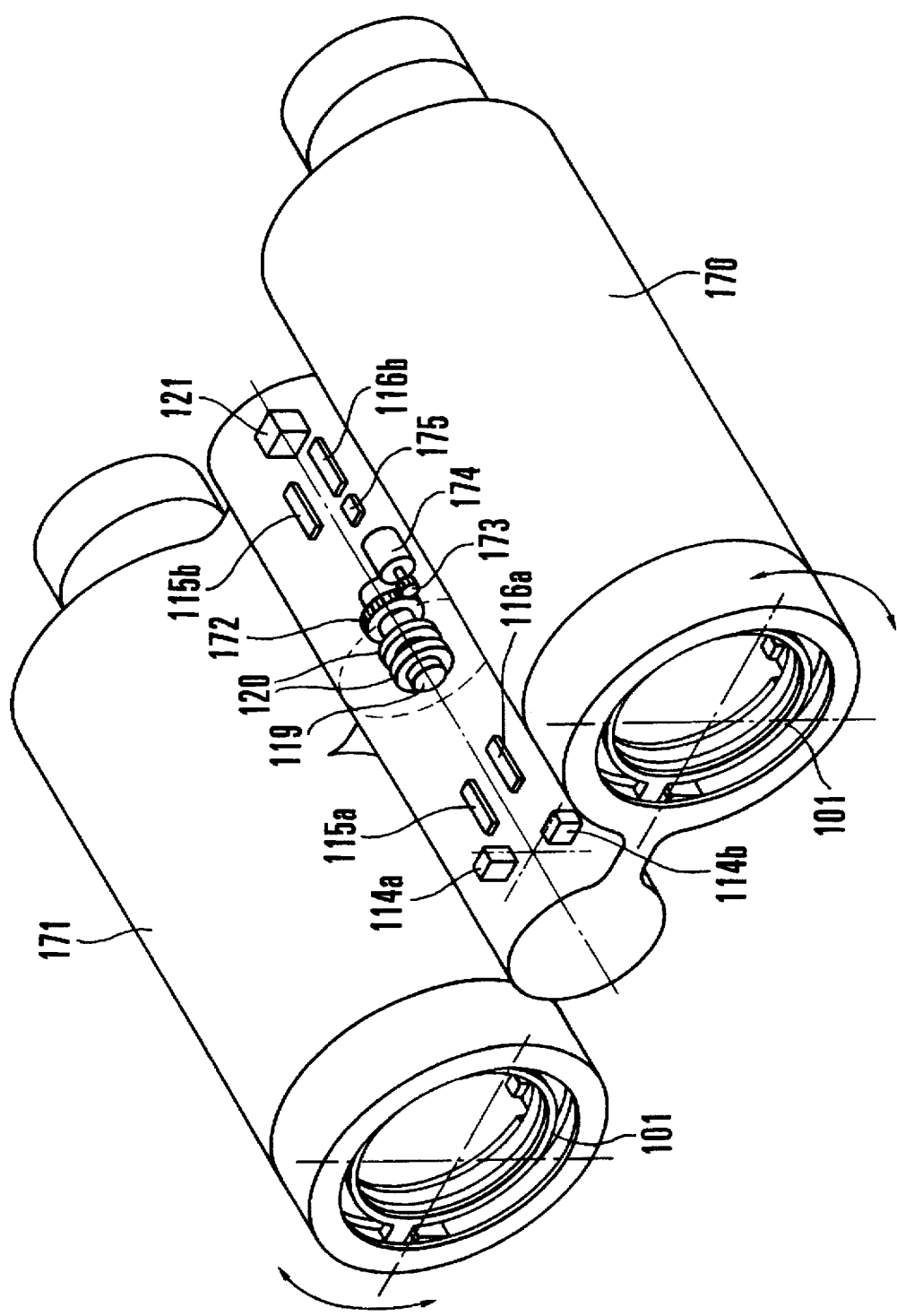
FIG. 24 is an oblique view showing in outline a binocular which is arranged as an eleventh embodiment.

FIG. 24 shows in outline a binocular which is arranged as an eleventh embodiment of this invention. In FIG. 24, parts indicated by the same reference numerals as in FIGS. 15 and 16 are arranged in the same manner as the parts already described and, therefore, the details of them are omitted from the following description.

Referring to FIG. 24, a left lens barrel 170 is arranged in the same manner as the lens barrel 117 of FIGS. 15 and 16. A right lens barrel 171 is arranged also in the same manner as the lens barrel 118 of FIGS. 15 and 16. An objective lens of the image shake suppressing mechanism 101, an eyepiece and erecting prism which are not shown are arranged inside of each of the lens barrels 170 and 171. The left and right lens barrels 170 and 171 are interconnected by a connecting shaft 119 and a bearing 120 in the same manner as in the case of FIGS. 15 and 16. A gear 172 is disposed within the right lens barrel and is secured to an external circumferential face of the connecting shaft 119. A gear 173 is disposed also within the right lens barrel and is arranged on a rotary encoder 174 to engage the gear 172. The rotary encoder 174 is arranged to detect how much the right lens barrel 171 has turned around with respect to the left lens barrel 170. A correction control circuit 175 is arranged to convert the deflection amounts obtained by the shake detectors 114a and 114b on the basis of an angular amount obtained from the rotary encoder 174.

The image stabilizing operation of the eleventh embodiment is described as follows: when the binocular shakes, the shake detectors 114a and 114b which are secured to the left lens barrel 170 detect the shake as deflection amounts. The rotary encoder 174 detects how much the right lens barrel 171 has turned around with respect to the left lens barrel 170 as mentioned above. The deflection amounts detected on the side of the left lens barrel 170 are inputted to the control circuit 115a within the left lens barrel 170. Within the right lens barrel 171, on the other hand, the correction control circuit 175 converts the deflection amounts on the basis of the angular amount detected by the rotary encoder 174. The converted amount is inputted to the control circuit 115b. At the control circuits 115a and 115b, variable angle prism (VAP) driving amounts are decided on the basis of these deflection amounts. The outputs of the control circuits 115a and 115b are transmitted respectively to the coil driving circuits 116a and 116b. The coil driving circuits 116a and 116b convert the VAP driving amounts decided by the control circuits 115a and 115b into driving amounts at which the coils 106a and 106b (not shown) can be driven. The converted driving amounts are transmitted. Meanwhile, light fluxes are emitted from the light emitting elements 112a and 112b (not shown) and received by the light receiving elements 113a and 113b (not shown) via the slits 110a and 110b (not shown). Signals which are thus obtained from the light receiving circuits 113a and 113b are supplied to the control circuit 115a and 115b to enable the control circuit 115a and 115b to compare the VAP driving amounts with actual driving amounts. Any difference values obtained through the comparison are supplied to the coil driving circuits 116a and 116b.

As described above, only one pair of shake detectors 114a and 114b is arranged in the case of the eleventh embodiment. However, the right lens barrel is arranged such that the deflection amounts obtained by the shake detectors 114a and 114b are converted by the correction control circuit 175 on the basis of a relative angle formed between the right and left lens barrel before the deflection amounts are supplied to the control circuits and, on the side of the left lens barrel, in the meantime, the deflection amounts obtained by the shake detectors 114a and 114b are supplied to the control circuits 115a and 115b as they are. Therefore, even when the pupil distance is changed, this arrangement ensures that the images obtained through the eyepieces can be seen as if the binocular is not shaking.

The gears 172 and 173 and the rotary encoder 174 are disposed within the right lens barrel 171. However the same advantage can be attained by changing this arrangement to have them disposed within the left lens barrel 170 instead of the right lens barrel 171. Further, the shake detectors 114a and 114b likewise may be disposed within the right lens barrel 171 instead of having them disposed within the left lens barrel 170.

(Twelfth Embodiment)

Figure 25:
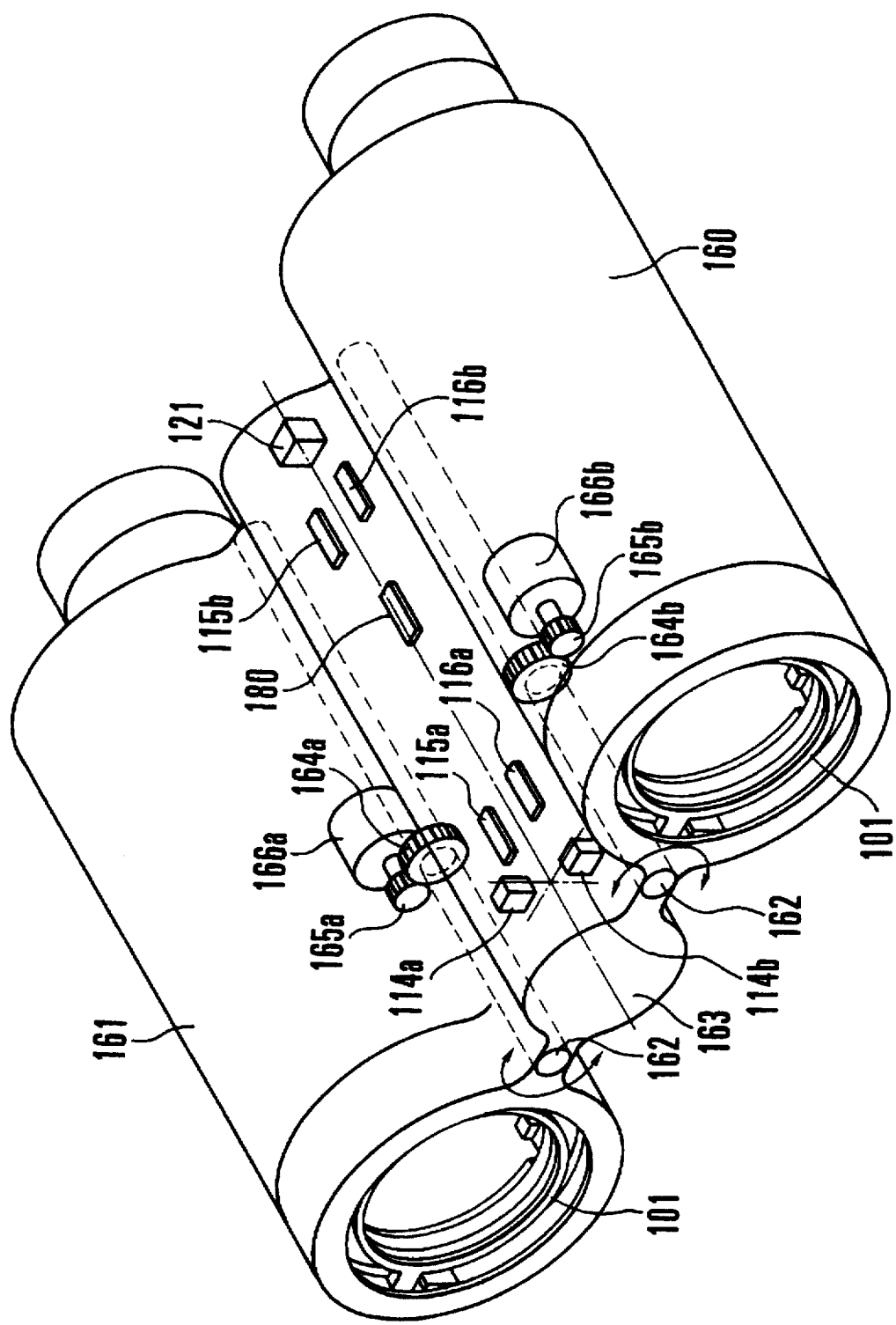
FIG. 25 is an oblique view showing in outline a binocular which is arranged as a twelfth embodiment.

FIG. 25 shows in outline a binocular arranged as a twelfth embodiment of this invention. In this case, the arrangement of the binocular which is the tenth embodiment is changed to have only one pair of shake detectors. In FIG. 25, parts indicated by the same reference numerals as in FIG. 23 are arranged in the same manner as those shown in FIG. 23 and, therefore, the details of them are omitted from the following description. The basic operation of the twelfth embodiment is also performed the same as that of the tenth embodiment.

Referring to FIG. 25, a correction control circuit 180 is arranged to convert deflection amounts obtained by the shake detectors 114a and 114b on the basis of angles which are formed between the pivot shaft 163 and the lens barrels 160 and 161 and detected by rotary encoders 166a and 166b. The image stabilizing operation of the twelfth embodiment is as described below:

When the binocular shakes, the shake is detected by the shake detectors 114a and 114b as deflection amounts. The rotary encoders 166a and 166b then detect angles formed between the left lens barrel 160 and the pivot shaft 163 and between the right lens barrel 161 and the pivot shaft 163. At the correction control circuit 180, the deflection amounts are converted on the basis of the angles thus obtained. The converted deflection amounts are inputted to the control circuits 115a and 115b. The control circuits 115a and 115b then decide, on the basis of these deflection amounts, driving amounts to which the variable angle prisms (VAPs) are to be driven. The driving amounts thus decided are transmitted to the coil driving circuits 116a and 116b. The coil driving circuits 116a and 116b then convert the driving amounts decided by the control circuits 115a and 115b into amounts at which the coils 106a and 106b can be driven and transmit them. Meanwhile, light fluxes are emitted from the light emitting elements 112a and 112b (not shown) and are received through the slits 110a and 110b (not shown) by the light receiving elements 113a and 113b (not shown). Signals thus obtained from the light receiving elements 113a and 113b are inputted to the control circuits 115a and 115b. Then, the driving amounts to which the variable angle prisms are to be driven and the actual driving amounts are compared. Differences thus obtained are inputted to the coil driving circuits 116a and 116b.

The twelfth embodiment is thus arranged to convert the deflection amounts on the basis of angular values representing angles between the pivot shaft and the lens barrels and to drive the variable angle prisms according to the converted values. Therefore, image shakes can be suppressed without fail.

In the cases of the fifth to twelfth embodiments described, this invention is applied by way of example to binoculars as optical apparatuses. However this invention is not limited to binoculars and is applicable to any other optical apparatuses as long as they are of the kind having shake detecting means and having one of image shake correcting means which operate in response to the outputs of the shake detecting means arranged to be displaceable.

Figure 26:
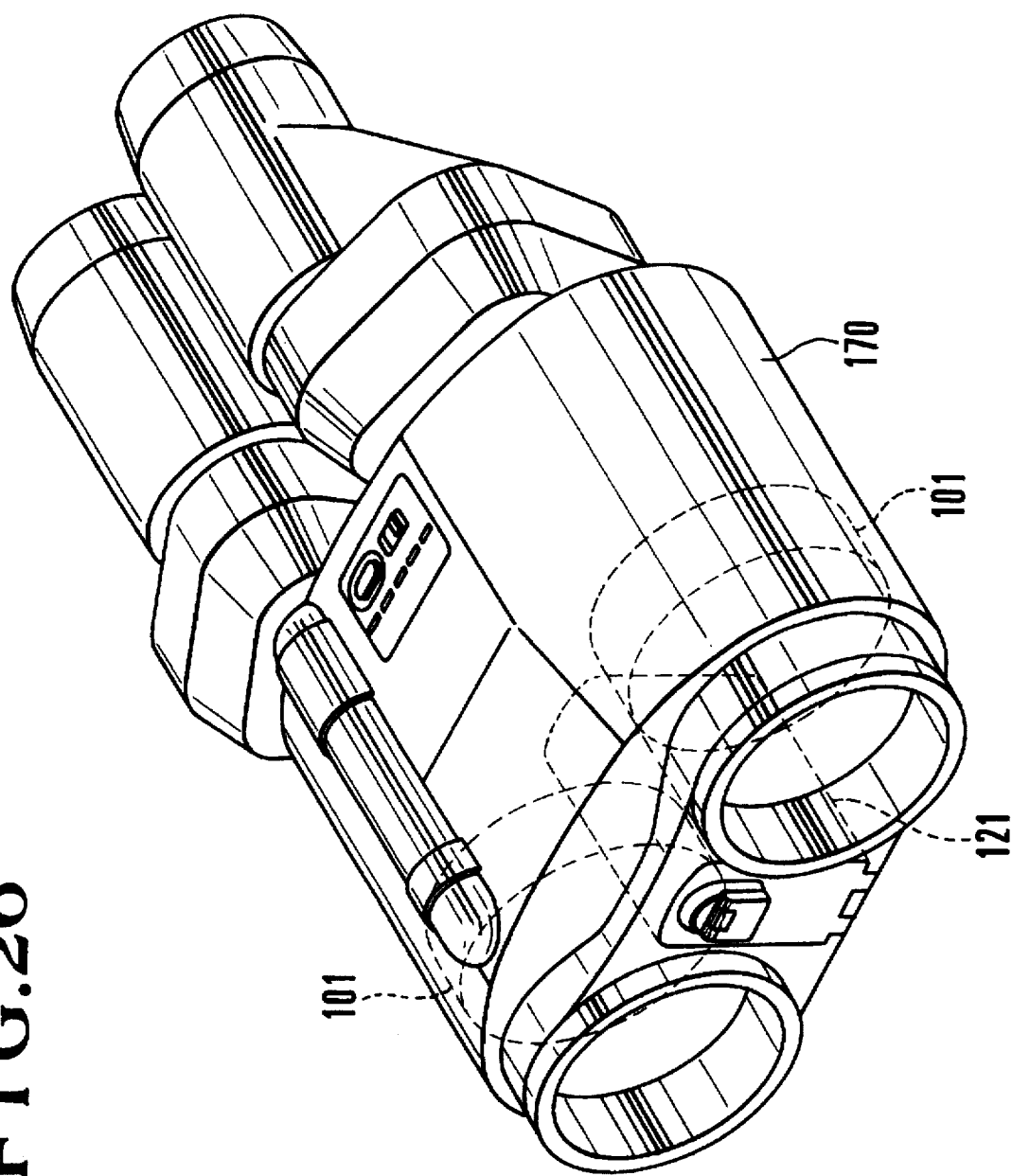
FIG. 26 is an oblique view showing in outline another example of arrangement of an image shake suppressing mechanism included in a lens barrel.

Further, in each of the embodiments described, the image shake suppressing mechanisms 101 are disposed in the foremost positions of the binocular. However, the position may be changed to an inner position of each lens barrel as shown by way of example by a broken lines in FIG. 26, which shows an example of a binocular having the image shake suppressing mechanisms. In FIG. 26, a reference numeral 170 denotes a lens barrel. The parts of the binocular which are arranged in the same manner as those shown in other drawings are indicated by the same reference numerals and the details of them are omitted from description. Further, the embodiments described are arranged to have built-in power sources. However, this invention is applicable also to optical apparatuses of the kind arranged to permit supply of power from outside. In cases where the image shake suppressing mechanisms are to be driven with the power supplied from outside, the apparatus may be arranged to inhibit the supply of power from the built-in power source and to give priority to the power supplied from an external power source.

Figure 27:
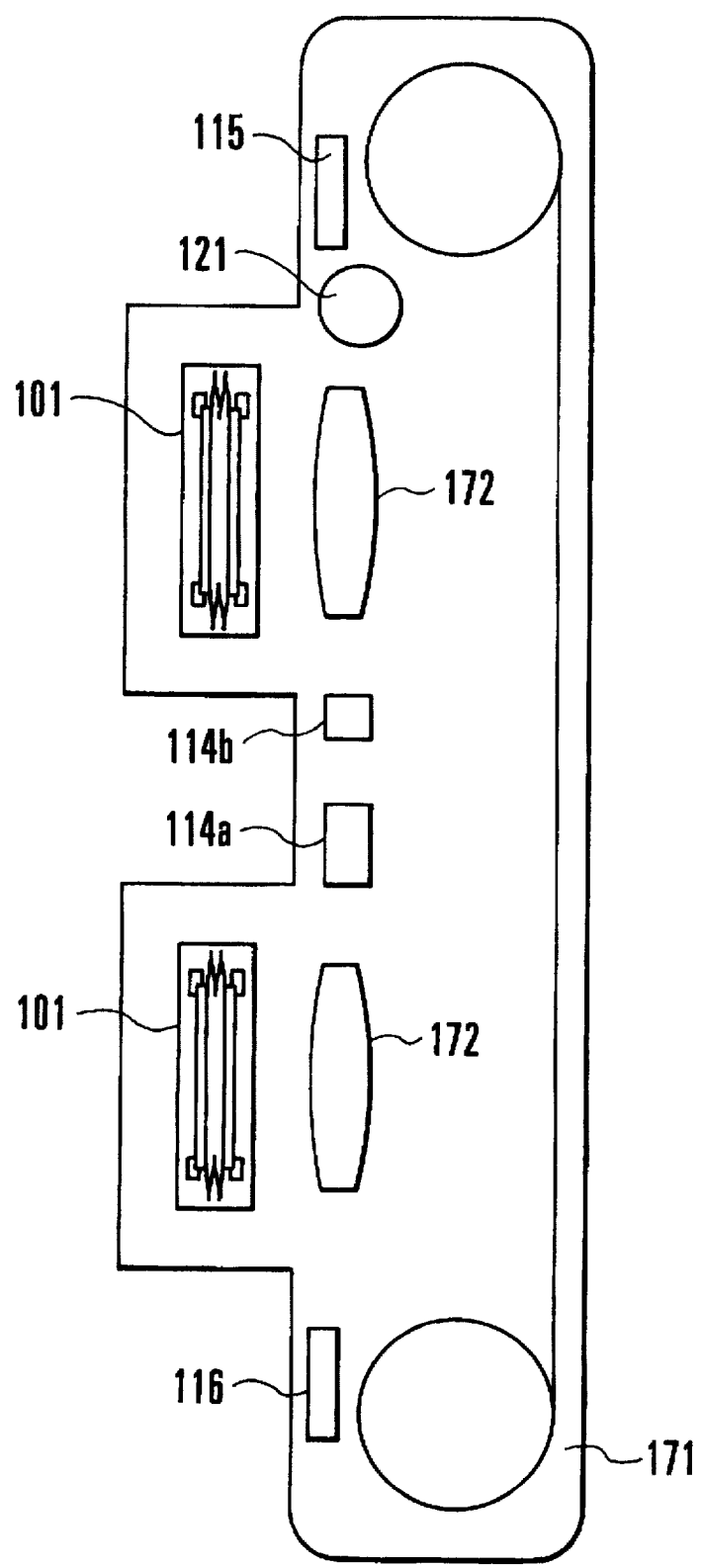
FIG. 27 shows by way of example an image shake suppressing mechanism as applied to a stereoscopic camera which is arranged for stereoscopic photography.

FIG. 27 shows by way of example a case where the image shake suppressing means arranged according to this invention as described in the foregoing is applied to a stereoscopic camera which permits taking a stereoscopic photograph. In FIG. 27, parts indicated by the same reference numerals as those of the embodiments described in the foregoing are arranged in the same manner as those of the embodiments and, therefore, the details of them are omitted from the following description. The image shake suppressing procedures are also similar to those of the embodiments describes and, therefore, are also omitted.

Referring to FIG. 27, the body 171 of the stereoscopic camera is arranged to carry image shake suppressing mechanisms 101, shake detectors 114a and 114b, a control circuit 115, a driving circuit 116, a power supply 121 and the lenses 172 of optical systems.

When a camera is being held in a user's hands, camera shakes during taking of a picture can occur. The camera shake is detected by the miniature shake detectors in a manner as described in the foregoing. Optical axes are deflected by driving the variable angle prisms on the basis of the amounts of shake or deflection. As a result, an image thus obtained becomes a still image to permit taking a sharp picture.

Like the embodiment described above, the stereoscopic camera uses one power supply in driving the image shake suppressing mechanisms, the shake detectors, the control circuit and the driving circuit. The camera also uses only one pair of shake detectors. However, the object of this invention is attainable by detecting shakes of the camera by one pair of shake detectors and driving the right and left shake suppressing mechanisms alike.

The arrangement, therefore, permits reduction in size of the stereoscopic camera and, therefore, reduction in electric energy consumption.

Further, while the image shake suppressing mechanisms are disposed in the front parts of the stereoscopic camera in the same manner as the embodiments described in the foregoing, the image shake suppressing mechanisms may be disposed in the rear parts of the stereoscopic camera. The stereoscopic camera described is of the kind having two lenses. However, the image shake suppressing mechanism of this invention is applicable also to a stereoscopic photographing system having more than two lenses.

Each of the fifth to twelfth embodiments of this invention described in the foregoing is provided with image shake detecting means and image shake correcting means which is arranged to correct image shakes according to the output of the image shake detecting means. When a displacement takes place in either the shake detecting means or the shake correcting means to cause a deviation in the action of the other, the other means is caused to act in such a way as to offset the deviation. The shake detecting means and the shake correction means are arranged to be in such a correlation that in the event of occurrence of the displacement, an inaccurate image shake correction can be prevented by the correlation between the image shake detecting and correcting means.

Further, each of the fifth to twelfth embodiments is arranged to correct a deviation in the action of either of the shake detecting means or the shake correcting means which corrects image shakes according to the output of the shake detecting means when the deviation is caused by the displacement of the other. When the displacement takes place, therefore, the other of the two means is caused to adequately act on one of the two means, so that the image shake correcting action can be prevented from being inaccurately carried out due to the deviation.

The fifth to twelfth embodiments of have the following advantages: an apparatus which permits obtaining images in an adequately stabilized state can be compactly arranged. With the apparatus provided with means for giving priority to an external power supply, the internal power supply can be effectively used.

(Thirteenth Embodiment)

Figure 28:
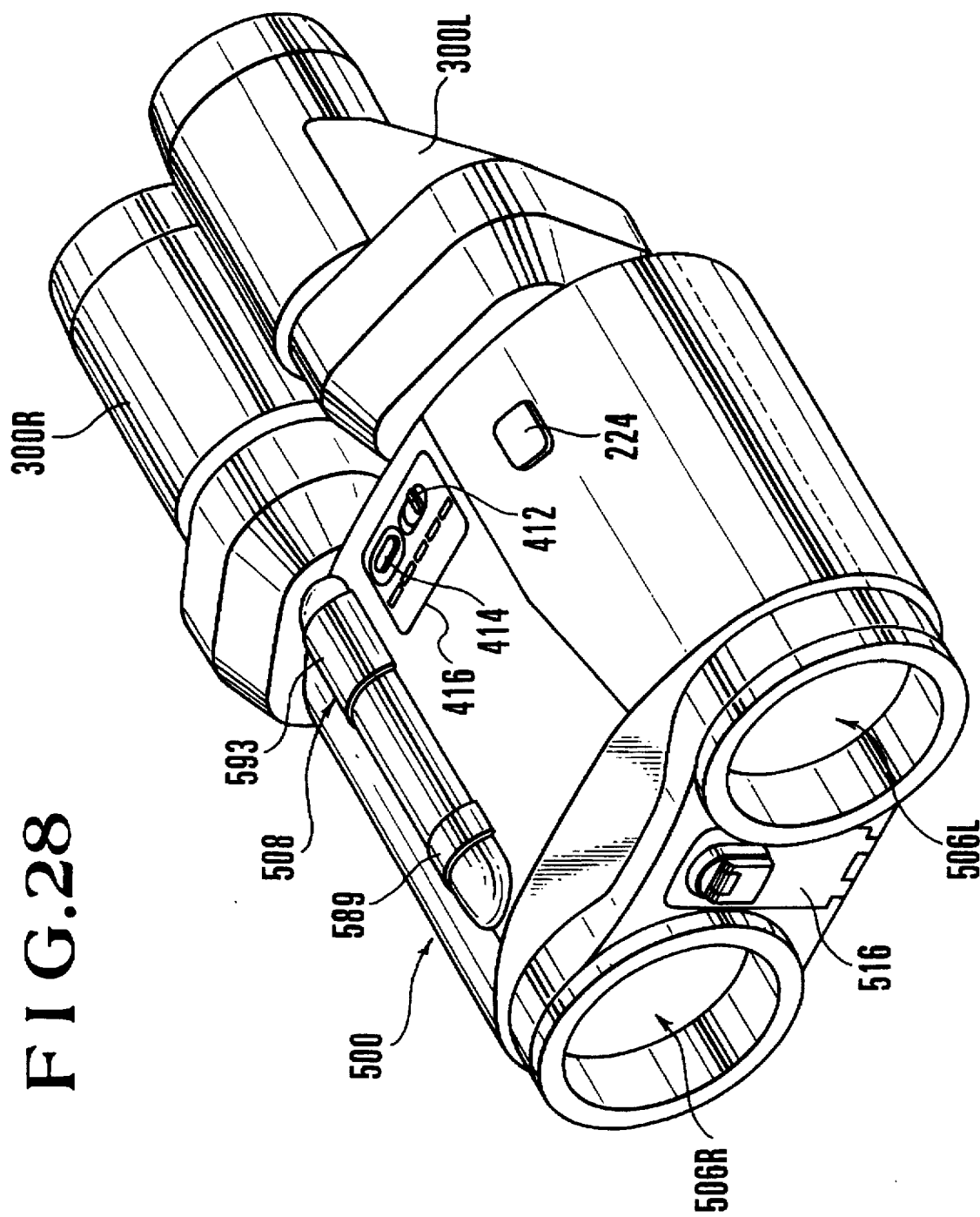
FIG. 28 is an oblique view showing a binocular arranged as a thirteenth embodiment of this invention.
Figure 29:
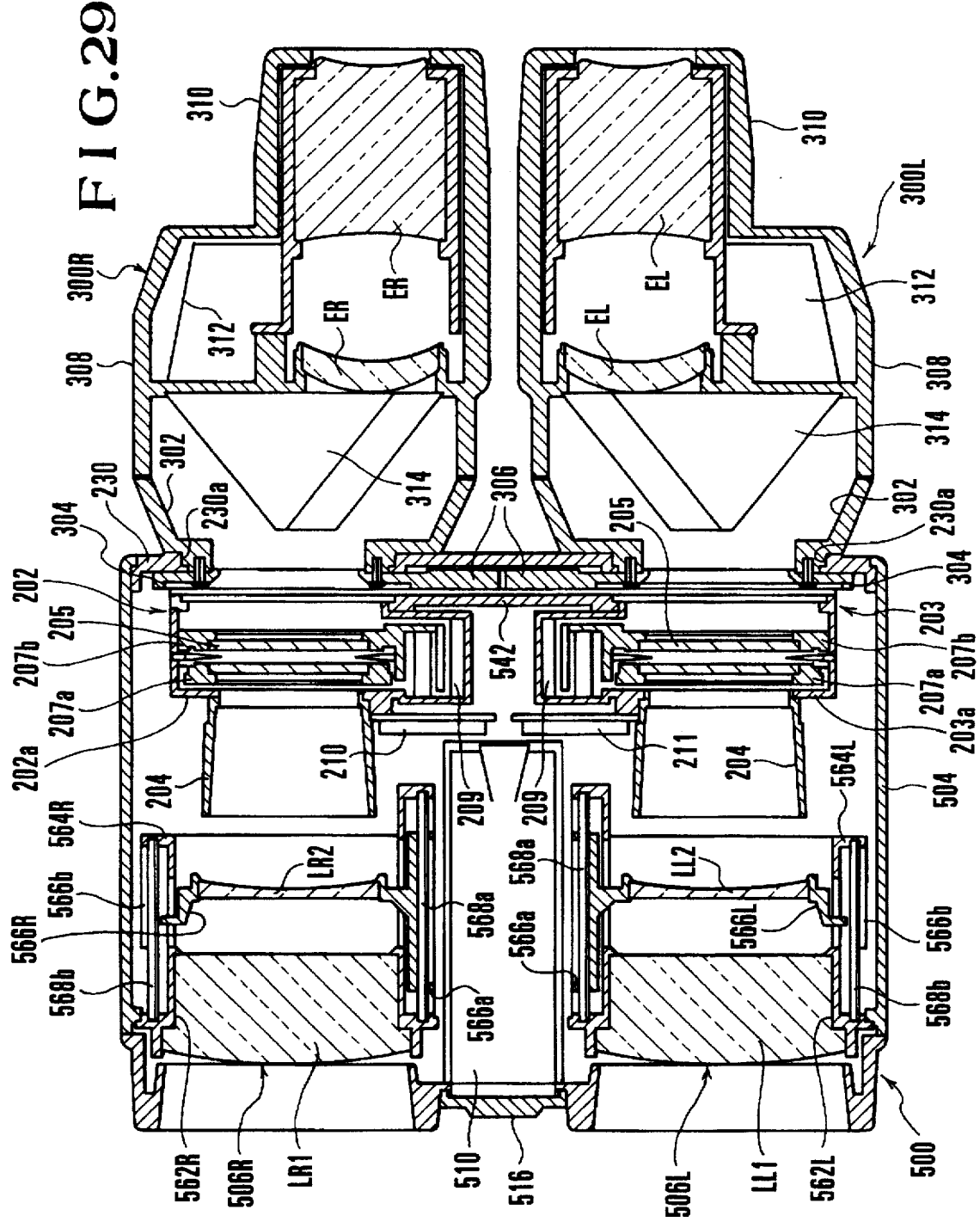
FIG. 29 is a transverse cross sectional view showing the arrangement of the binocular of FIG. 28.
Figure 30:
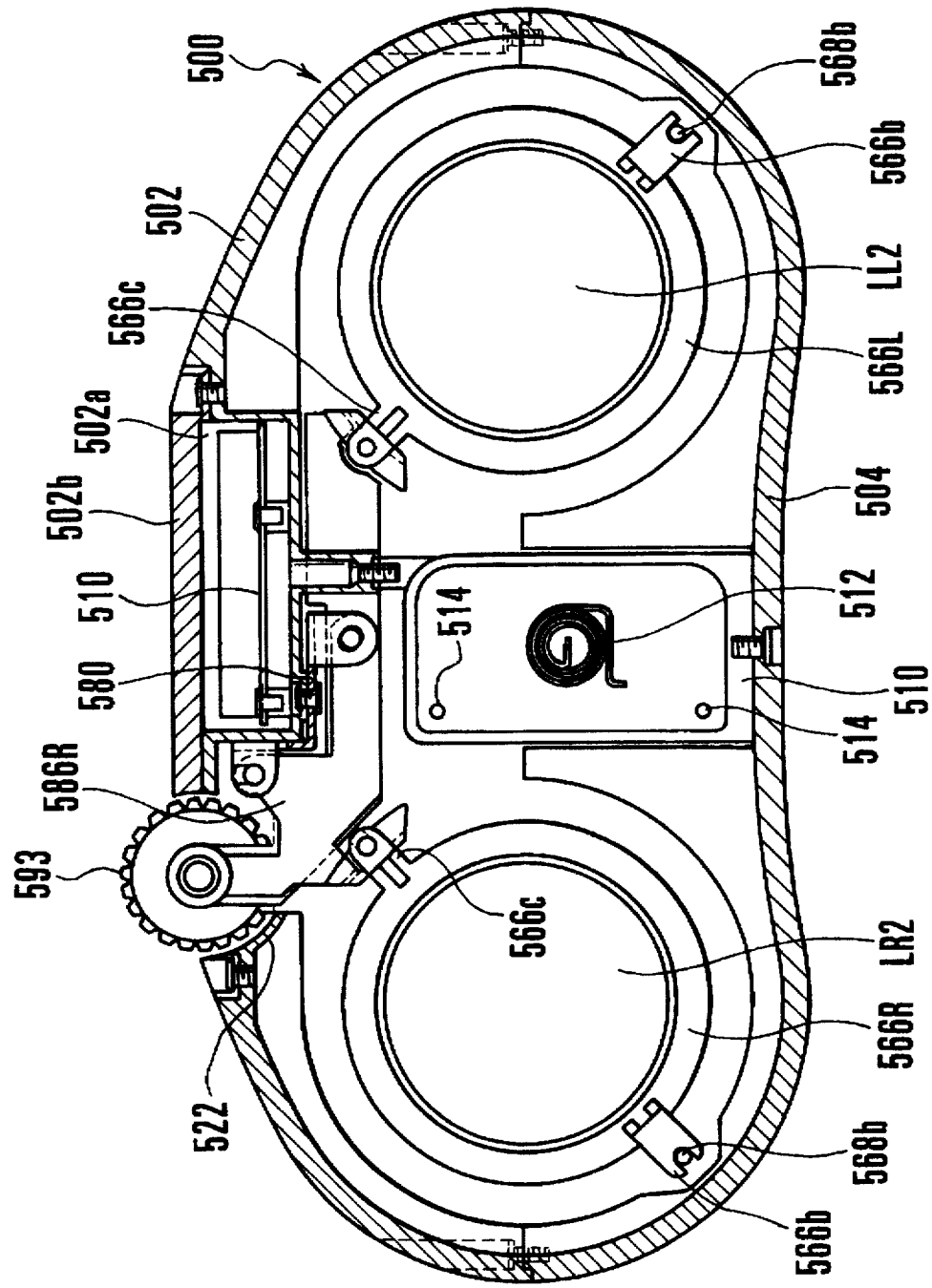
FIG. 30 is a front vertical sectional view of the binocular of FIG. 28.

FIG. 28 is an oblique view showing a binocular arranged as a thirteenth embodiment of this invention. FIG. 29 is a transverse cross sectional view of the same binocular. FIG. 30 is a front vertical view of the same binocular. In these drawings, a reference numeral 500 denotes the body of the binocular. Numerals 300R and 300L denote the bodies of a pair of ocular prism units provided on the binocular body 500.

The binocular body 500 is composed of an upper shell 502 and an lower shell 504. A pair of objective lens units 506R (for the right eye) and 506L (for the left eye) are arranged at one end of the lower shell 504 on the side of the object. A pair of ocular prism unit bodies 300R and 300L are arranged at the other end which is on the ocular side of the binocular. As shown in FIG. 29 and in FIG. 31 which is an enlarged view of essential parts, the objective lens units 506R and 506L have objective lens tubes 562R and 562L. Objective lenses LR1 and LL1 are carried by the objective lens tubes 562R and 562L. Guide lens tubes 564R and 564L are carried by the objective lens tubes 562R and 562L on the ocular side of the objective lens tubes 562R and 562L. The guide lens tubes 564R and 564L contain therein focus lens tubes 566R and 566L which carry focus lenses LR2 and LL2. A pair of guide bars 568a and 568b are arranged between each of the flange parts of the objective lens tubes 562R and 562L and each of the protruding parts of the guide lens tubes 564R and 564L. The guide bars 568a are inserted into the sleeves 566a of the focus lens tubes 566R and 566L. The guide bars 568b are inserted into the U-shaped protruding parts 566b of the focus lens tube 566R and 566L. These parts are arranged to carry the focus lens tubes 566R and 566L in such a way as to allow them to move in the directions of their optical axes.

Figure 31:
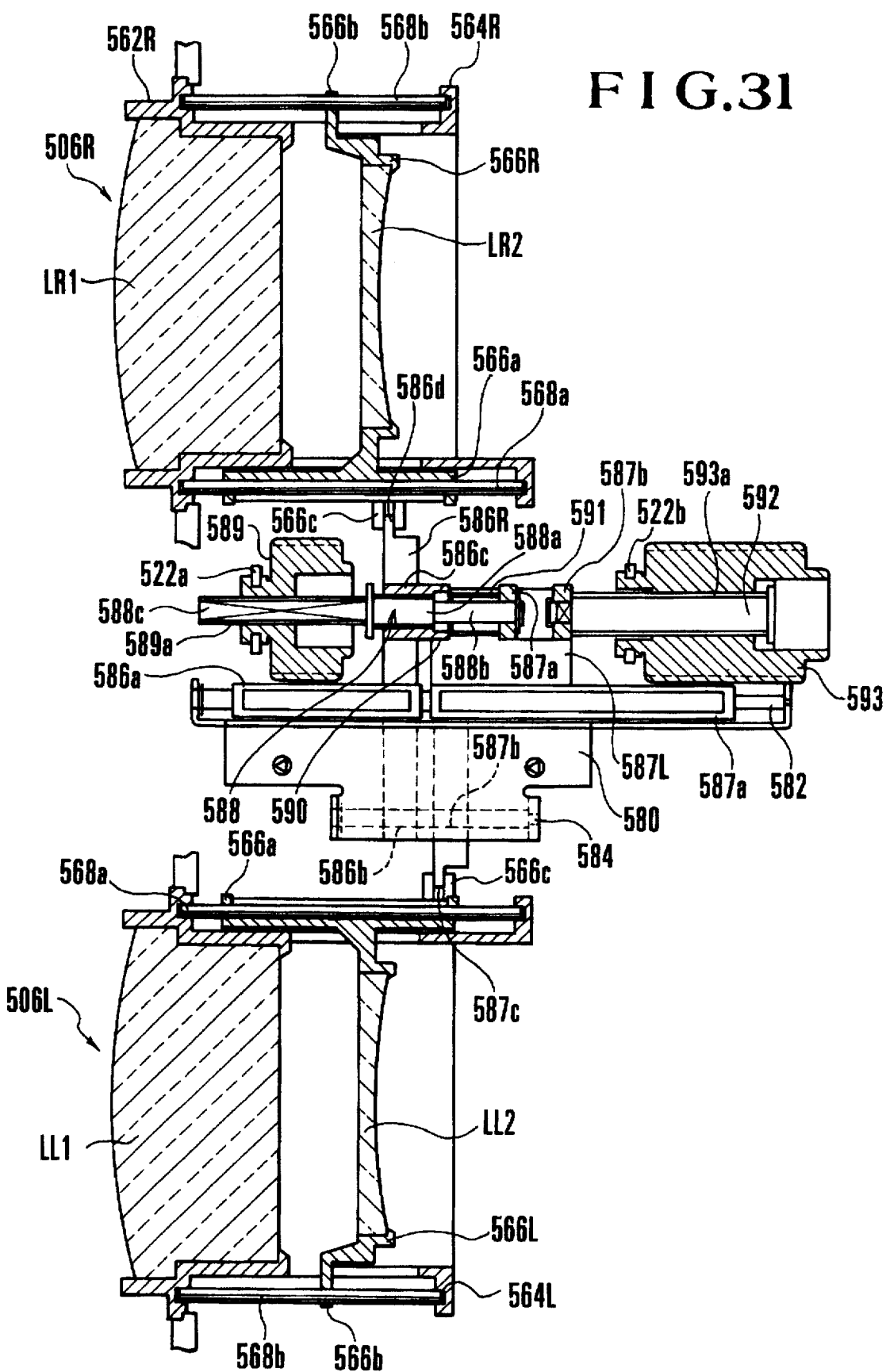
FIG. 31 is a sectional view showing a visual line, focus adjusting mechanism of the binocular shown in FIGS. 28 and 29 as the thirteenth embodiment.

A diopter and focus adjusting mechanism 508 is disposed between the objective lens units 506R and 506L. As shown in FIGS. 30 and 31, the diopter and focus adjusting mechanism 508 is contained in a adjusting mechanism housing part 522 formed on the upper shell 502 and has a guide support plate 580 which is carried by the upper shell 502. A focus guide shaft 582 and a rotation restricting shaft 584 are secured to the guide support plate 580. The focus guide shaft 582 is inserted into the sleeve 586a of a focus lens driving plate 586R which is arranged to drive the focus lens tube 566R on the right eye side in the direction of its optical axis and also into the sleeve 587a of the focus lens driving plate 587L which is arranged to drive the focus lens tube 566L on the left eye side in the direction of its optical axis. The rotation restricting shaft 584 is inserted into a rotation restricting hole 586b of the focus lens driving plate 586R and also into a rotation restricting hole 587b of the focus lens driving plate 587L. The focus lens driving plate 586R is provided with a focus feeding screw hole 586c. The thread part 588a of a diopter adjusting shaft 588 is in mesh with the screw hole 586c. At one end of the thread part 588a, a connecting shaft part 588b is formed to have a smaller diameter than the diameter of the thread part 588a. At the other end of the thread part 588b, a slide shaft part 588c is formed to include a rotation restricting flat face part. A diopter adjustment ring 589 is carried, in such a way as to be rotatable in its set position, by a semi-circular support part 522a of the adjusting mechanism housing part 522 of the upper shell 502. The diopter adjustment ring 589 is provided with a slide hole 589a into which the slide shaft part 588c of the diopter adjusting shaft 588 is inserted in such a way as to be axially slidable. A driving engagement projection 586d is formed on the focus lens driving plate 586R. The projection 586d engages an engagement groove 566c which is formed in the sleeve 566a of the focus lens tube 566R.

U-shaped bearing plate parts 587a and 587b are formed on the focus lens driving plate 587L. A connecting shaft part 588b of the diopter adjusting shaft 588 is inserted into the bearing plate part 587a through a retaining ring 590 and pressing Spring 591 which are arranged between the end face of the screw hole 586c of the driving plate 586R and the bearing plate part 587a. A focus screw shaft 592 is secured, in a non-rotating state, to the other bearing plate part 587b. A focus adjustment ring 593 is carried, in a state of being rotatable in a set position, by a semi-circular support part 522b of the adjusting mechanism housing part 522 of the upper shell 502. A focus screw shaft 592 is in mesh with a screw hole 593a provided in the focus adjustment ring 593. A driving engagement projection 587c is formed on the focus lens driving plate 587L. The driving engagement projection 587c engages the engaging groove 566c formed in the sleeve 566a of the focus lens tube 566L.

With the binocular arranged in this manner, when the focus adjustment ring 593 is turned around, the focus screw shaft 592 is moved in the direction of the optical axis to cause the focus lens driving plate 587L to be moved in the direction of the optical axis. As a result, the focus lens tube 566L is moved. At the same time, the diopter adjusting shaft 588 which is carried by the bearing plate part 587a and is pushed by the pressing spring 591 is moved in the direction of the optical axis. The focus lens driving plate 586R which is screw connected is then moved to move the focus lens tube 566R. At this time, the diopter adjustment ring 589 does not rotate. The slide shaft part 588c of the adjusting shaft 588 moves within the slide hole 589a. Focus adjustment is made with the focus lens tubes 566R and 566L thus moved. When the diopter adjustment ring 589 is turned around, the diopter adjusting shaft 588 which is slidably connected to the diopter adjustment ring 589 is caused to rotate in its set position. This rotation causes the focus feeding screw hole 586c which is in mesh with the thread part 588a of the diopter adjusting shaft 588 to move in the direction of the optical axis. The focus lens tube 566R on the side of the right eye is thus moved to effect diopter adjustment.

Variable angle prism (VAP) units 202 and 203 are arranged on a unit support plate 542 between each of the objective lens units 506R and 506L of the lower shell 504 and each of the ocular prism unit bodies 300R and 300L. Light blocking tubes 204 are secured to the bodies 202a and 203a of the VAP units 202 and 203 on the side of the object. VAP elements 205 are disposed within the bodies 202a and 203a. As shown also in FIG. 32, each of the VAP elements 205 is formed by liquid-tightly connecting two transparent plates by bellows with a transparent liquid of a predetermined refractive index contained in the space defined by the transparent plates and the bellows. Each VAP element 205 is carried by holding frames 207a and 207b. Electromagnetic actuators are formed jointly by the coil parts 208a and 208b which are formed on the holding frames 207a and 207b and magnet parts 209 formed on the bodies 202a or 203a. With the electromagnetic actuators formed in this manner, the left and right VAP elements 205 are driven by these actuators, as follows: in each of the VAP elements 205, the transparent plate on the side of the object is tilted in the yawing (horizontal) direction while the transparent plate which is on the ocular side is tilted in the pitching (vertical) direction. Light fluxes passing through the VAP elements are thus deflected by the electromagnetic actuators. A shake detecting sensor 210 which is arranged to detect the deflection in the vertical (pitching) direction of the binocular body 500 is secured to the VAP unit body 202a. Another shake detecting sensor 211 which is arranged to detect the deflection in the horizontal (yawing) direction of the binocular body 500 is secured to the other VAP unit body 203a.

Figure 32:
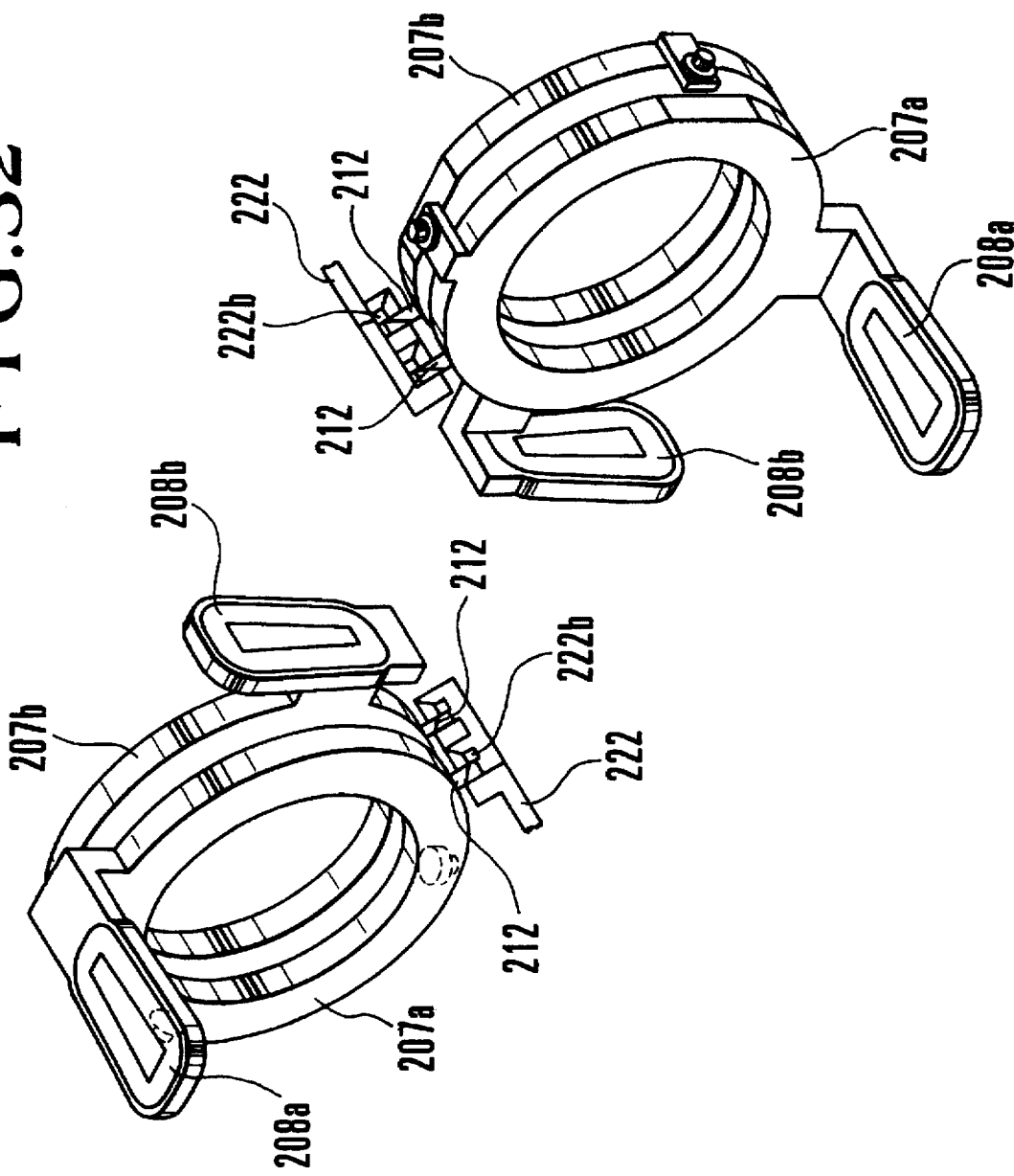
FIG. 32 is an oblique view showing the arrangement of a lock mechanism and that of a VAP unit.
Figure 33:
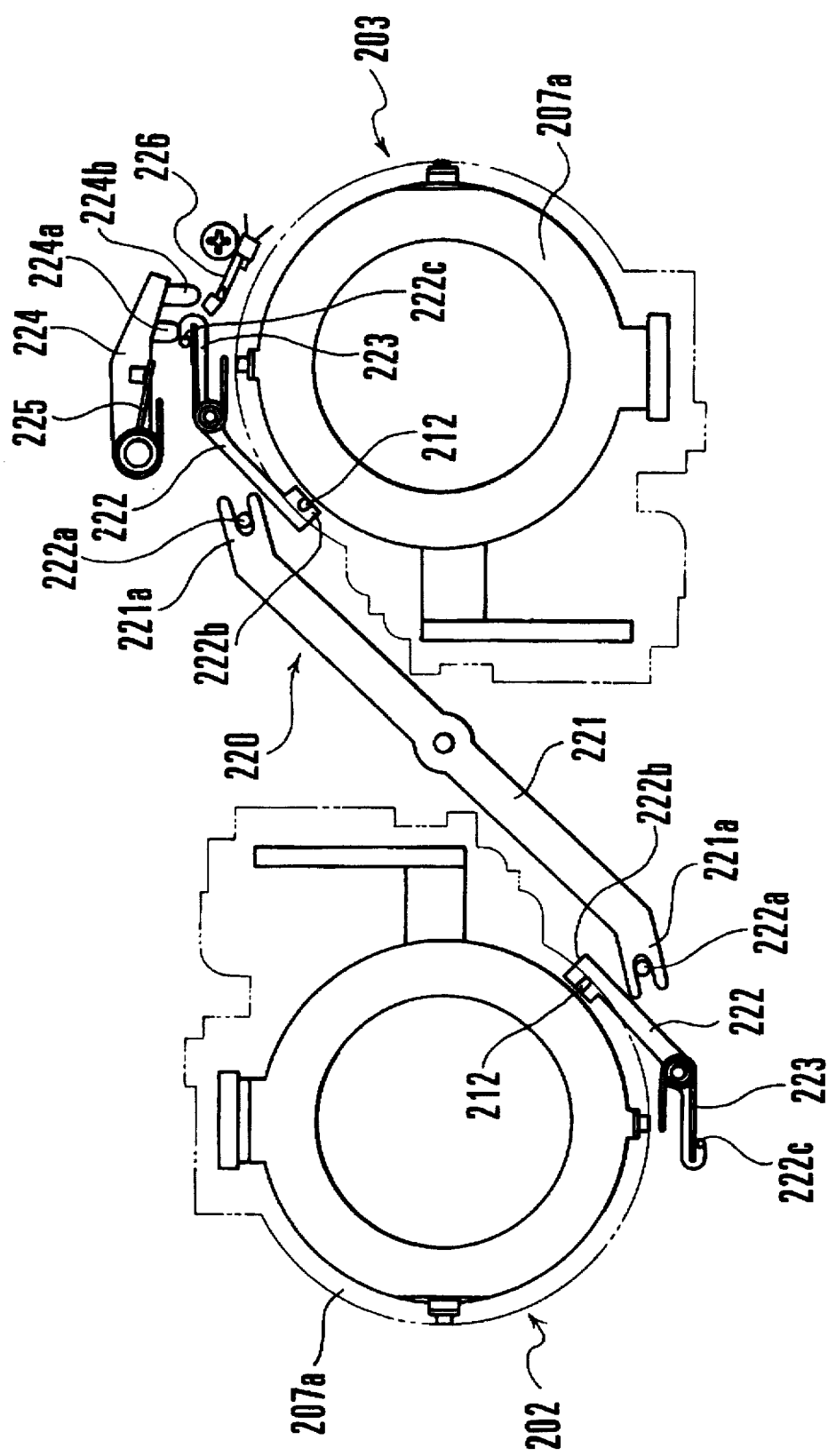
FIG. 33 is a front view of the lock mechanism.

A lock mechanism 220 which is carried by a unit support plate 542 is arranged between the VAP units 202 and 203 as shown in FIGS. 32 and 33. The lock mechanism 220 has an interlocking arm 221, which is mounted on the unit support plate 542 at it center and is rotatable on the center. Lock arms 222 are swingably arranged at both end parts of the interlocking arm 221 and are provided respectively with engaging projections 222a which are arranged to be allowed to engage engaging groove parts 221a formed in the end parts of the interlocking arm 221. A lock groove 222b which is in a circular conic shape is formed in one end of each of the lock arms 222 is arranged to engage a lock pin 212 which is provided on each of the holding frames 207a and 207b of the VAP elements 205. A spring retaining projection 222c is provided at the other end of each of the lock arms 222. One end of a spring 223 which is wound around the rotation shafts of each of the lock arms 222 is arranged to abut on each of the projections 222c. The springs 223 are thus arranged to urge the lock grooves 222b to move in the direction of engaging the lock pins 212 of the holding frames 207a and 207b. A shake (or deflection) correcting operation lever 224 which has its one end rotatably attached to the upper shell 502 is arranged above the lock arm 222 of the VAP 203 on the side of the left eye. A spring 225 is wound around a rotation shaft which is disposed at one end of the shake correcting operation lever 224. The urging force of the spring 225 pushes the operation lever 224 in the direction of abutting on the upper shell 502. An operating projection 224a is formed on a face which is at the other end of the operation lever 224 and is opposed to the VAP unit 203. The operating projection 224a is arranged to disengage the lock pin 212 of the VAP element 205 from the lock groove 222b formed in the lock arm 222 when the operation lever 224 is operated by pushing it into contact with the lock arm 222. The operation lever 224 is further provided with a switch operating projection 224b which is formed in the neighborhood of the operating projection 224a and is arranged to operate a shake (or deflection) correcting operation switch 226 when the operation lever 224 is pushed. The shake correcting operation switch 226 is disposed between the operation lever 224 and the VAP element 205.

An ocular prism unit holding plate 230 is disposed on the ocular sides of the upper and lower shells 502 and 504. The ocular prism unit holding plate 230 is provided with holding holes 230a which are arranged to rotatably carry the ocular prism unit bodies 300R and 300L. The connecting lens tubes 302 of the ocular prism unit bodies 300R and 300L are inserted in the holding holes 230a. Mounting rings 304 are rotatably attached to the connecting lens tubes 302 with screws from the upper and lower shells 502 and 504 through the holding plate 230. Interlocking plates 306 which are in a sectoral shape and are in mesh with each other are secured to the mounting rings 304. They are arranged such that, when the ocular prism unit bodies 300R and 300L are rotated, the sectoral interlocking plates 306 rotate to equal degrees of angle with respect to the binocular body 500 in such a way as to permit pupil distance adjustment.

Each of the ocular prism unit bodies 300R and 300L consists of the above-stated connecting lens tube 302, a prism housing tube 308 and an eyepiece tube 310. The prism housing tube 308 contains therein a first prism 312 which is arranged to upside-down invert an optical image passed through the VAP unit 202 or 203 and a second prism 314 which is arranged to laterally invert the optical image obtained from the first prism 312. The eyepiece tube 310 contains an eyepiece ER or EL.

Further, as shown in FIG. 30, a battery housing part (chamber) 510 is formed between the objective lens units 506R and 506L within the binocular body 500. A charging battery (not shown) which supplies the power for driving the VAP units 202 and 203 is contained within the battery housing part 510. The battery housing part 510 is provided with a pushing spring 512 for taking the battery out, a connectors 514 for connection to the contacts of the battery and a lid 516 for opening and closing an aperture provided for taking the battery out.

A circuit board housing part 502a is formed in the upper shell 502 as shown in FIG. 30. A control circuit board 410 which controls driving actions on the VAP units 202 and 203 is contained and held within the circuit board housing part 502a. To the control circuit board 410 are connected lead wires (not shown) which are provided for the supply of power from the battery connectors 514. Further, the control circuit board 410 is arranged to receive deflection detection signals from the deflection (or shake) detecting sensors 210 and 211 of the VAP units 202 and 203 and to drive the VAP units 202 and 203 to tilt the VAP elements 205 on the basis of these detection signals in such a way as to correct any deflections of rays of light to be sighted.

A shell cover 502b is arranged to cover the circuit board housing part 502a of the upper shell 502. As shown in FIG. 28, a shake correcting mode selection switch 412, a battery check button 414 and an LED 416 for showing the remaining amount of battery energy are arranged on the shell cover 502b and are electrically connected to the control circuit board 410. The selecting positions of the shake correcting mode selection switch 412 include an OFF mode, a normal shake correcting mode and a panning shake correcting mode. The battery check button 414 is arranged such that, when this button is pushed, the control circuit board 410 makes a check for the remaining amount of the energy of the charging battery 400 and then a display is made by the battery energy remaining amount indicating LED 416 according to a remaining amount of the battery energy detected.

The operations to be performed on the binocular which is the thirteenth embodiment described above and its actions performed in response are described as follows:

The user first grasps the binocular body 500 and makes pupil distance adjustment by turning the ocular prism unit bodies 300R and 300L either inward or outward. The user then makes focus adjustment for the left eye by turning the focus adjustment ring 593 of the diopter-and-focus adjusting mechanism 508 in a state in which the right eye is closed and the left eye opened. After that, the focus adjustment for the right eye is made by turning the diopter adjustment ring 589 of the diopter-and-focus adjusting mechanism 508 with the left eye closed and the right eye opened. The focusing and diopter adjustment are thus finished for the left and right eyes to ready the binocular for adequate observation by the user.

Then, when the shake correcting operation lever 224 is operated by pushing it after the shake correcting mode selection switch 412 has been set either in the position of the normal or panning shake correcting mode, the lock arm 222 of the VAP unit 203 on the left eye side is pushed to push and turn on the the shake correcting operation switch 226. The interlocking arm 221 is caused by this to disengage the lock grooves 222b of the lock arms 222 from the lock pins 212 of the VAP elements 205. The VAP units 202 and 203 are thus brought into their shake correcting states. The VAP elements 205 are tilted according to the outputs of the shake detecting sensors 211. As a result, the user is allowed to see an image obtained after the image shakes caused by shaking of the binocular have been corrected. Further, when the shake correcting operation lever 224 is released from being pushed in this shake correcting state, the forces of the springs 223 of the lock arms 222 and the urging force of the spring 225 of the operation lever 224 bring the lock arms 222 and the operation lever 224 back to their original positions. The lock grooves 222b engage the lock pins 212 to lock the VAP units 202 and 203 and the shake correcting operation switch 226 is turned off. The supply of power to the VAP units 202 and 203 comes to a stop. Under this condition, the transparent plates 205a of each of the VAP units 202 are kept in their parallel positions by the locking action of the lock mechanism 220.

The timing of the locking and unlocking actions of the lock mechanisms 220 and the turning on and off of the shake correcting operation switch 226 to be performed when the shake correcting operation lever 224 is pushed and released from the pushed state is arranged as follows: as mentioned above, the lock mechanism 226 is unlocked and, after that, the shake correcting operation switch 226 is turned on when the shake correcting operation lever 224 is pushed. The shake correcting operation switch 226 is turned off and, after that, the lock mechanism 220 is locked when the shake correcting operation lever 224 is released from the pushed state. This timing may be changed either to have the shake correcting operation switch 226 turned on and off simultaneously with the unlocking and locking actions of the lock mechanism 220, or to have the switch 226 first turned on when the operation lever 224 is pushed and, after that, while the VAP element 205 of each of the VAP units 202 and 203 remains in its parallel state, the lock mechanism 220 is unlocked to bring the VAP units 202 and 203 into a shake correcting state. Further, it is also possible to arrange the binocular in such a manner that, when the shake correcting operation lever 224 is released from its pushed state, the VAP element 205 of each of the VAP units 202 and 203 is first allowed to come into its parallel state and, after that, the lock mechanism 220 is allowed to act. In the case of such arrangement, the shake correcting operation switch 226 is arranged, for example, to be a double switch.

In the thirteenth embodiment, when the voltage of the charging battery 400 drops to a voltage lower than a predetermined voltage, the shake correcting range of the VAP units 202 and 203 either may be changed to a range narrower then a normal correcting range for minimizing the power consumption or may be stopped from being driven. In addition to such measures, some display means such as an LED, a hologram, an LCD or the like may be arranged within the ocular prism unit bodies 300R and 300L to make a display apposite to such a case. Further, in the case of the embodiment, with the shake correcting mode selection switch 412 arranged to be set in its off-state, the device can be prevented from being turned on even if the shake correcting operation lever 224 happens to be unintentionally pushed while the binocular is being carried around. Further, in case where the selection switch 412 is arranged to have no OFF position, the device may be provided with an automatic power-cutting-off function by providing the control circuit board 410 with a timer function by which the power supply is automatically turned off after the on-state of the power supply continues for some minutes.

In the case of the thirteenth embodiment, the VAP units 202 and 203 are arranged on the ocular side of the objective lens units 506R and 506L. However, this arrangement may be changed to arrange them on the object side of the objective lens units 506R and 506L with protection glass plates fixedly arranged on the object side of these VAP units 202 and 203. The arrangement of the VAP units also may be changed to correct image shakes without tilting the transparent plates on the object side and by vertically or horizontally (transversely) tilting the transparent plates on the ocular side of the VAP units with the transparent plates on the object side fixedly arranged. The visual field of the binocular can be broadened by virtue of such arrangement.

Further, the arrangement of the focus adjusting means, the diopter adjusting means and the selection means on the right and left sides of the embodiment of course may be changed to be conversely arranged.

Figure 34:
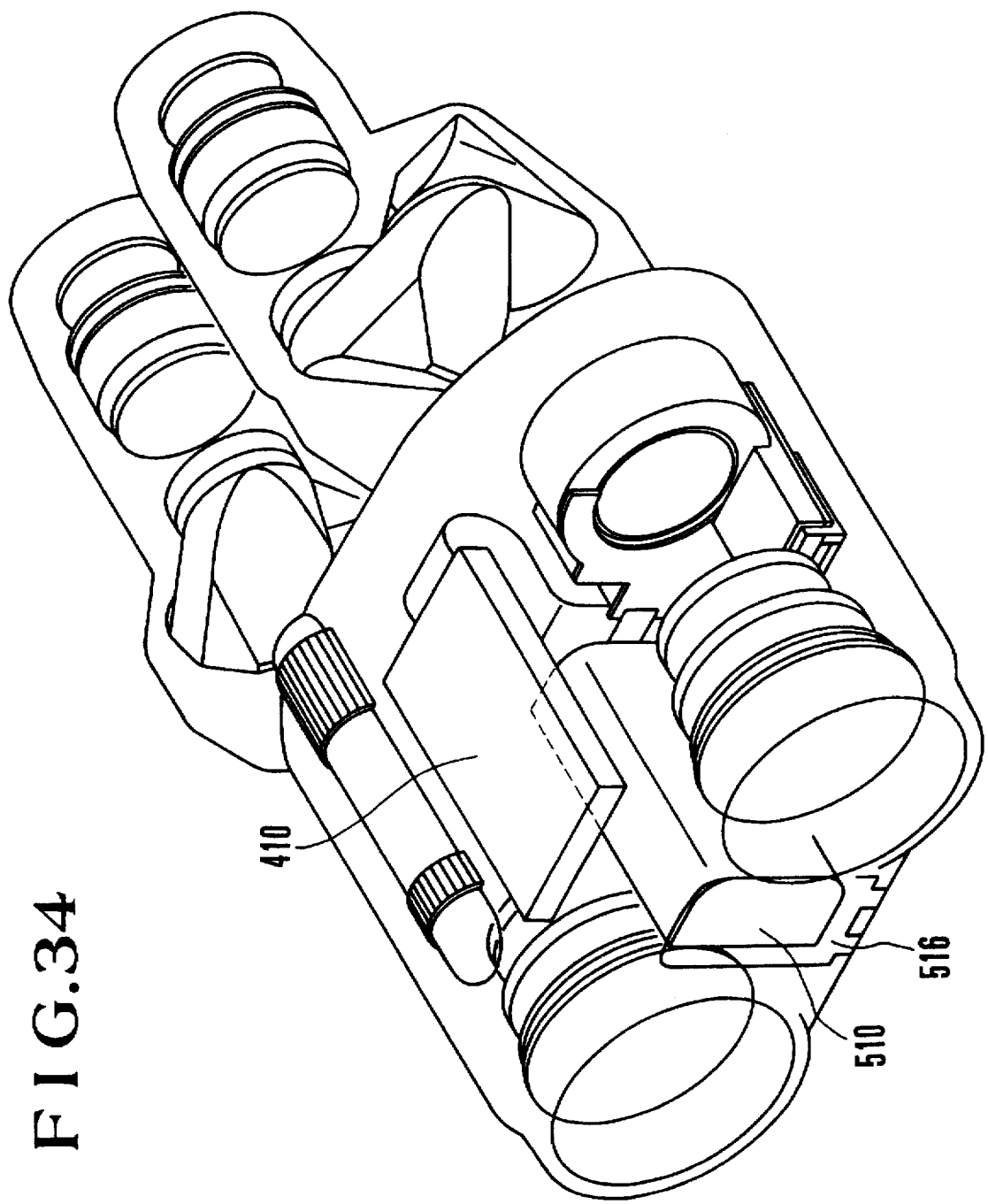
FIG. 34 is a look-through oblique view showing the binocular of FIG. 28.

FIG. 34 is a look-through oblique view showing efficient arrangement of the control circuit board 410 and the charging battery housing part 510 between the pair of objective lens units 506R and 506L.

(Fourteenth Embodiment)

Figure 35:
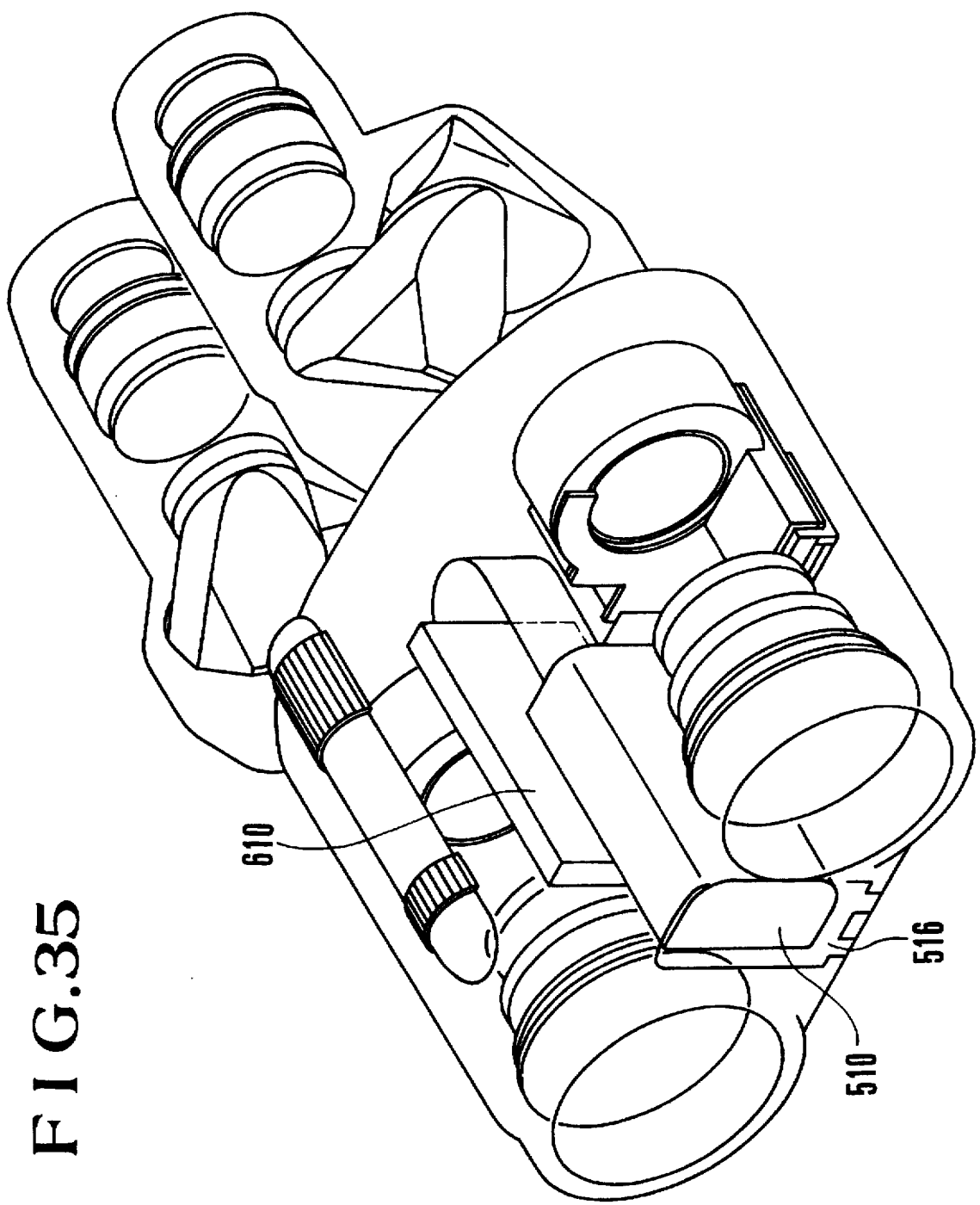
FIG. 35 is a look-through oblique view showing a binocular which is arranged as a fourteenth embodiment.

FIG. 35 shows a fourteenth embodiment of this invention. Unlike the fourteenth embodiment, a control circuit board 610 in the fourteenth embodiment is arranged side by side with the charging battery housing part 510.

(Fifteenth Embodiment)

Figure 36:
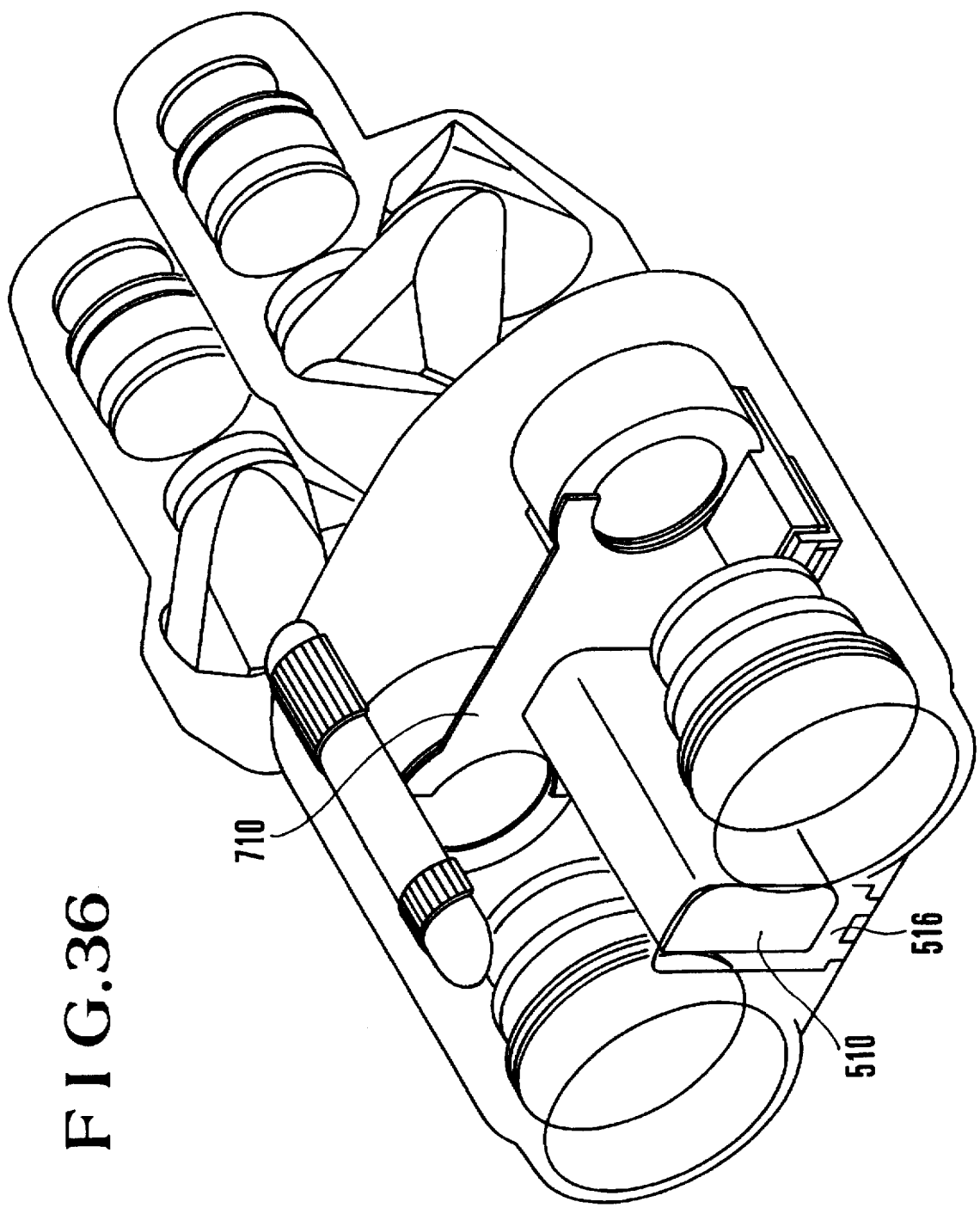
FIG. 36 is a look-through oblique view showing a binocular which is arranged as a fifteenth embodiment.

FIG. 36 is a look-through oblique view showing a fifteenth embodiment of this invention. In this case, a control circuit board 710 is arranged in rear of the charging battery housing part 510 and in a posture which is perpendicular to the optical axes of the objective lenses. In the embodiment shown in FIGS. 28 to 30, the deflection or shake sensors 210 and 211 are arranged separately from the control circuit board 410, because the shake sensors must be arranged orthogonally with respect to the optical axes. In the case of the fifteenth embodiment shown in FIG. 36, on the other hand, the shake sensors can be arranged on the control circuit board 710. To prevent the control circuit board 710 from blocking the optical axes, both sides of the control circuit board 710 are formed in a semi-circular shape approximately along the passages of light fluxes.

The above-stated arrangement not only enables a binocular which is an optical apparatus to be used for observation to give good images in a stable state but also permits the apparatus to be arranged without much increases in its size.

Each of the binoculars which are the thirteenth, fourteenth and fifteenth embodiments of this invention is capable of giving good images in a stable state and also permits reduction in size of the apparatus. Further, since the shake correcting state is obtainable only when the operation lever is pushed, the electric energy of the battery can be efficiently used. Further, the provision of the shake correcting mode selection switch or a timer effectively prevents the electric energy from being unnecessarily consumed.

In case where the selection means mentioned above is disposed in the neighborhood of a part to which the index or middle finger of the right hand naturally comes when the user holds the binocular with two hands while the diopter difference adjusting means is disposed almost coaxially with the focus adjusting means, a focus adjusting operation and starting and stopping operations on the image shake correcting function can be stably performed while the binocular is being held in an operating posture. Further, since the diopter difference adjusting means is touchable by moving the right hand forward while the binocular is being held, the diopter difference can be easily adjusted.

The binocular of the kind having the image shake correcting function tends to have a larger size than an ordinary binocular as its control circuit board and a battery must be arranged within the binocular. Meanwhile, binoculars are generally arranged to have a certain space between two objective lenses for the purpose of securing a necessary baseline length. With the control circuit board and the battery arranged within this space, therefore, the binocular can be prepared without increasing its size. Since the operation members such as a focus adjustment dial, a diopter difference adjustment dial and a shake correcting switch and display members such as a battery energy remaining amount display member, etc., are arranged on the upper part of the binocular body, it is difficult to insert and take out a battery from the upper part of the binocular body. However, it is not preferable, in respect of strength, to arrange the battery to be inserted and taken out from the lower part of the binocular body, because the lower part must be cut out to a large extent for this purpose while the lower part already has a hole formed therein for mounting a tripod.

This problem, however, can be solved according to the arrangement of the thirteenth to fifteenth embodiments. In the case of these embodiments, the control circuit board and the battery can be arranged within the binocular body without increasing its size. The opening (aperture) for inserting and taking out the battery can be arranged without causing any hindrance to the operation and display members and without incurring any deterioration in strength.

Further, according to the arrangement of each of the thirteenth to fifteenth embodiments, the engaging parts of the right and left lens barrels and their driving parts can be easily coupled with each other in connecting the upper and lower shells to each other. Further, the arrangement to support and carry the lens barrels with sleeves enables the supporting part to have a sufficient fitting engagement length. Besides, in the binocular, the actuators, the circuit board and the battery are arranged in an excellently balanced state.

The conventional binocular has presented a problem in the following point: referring to FIG. 37 which shows a known optical system, left and right rays of light LL and RR pass through objective lenses 821L and 821R and are imaged on their way. However, they are changed into erected rays of light respectively by the erecting prisms 822L and 822R before they reach the eyeballs of the observer through eyepieces 823L and 823R. The object of observation can be made to be clearly observable with the binocular focused on the object by manually drawing in or out the objective lenses in an interlocked state through a mechanism MM, which is expediently shown with a broken line.

FIGS. 38A–38C show by way of example an image obtained when some object is sighted through a binocular which is a product of the conventional technology. The optical axes of the right and left optical systems of the binocular are in parallel to each other. Therefore, when the object is located far away, the right and left images of the object coincide with each other to show it in one circle as shown in FIG. 38A. However, when the object is located near, the right and left images come to show a discrepancy due to parallax and appear in a gourd-like shape as shown in of FIG. 38B.

To solve the above-stated problem, sixteenth to eighteenth embodiments of this invention are intended to correct the parallax which occurs in sighting an object located at a near distance and to correct its image from the gourd-like shape shown in FIG. 38B into a circular frame as shown in FIG. 38C.

(Sixteenth Embodiment)

Figure 39:
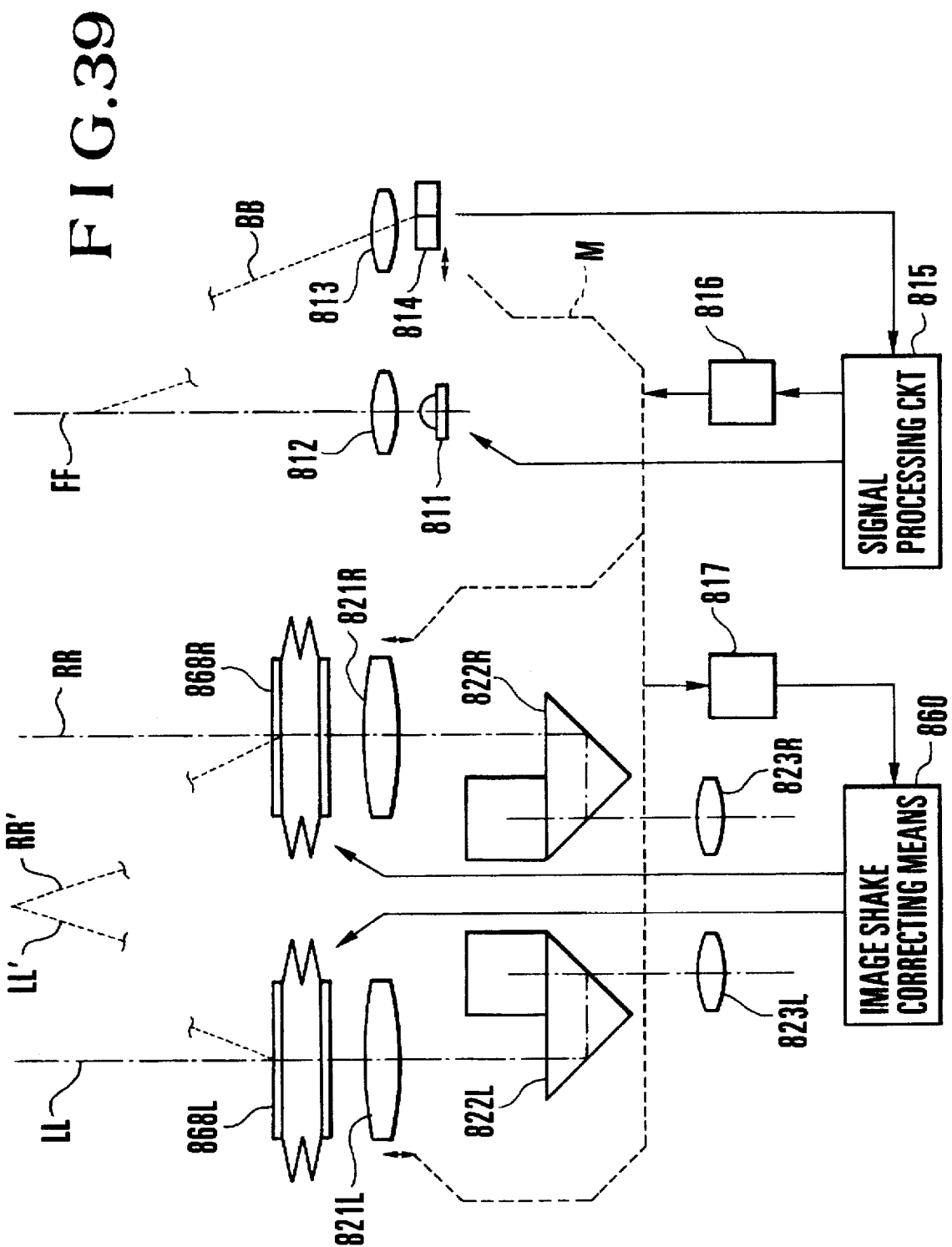
FIG. 39 is a schematic diagram showing the optical arrangement of a binocular which is arranged as a sixteenth embodiment of this invention.

FIG. 39 shows a sixteenth embodiment of this invention. The sixteenth embodiment uses an automatic focus adjusting device which is arranged to use infrared light as field discrepancy detecting means. The drawing includes objective lenses 821L and 821R, erecting prisms 822L and 822R and eyepieces 823L and 823R. These members jointly form an objective optical system. The arrangement of the objective optical system is not limited to what is illustrated. In this case, this invention is applied to a binocular having image shake compensating optical means.

Variable angle prisms 868L and 868R are used for the image shake compensation (or correction). The arrangement of the variable angle prisms 868L and 868R is well known and, therefore, does not require detailed description. Briefly stated, however, they are arranged as follows: two transparent flat plates are interconnected through bellows to form a space between them. The space is filled with some optical medium such as silicone oil. An optical axis can be refracted in a desired direction by horizontally tilting one of the transparent flat plates and by vertically tilting the other. While the variable angle prisms are disposed in front of the objective optical systems in the case of this embodiment, each of them may be disposed in an afocal optical path with the afocal optical path formed within each of the objective optical systems.

In addition to the binocular optical systems which are secured to the binocular body, the binocular is provided with a light emitting and receiving optical system. Infrared light emitted by an LED 811 is projected by a light projecting lens on a ray of light FF which is in parallel to the binocular optical axes LL and RR. The infrared light thus projected is reflected by the object of observation. A reflected ray of light BB thus obtained comes to be imaged by a light receiving lens 813 on a split light receiving element 814. The split light receiving element 814 is arranged to be moved in the direction of baseline length by a mechanical interlocking mechanism M, expediently shown with a broken line, in association with the movement of a focusing part of the binocular (whereby the objective lens drawing out amount is decided). With the split light receiving element 814 thus moved, an in-focus state of the binocular is attained when the light receiving element 814 comes to a position where the reflected infrared light comes to be imaged at its center.

Figure 40:
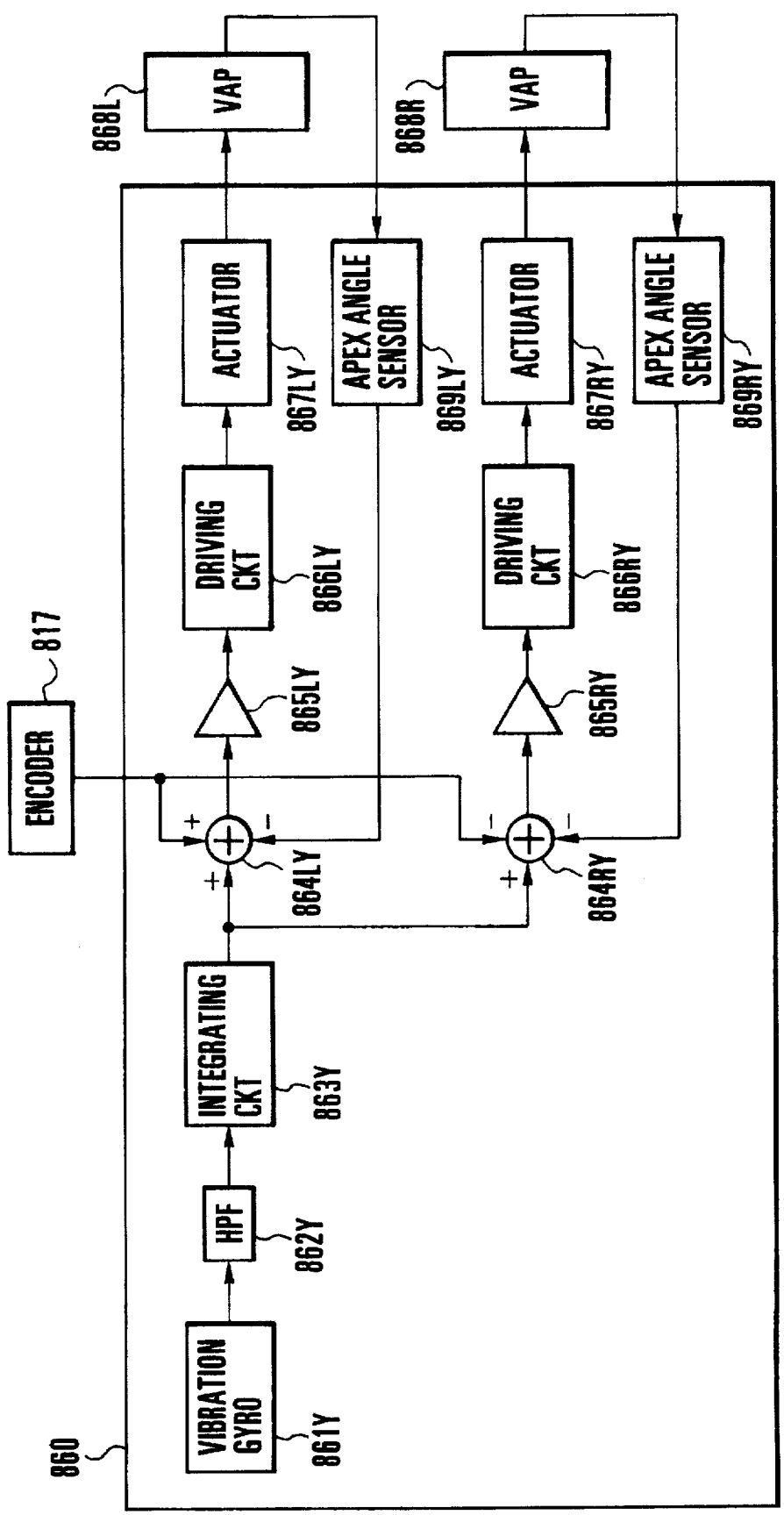
FIG. 40 is a block diagram showing the circuit arrangement to be used for the binocular of FIG. 39.

A signal from the light receiving element 814 is processed in a predetermined manner by a signal processing circuit 815. As a result, a focus adjustment driving signal is generated. A focus adjusting motor 816 is then driven according to this signal. With the motor driven, the focus of the binocular is automatically adjusted by the interlocking mechanism M. Since an encoder 817 is caused to operate at the same time, a visual field discrepancy detection signal is obtained and applied to an image shake correcting circuit 860. As mentioned above, this embodiment has the image shake correcting means and the variable angle prisms arranged for the operation of the image shake correcting means. The image shake correcting means is arranged and operates as follows:

FIG. 40 shows the circuit arrangement of the image shake correcting means 860 and the variable angle prisms 868L and 868B of FIG. 39.

The embodiment is assumed to be consisting of a Y system which is for vibrations or shakes taking place in the transverse direction and an X system which is for vibrations or shakes taking place in the vertical or longitudinal direction. Only the Y system is described and the X system is omitted from the following description. However, the arrangement of the X system is identical with that of the Y system with the exception of a part of it. In the drawings, reference numerals suffixed with "R" denote parts belonging to a channel or system arranged for the right eye and those suffixed with "L" denote parts belonging to a channel or system arranged for the left eye of the user.

Referring to FIG. 40, a vibrating gyro 861Y is arranged to detect an angular velocity of every rotating action of the whole binocular. A detection signal thus obtained has its DC component removed through a high-pass filter (HPF) 862Y. After that, the detection signal is applied to an integrating circuit 863Y to be converted into an angle signal. The angle signal thus obtained becomes a target value for the variable angle prism. The target signal is applied to the positive (+) inputs of addition circuits 864LY and 864RY. The outputs of the addition circuits 864LY and 864RY are applied to amplifier circuits 865LY and 865RY to be amplified to a predetermined amplitude. The outputs of the amplifier circuits 865LY and 865RY are then applied to driving circuits 866LY and 866RY to be power amplified there. The driving circuits 866LY and 866RY then supply currents to driving actuators 867LY and 867RY. The variable angle prism moves to change the optical axis in such a way as to compensate for an image shake. The movement of the variable angle prism is detected by apex angle sensors 868LY and 869RY. The outputs of these sensors are applied to the negative (−) input of an addition circuit 864 to form thereby a closed loop control system.

The Y system for the transverse direction differs from the X system for the vertical direction in that a correction signal which is sent from visual field discrepancy detecting means 812 to 817 is applied to the addition circuit 864LY. In the case of this example of circuit arrangement, addition is effected by the addition circuit 864LY of the left eye channel while subtraction is effected by the addition circuit 864RY of the right eye channel. The arrangement to apply the addition and the subtraction in this manner corrects the left and right optical axes respectively toward their inner sides so that the image discrepancy due to parallax can be canceled.

While the variable angle prisms are used for the parallax correction in the case of the sixteenth embodiment, the same advantageous effect can be attained by making a part of the reflection face of the erecting prism 822 into a movable mirror and by causing it to operate in association with the focus adjustment. The automatic focus adjusting device which uses infrared light may be replaced with a device using ultrasonic waves.

(Seventeenth Embodiment)

Figure 41:
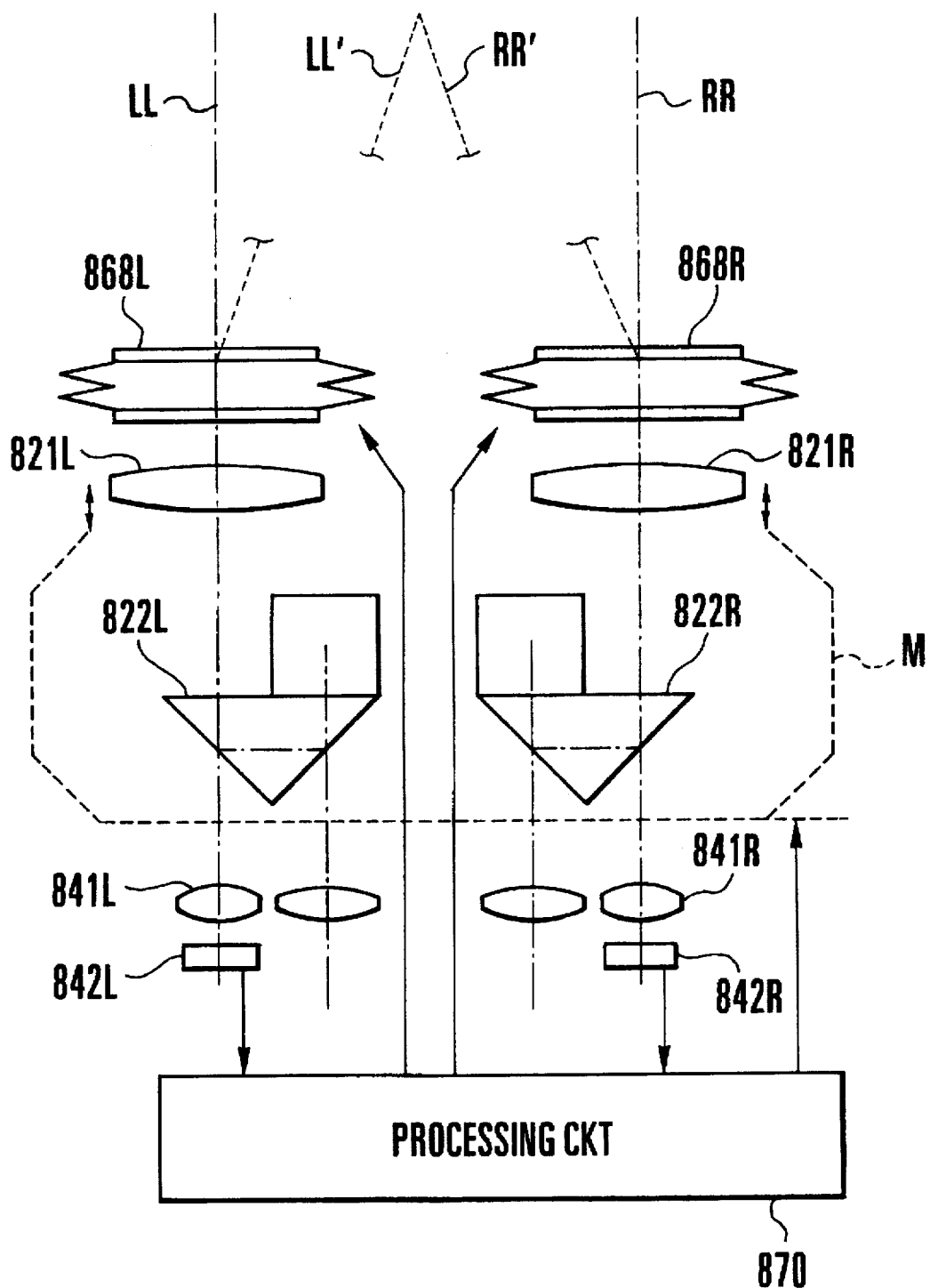
FIG. 41 is a schematic diagram showing the optical arrangement of a binocular which is arranged as a seventeenth embodiment of this invention.

FIG. 41 shows a seventeenth embodiment of this invention. In this case, visual field discrepancy detecting means and shake detecting means are arranged to use image sensors in common. A visual field discrepancy is detected by evaluating a correlation between the right and left images. An image shake is detected by evaluating a correlation between a plurality of images obtained at a predetermined interval of time. In the case of this embodiment, a part of the reflection face of each of erecting prisms 822L and 822R is arranged to be a half-mirror to have a part of incident light led to an optical system provided for automatic adjustment. Image forming optical systems 841L and 841R are provided for this purpose and are arranged to have images of the object of observation formed on the image sensing planes of image sensors 842L and 842R. With left and right images thus formed respectively on the image sensors 842L and 842R, the two images come to coincide with each other if the left and right optical axes intersect on the object. Image signals representing the two images are inputted to a processing circuit 870. An image shake and visual field are corrected by driving the variable angle prisms 868, on one hand, and the focus is adjusted by driving the objective lenses 821 on the other on the basis of the two image signals inputted to the processing circuit 870.

Figure 42:
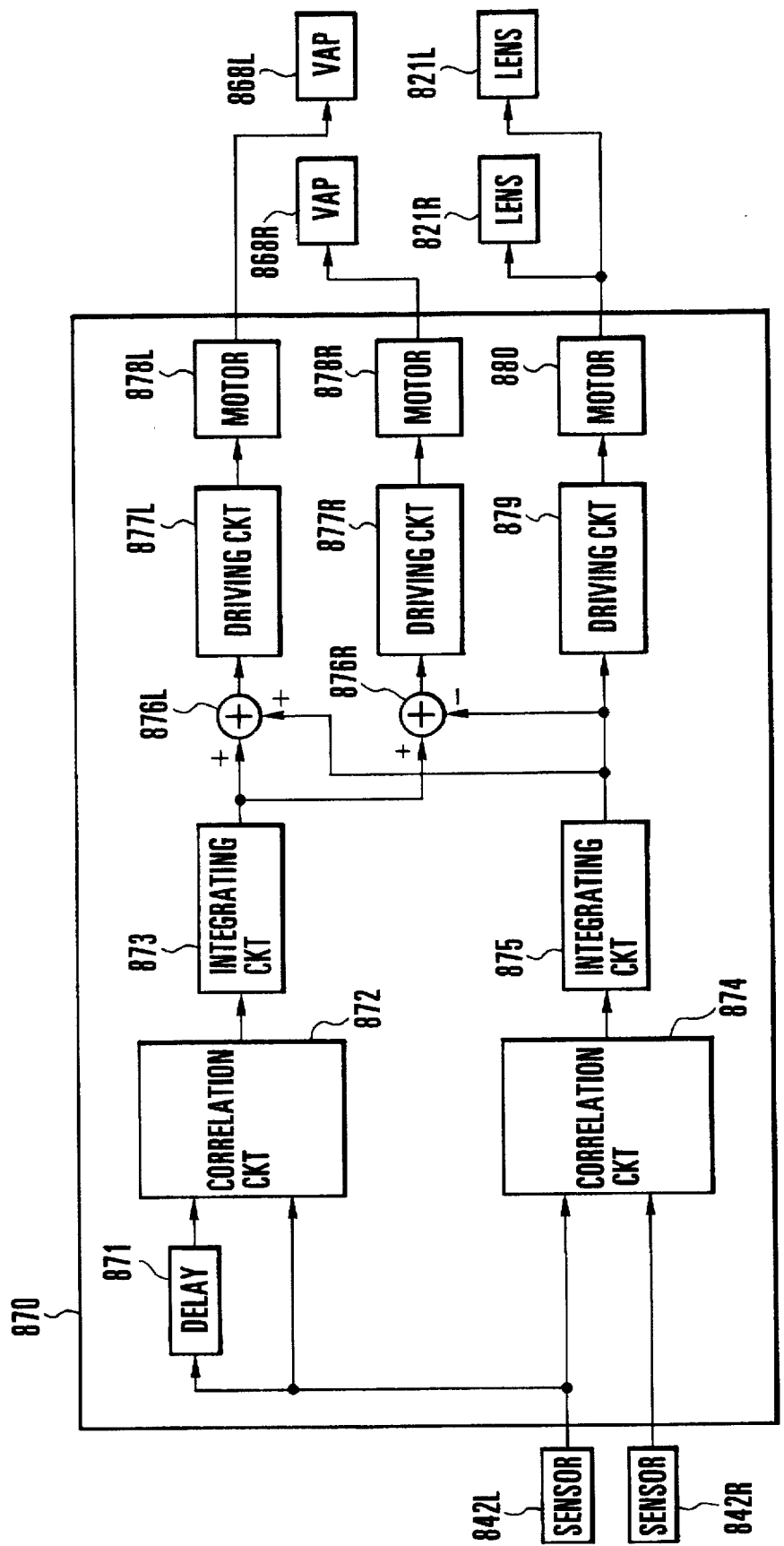
FIG. 42 is a block diagram showing the circuit arrangement to be used for the binocular of FIG. 41.

The details of the processing operation of the processing circuit 870 are described with reference to FIG. 42 as follows: image sensors 842L and 842R correspond respectively to the left and right image forming optical systems. A signal outputted from one image sensor 842L is stored in a delay circuit 871. The signal outputted from the delay circuit 871 (data of previous sampling) and another signal coming directly from the image sensor 842L (data of current sampling) are applied to a correlation circuit 872. The correlation circuit 872 then computes and find any image discrepancy taking place with time (temporally). The output of the correlation circuit 872 is integrated by an integrating circuit 873 to obtain information on any image shake. The output of the integrating circuit 873 is applied to driving circuits 877L and 877R through addition circuits 876L and 876R. Stepping motors 878L and 878R are driven accordingly. The variable angle prisms 868L and 868R are driven by the driving forces of the motors 878L and 878R to correct the image shake.

Meanwhile, the output signals of both the image sensors 842L and 842R are applied to another correlation circuit 874. The correlation circuit 874 then computes an amount of discrepancy spatially taking place between the images. The output of the correlation circuit 874 is integrated by an integrating circuit 875 to obtain a visual field discrepancy detection signal.

The output of the integrating circuit 875 is first applied to the addition circuits 876L and 876R to be subjected to an addition or subtraction process which is carried out in such a way as to correct the image shake information and the visual field discrepancy. Further, the output of the integrating circuit 875 is applied also to another driving circuit 879 for driving another stepping motor 880. The objective lenses 821L and 821R are moved by the driving force of this stepping motor for focus adjustment.

(Eighteenth Embodiment)

Figure 43:
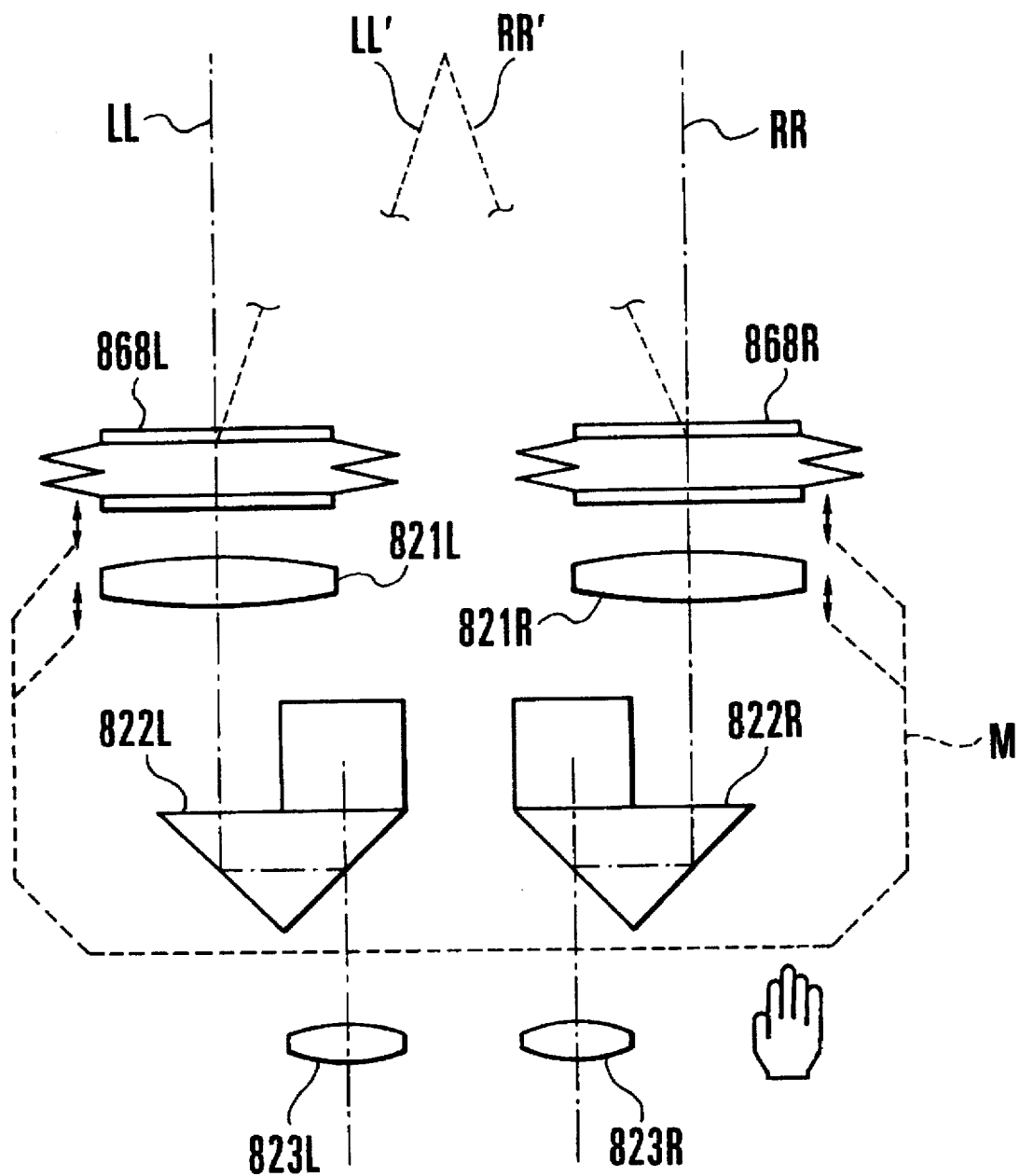
FIG. 43 is a schematic diagram showing the optical arrangement of a binocular which is arranged as an eighteenth embodiment of this invention.

FIG. 43 shows an eighteenth embodiment of this invention. The eighteenth embodiment uses a manual focus adjusting mechanism as visual field discrepancy detecting means. The focus adjusting mechanism is arranged in combination with a mechanism M which is arranged to interlock the changes in apex angle of each variable angle prism with the focus adjusting mechanism. More specifically, the mechanism M is arranged to mechanically turn around the transparent flat plate which is arranged to change the apex angle in the horizontal (transverse) direction of the variable angle prism. In the case where the object is located at an infinity distance, for example, the objective lenses 821L and 821R are in focus when they are in their maximum drawn-in positions. In this instance, the apex angles of the variable angle prisms are zero and the left and right images coincide with each other. If the object is located at the nearest distance, the objective lenses 821L and 821R are in focus at their maximum drawn-out positions. In that instance, the apex angles of the variable angle prisms are controlled to deflect the left and right optical axes inward. Since the focus adjustment is mechanically interlocked with the apex angles of the variable angle prisms in this manner in the case of the eighteenth embodiment, the visibility of images is effectively prevented from being deteriorated by a parallax. While this embodiment is arranged to vary the optical axes of both the left and right optical systems, the same advantageous effect can be attained by varying the optical axis of only one of the optical systems. Further, the invented arrangement applies also to a binocular of the kind having no shake compensating means. The use of the variable angle prism may be replaced by such arrangement that one of the reflection faces of the erecting prism is separately arranged to be horizontally (transversely) rotatable as a rotating mirror.

As described in the foregoing, according to the conventional arrangement, the image of an object located at a near distance inevitably presents a gourd-like frame shape, which is disagreeable. The problem is solved by the sixteenth, seventeenth and eighteenth embodiments of this invention. According to the arrangement of these embodiments, the visual field frame shape can be obtained in a circular shape, so that the images of objects of observation located at any distance can be sighted in an adequate state. Further, the arrangement of the eyepiece part of each of the sixteenth, seventeenth and eighteenth embodiments of this invention is applicable to any optical apparatus of the kind having an eyepiece part, such as an ordinary binocular, a telescope or an image pickup apparatus.

The eyepiece (ocular) part of the conventional optical apparatus is described below before that of each embodiment is further described.

Figure 44A:
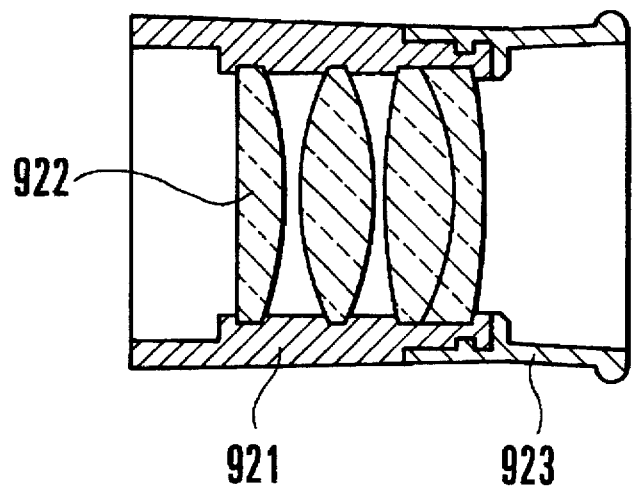
FIGS. 44(a) and 44(b) are sectional views showing by way of example the arrangement of the eyepiece part of a conventional optical apparatus.
Figure 44B:
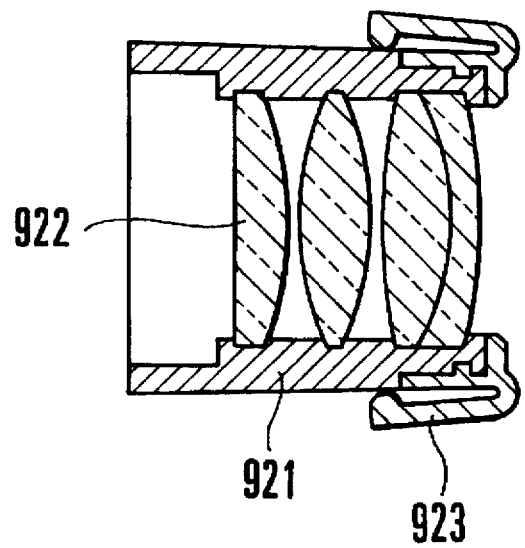

The eyepiece part of the conventional optical apparatus for observation, such as a telescope, has been provided either with a plurality of eyecup members which are interchangeable according to the facial shape of the user, or the use or nonuse of spectacles, or with a rubber eyecup of a shape as shown in FIGS. 44(a) and 44(b), for the purpose of adjusting the eye point of the eyepiece to the pupil position of the user. In the case of this particular rubber eyecup shown, a rubber member is arranged to be folded back to adjust its length, so that the object can be observed at a correct eye point.

Japanese Utility Model Publications No. SHO 47-5089 and No. SHO 36-4461 have disclosed an eyecup which is arranged to be urged toward the user with a spring and to be kept by locking means in a contracted state obtained by compressing it against the spring. Eyecups of another kind having a snap mechanism arranged to keep the eyecup in a desired position found by sliding the eyecup in the direction of the optical axis of the eyepiece have been disclosed in Japanese Utility Model Application Laid-Open No. SHO 63-54119, Japanese Utility Model Publication No. HEI 4-47689 and U.S. Pat. No. 4,523,818.

The position of the eyecup member within the eyepiece part must be accurately adjusted to the personal error of the user. If the pupil position of the user does not agree to the eye point, the observable field might become narrower or a shadow might arise in the field. For this purpose, the position of the eyecup member must be easily adjustable. Further, in case where the optical apparatus is to be stored in a case or the like, the eyecup is preferably arranged to permit contracting it to its shortest position. However, in the case of the prior art arrangement shown in FIGS. 44(a) and 44(b), when the eyecup which is made of rubber is in an expanded state, the position of the eye is not stable because of the resilience of the rubber. If the hardness of the rubber material is increased to solve this problem, the eyecup cannot be readily folded, though it is not easily deformed. Further, it is difficult to finely adjust the folded position of the rubber eyecup. Besides, the durability of the folded part of the rubber eyecup is dubious. To solve these problems, some of the known eyecups have been arranged to be slidably carried by the eyepiece part and to be urged to move by a spring toward the user in the direction of the optical axis, so that it can be readily expanded and contracted. However, the arrangement to have the eyecup urged toward the user by the spring makes the position of the eye unstable as the spring tends to shrink when the eyecup is pushed against the face of the user. If the spring constant of the spring is increased to solve that problem, it become difficult to contract the eyecup, though the eye position can be stabilized when the eyecup is in its expanded position. Besides, since lock means for locking the eyecup in its, contracted position is arranged to allow the eyecup to come off when the eyecup is turned around, if it is inadvertently turned around while the apparatus is in use for observation, the eyecup might hurt the eye of the user as it might spring out toward the eye. In another example of the prior art arrangement, the eyepiece part is provided with a snap mechanism for holding an eyecup which is arranged to be slidable in the direction of the optical axis. The snap mechanism enables the user to easily expand and contract the eyecup. However, if the face is pushed against the eyecup with too much pressure while the eyecup is in a drawn out state, the snap mechanism disengages to allow the eyecup to readily shrink. If the snapping force is arranged to be stronger to solve such inconvenience, it becomes difficult to stop the eyecup at an intermediate position as it cannot be easily expanded or contracted, though it does not readily contract.

(Nineteenth Embodiment)

Figure 45A:
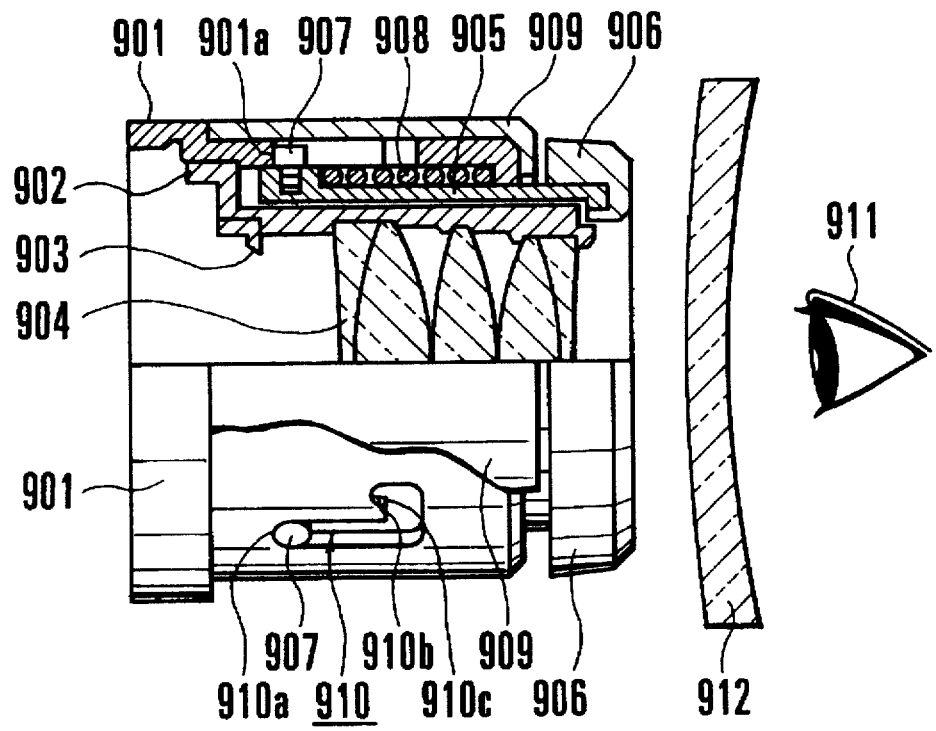
FIGS. 45(a) and 45(b) are partly sectional views showing a nineteenth embodiment of this invention.

The following describes a nineteenth embodiment of this invention which is arranged to be capable of solving the above stated problems. FIG. 45(a) shows the eyepiece part of an optical apparatus which is arranged as the nineteenth embodiment. An upper half of the eyepiece part above its optical axis is shown in a sectional view. A lower half of it below the optical axis is shown as viewed from outside with a portion of it cut out to show the inside of it.

Referring to FIG. 45(a), the drawing includes an eyepiece holding frame 901, a cam 910 which is provided in the eyepiece holding frame 901, an eyepiece tube 902, a field stop 903, an eyepiece 904, an eyecup tube 905, an eyecup rubber (rubber eyecup) 906, a cam pin 907, a compression spring 908, an outside cover 909, the eye 911 of the user, and a lens 912 of a users's spectacles.

Figure 45B:
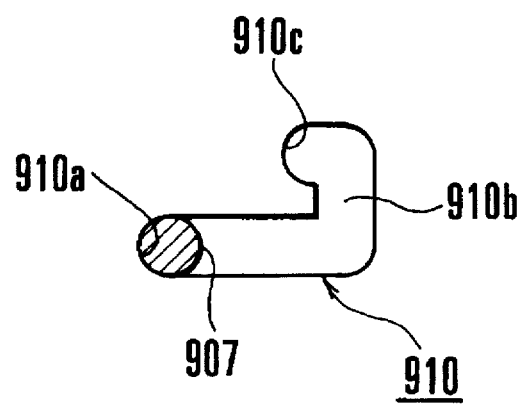
Figure 46A:
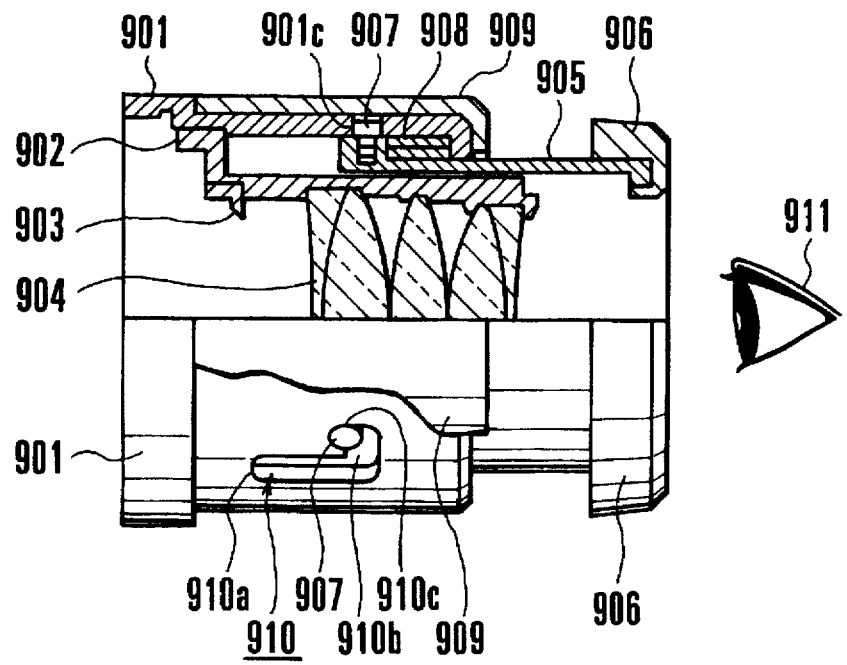
FIGS. 46(a) and 46(b) are partly sectional views showing the operation of the nineteenth embodiment.
Figure 46B:
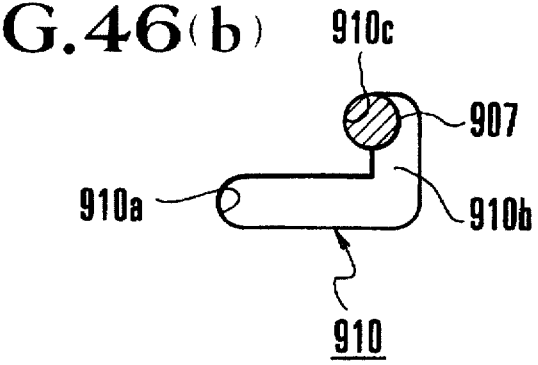

FIG. 45(b) is a development view of the cam 910 shown in FIG. 45(a). FIG. 46(a) shows the same eyepiece part of FIG. 45(a) as in a state of having the eyecup tube 905 drawn out from its state shown in FIG. 45(a). In FIG. 46(a), the same reference numerals are used to indicate the same parts as those shown in FIG. 45(a). Therefore, they are omitted from description. FIG. 46(b) is a development view of the cam 910 shown in FIG. 46(a).

The operation of the nineteenth embodiment is described with reference to FIGS. 45 and 46 as follows:

FIG. 45(a) shows the eyecup tube 905 as in its stowed state. The rubber eyecup 906 is set in an optimum position for a user wearing spectacles. Therefore, when the spectacles of the user is pushed against the rubber eyecup 906, the optical system can be used in its optimum state in respect to its performance as the pupil position of the eye correctly coincides with the eye point of the eyepiece. The rubber eyecup 906 is provided for the purpose of preventing the lens of the spectacles from being damaged by coming into contact with the eyecup.

The eyepiece holding frame 901 which is mounted on the optical apparatus holds the eyepiece tube 902 which contains the eyepiece 904 therein. The eyecup tube 905 is slidably fitted on the eyepiece tube 902. The cam 910 is formed in one part or in a plurality of parts of the eyepiece holding frame 901. The eyecup tube 905 is provided with a cam pin or the same number of cam pins as the number of cams. Each of the cam pins engages the cam 910 corresponding to it. The compression spring 908 is inserted in between the eyepiece holding frame 901 and the eyecup tube 905 and arranged to urge the eyecup tube 908 to move relative to the eyepiece holding frame 901 in the direction of the optical axis opposite to the user. Under this condition, within the cam 910, the cam pin 907 lodges at an end point 910a located furthest from the the user, as show in FIG. 46(b).

FIG. 46(a) shows the eyepiece part as in a state of having the eyecup tube 905 pulled (or drawn) out from a state shown in FIG. 45(a). The extent to which the eyecup tube 905 is to be pulled out is set to be an optimum extent for a user who wears no spectacles. The eye is too near to the eyepiece if the eyecup is not pulled out. The pupil position of the eye correctly coincides with the eye point of the eyepiece to permit observation without deteriorating the optical performance of the apparatus if the face is pushed against the rubber eyecup 906 with the eyecup tube 905 pulled out to an apposite position. In this case, therefore, the rubber eyecup 906 is pulled out by hand. The cam pin 907 is then also pulled out from the point 910a of the cam 910 along with the eyecup tube 905, until the eyecup tube 905 comes to a stop, and then, with the eyecup tube 905 turned round clockwise by hand, the cam pin 907 passes through a point 910b of the cam 910 to impinge on an abutting point of the cam 910. Then, when the rubber eyecup 906 is released from the hand, the urging force of the spring 908 causes the cam pin 907 to be locked to a point 910c of the cam 910. In this state, the turning movement of the cam pin 907 round the optical axis and its movement in the direction opposite to the user are limited. The state thus obtained ensures that, even if the spring constant of the spring 908 is small, the eyecup remains stable and will never be contracted when the face of the user is pushed against the eyecup for observation.

In contracting the eyecup again either when the apparatus is to be stowed within a case or when the user puts spectacles on, the same operation described above is carried out in a manner reverse to the sequence of procedures described above. In other words, the rubber eyecup is held by hand, is turned counterclockwise and, after that, released from the operating hand. The urging force of the spring 908 then automatically brings the cam pin 907 back to its original cam position 910a.

(Twentieth Embodiment)

Figure 47:
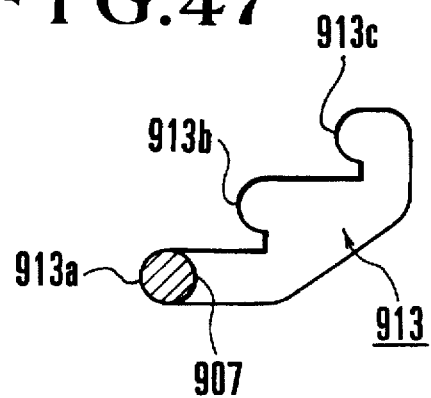
FIG. 47 is a detail view of a cam which is arranged as a twentieth embodiment of this invention.
Figure 48:
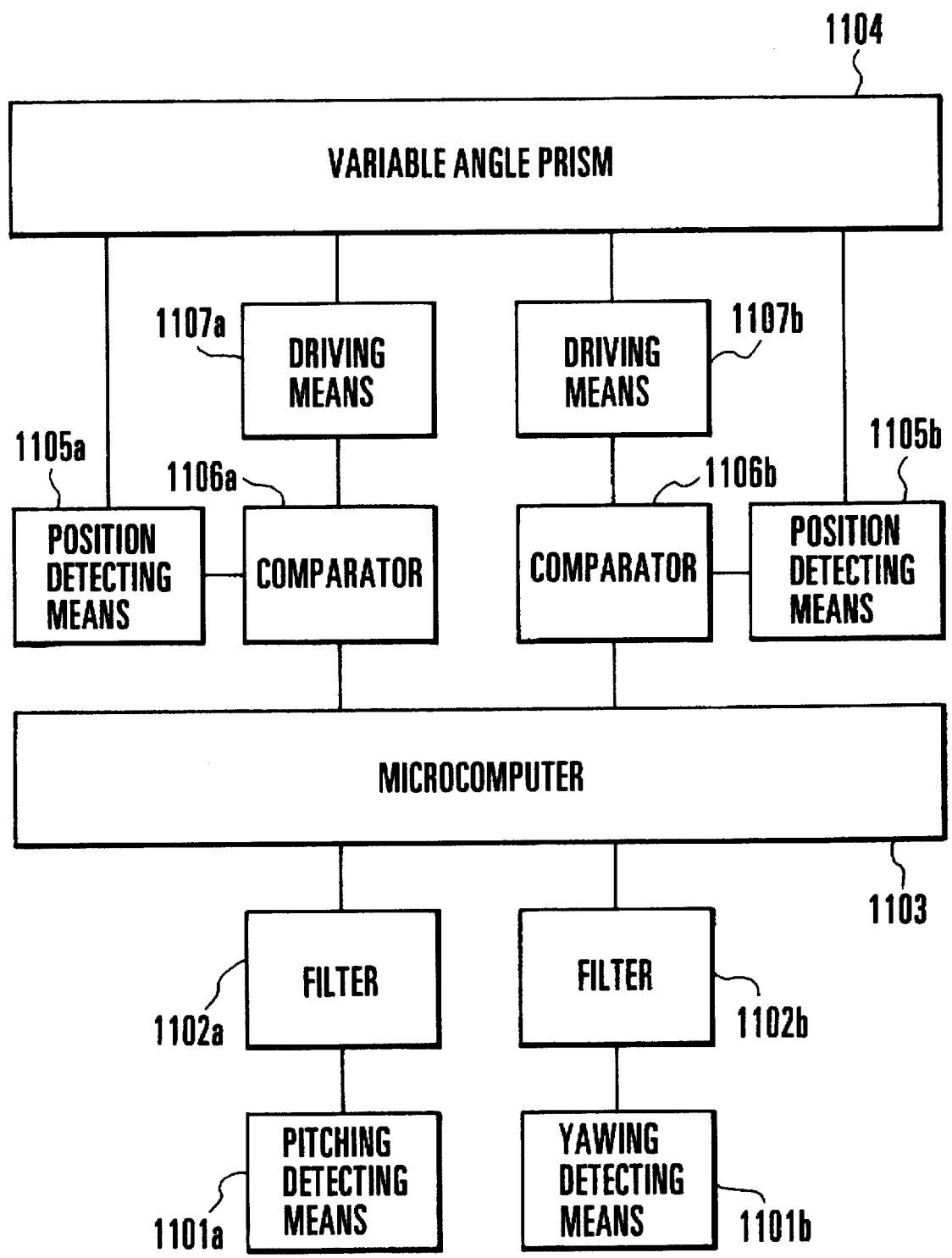
FIG. 48 is a block diagram showing the basic arrangement of the image shake correcting device employed in the conventional video camera.
Figure 49:
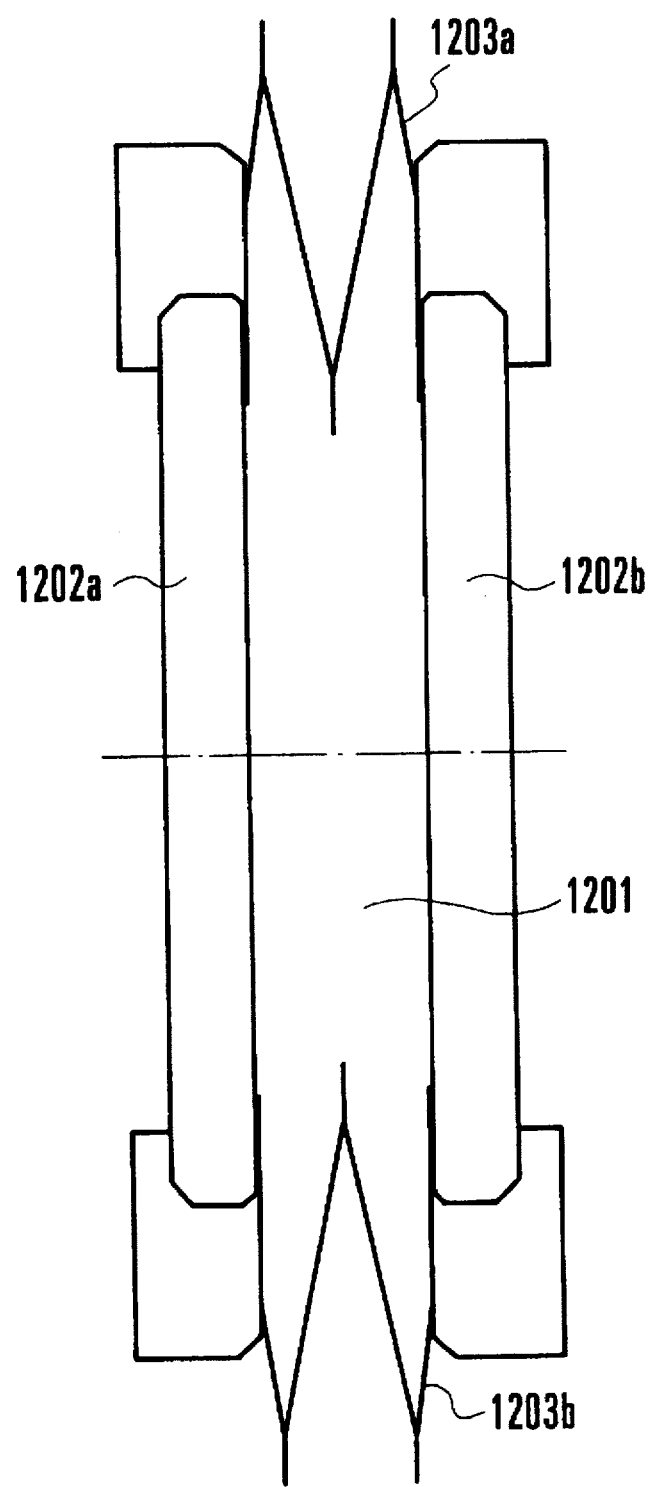
FIG. 49 is a schematic view showing the arrangement of a variable angle prism.
Figure 50:
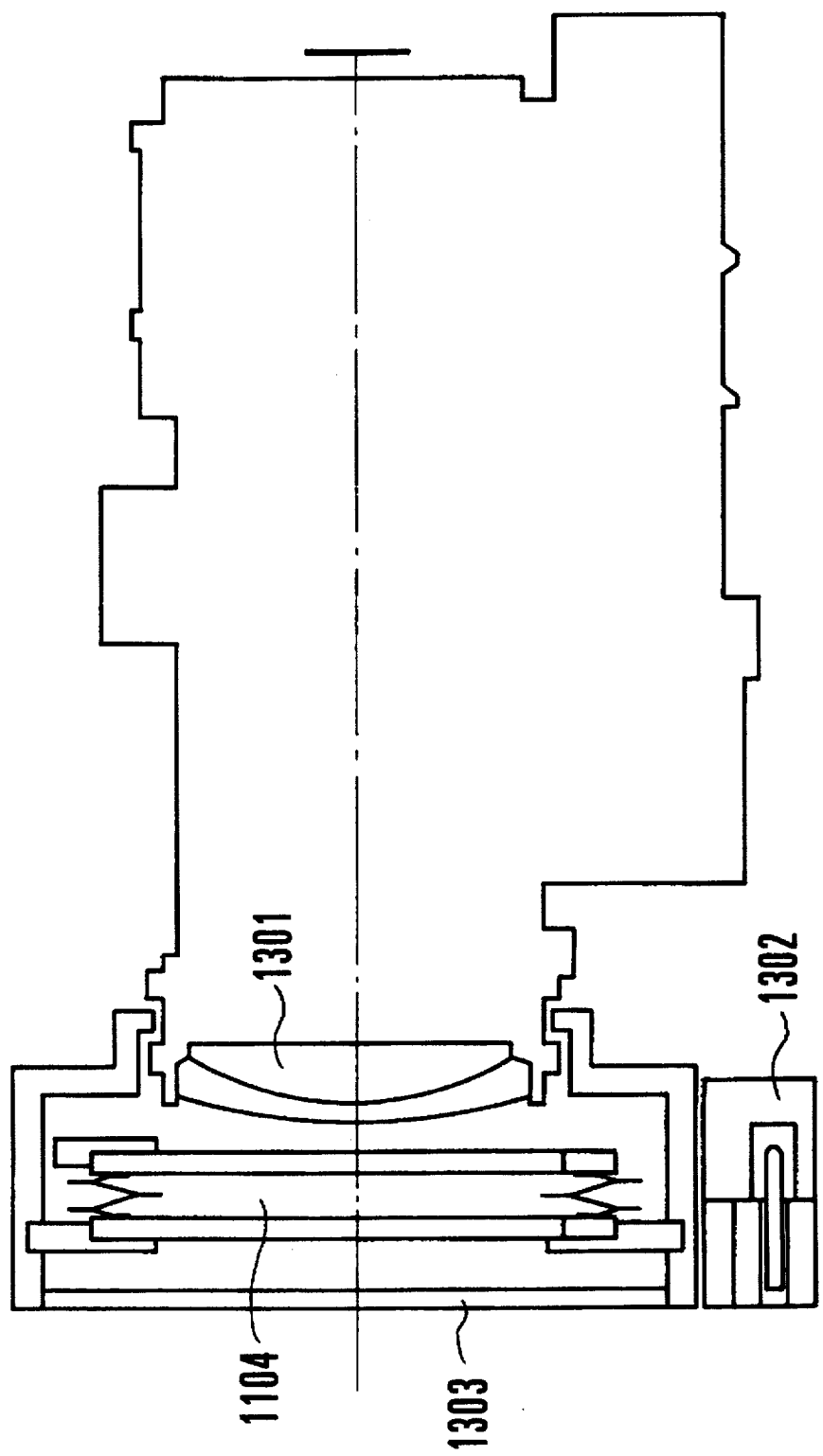
FIG. 50 is a schematic view showing the variable angle prism as in a state of being arranged within the lens barrel of the conventional video camera.

FIG. 47 is a development view showing the cam of a twentieth embodiment of this invention. A reference numeral 913 denotes the cam, which has three pin lodging positions 913a, 913b and 913c. A numeral 907 denotes a cam pin. This embodiment differs from the nineteenth embodiment shown in FIG. 45 and 46 in the following point: while the cam of the nineteenth embodiment is arranged to have two lodging positions 910a and 910c, that of the twentieth embodiment is arranged to have three lodging positions (or points) 913a, 913b and 913c as shown in FIG. 47 to permit finer adjustment of the position of the eyecup. FIG. 47 shows the cam pin 907 as in the lodging position 910a which corresponds to a maximum contracted state of the eyecup. The eyecup position is adjustable to any of three different positions by shifting the position of the cam pin 907 to the cam positions 913b and 913c from the position 913a in the same manner as described in the foregoing with reference to FIG. 46(a).

It is of course possible to more finely adjust the position of the eyecup by arranging the cam to have more than three lodging positions (or points).

As described above, the eyepiece part of the optical apparatus which is the nineteenth or twentieth embodiment effectively eliminates the shortcoming of the conventional rubber folding type eyecup which tends to make the pupil position of the eye unstable due to the deformation of the rubber. The invented eyepiece part also can be easily expanded and contracted with a small force. Besides, the eyecup is free from the question of durability presented by the folding part of rubber which tends to deteriorate.

The prior art examples described in the foregoing include an eyecup of the type using a spring. Although the embodiment also uses a spring, the spring is arranged to exert its urging force in the direction of contracting the eyecup, instead of in the direction of the user, and, in addition to that, is restricted from turning round. Therefore, the arrangement effectively precludes the hazard of hurting the eye of the user by accidental springing out of the eyecup toward the user. Further, since a spring having a weak spring force can be used, the eyecup can be expanded or contracted with a small force of finger tips. Despite the weak spring force, the embodiment is so arranged that the eyecup never unexpectedly shrinks even when the face of the user is pushed hard against the eyecup. Therefore, the optical apparatus can be used without any fear.

The prior art description given in the foregoing has included also an eyecup of the type having a snap mechanism, which ensures good operability and permits easy adjustment of the eye according to the personal error. The eyecup according to this invention has about the same operability as the snap type eyecup and also facilitates the eye position adjustment by virtue of the arrangement which easily allows the eyecup to stop at any of a plurality of positions. While the eyecup of this invention thus has the same advantages as the snap type eyecup, the invented eyecup never unexpectedly shrinks to eliminate the disadvantages in that respect of the snap type eyecup of the prior art.

What is claimed is:

1. A device applicable to an optical apparatus in which first and second optical members which deflect different light beams are operated according to a signal corresponding to shake, comprising:
an association device for associating the operation of the first optical member according to the signal corresponding to the shake to the operation of the second optical member according to the signal corresponding to the shake.

2. A device according to claim 1, wherein the association device includes means for substantially equalizing the operation of the first optical member according to the signal corresponding to the shake to the operation of the second optical member according to the signal corresponding to the shake.

3. A device according to claim 2, wherein the association device includes means for substantially coinciding an optical beam deflection by the first optical member with a light beam deflection by the second optical member.

4. A device according to claim 2, wherein the association device includes means for processing the signal corresponding to the shake so as to cause the first and second optical members to perform substantially a same operation.

5. A device according to claim 4, wherein the association device includes means for storing the processing of the signal.

6. A device according to claim 4, wherein the association device includes means for effecting predetermined processing to the signal corresponding to the shake and causing at least one of the first and second optical members to operate according to the processed signal in such a manner that the operation of one of the first and second optical members is substantially the same as the operation of the other of the first and second optical members.

7. A device according to claim 4, wherein the association device includes means for effecting a first processing to the signal corresponding to the signal to cause the first optical member to operate according to the processed signal, and for effecting a second processing different from the first processing to the signal corresponding to the signal to cause the second optical member to operate according to the signal processed by the second processing.

8. A device according to claim 2, wherein the association device includes means for substantially equalizing an operation of the first optical member according to an output signal from a detection device to an operation of the second optical member according to the same output signal.

9. A device according to claim 8, wherein the association device includes means for effecting processing to the output signal so as to cause the first and second optical members to perform substantially a same operation.

10. A device according to claim 2, wherein the optical apparatus has a drive device for driving the first and second optical members according to a drive signal formed on the basis of the signal corresponding to the shake, and the association device includes means for forming the drive signal for driving the first optical member according to a first signal forming characteristic and for forming the drive signal for driving the second optical member according to a second signal forming characteristic different from the first signal forming characteristic so as to equalize substantially the operations of the first and second optical members.

11. A device according to claim 2, wherein the association device includes means for correcting differences in the operations of the first and second optical members due to their individual differences so as to substantially equalize the operations of the first and second optical members.

12. A device according to claim 11, wherein the association device corrects signals used for operating the first and second optical members so as to correct the difference in the operations.

13. A device according to claim 1, wherein the first and second optical members include means for deflecting the light beam by inclination of the members.

14. A device according to claim 13, wherein the first and second optical members include a vertical-angle-variable prism.

15. A device according to claim 1, wherein the second optical member deflects a light beam parallel to a light beam to be deflected by the first optical member.

16. A device according to claim 15, wherein the optical apparatus is binoculars.

17. A device according to claim 1, wherein the first and second optical members operate in response to an output of a detection device for detecting the shake of the optical apparatus.

18. An optical apparatus, comprising:
 a first optical member operating according to a signal corresponding to a shake for deflecting a first light beam;
 a second optical member operating according to a signal corresponding to the shake for deflecting a second light beam different from the first light beam; and
 an association device for associating the operation of the first optical member according to the signal corresponding to the shake to the operation of the second optical member according to the signal corresponding to the shake.

19. An image shake preventing apparatus, comprising:
 a first optical member operating according to a signal corresponding to a shake for deflecting a first light beam;
 a second optical member operating according to a signal corresponding to the shake for deflecting a second light beam different from the first light beam; and
 an association device for associating the operation of the first optical member according to the signal corresponding to the shake to the operation of the second optical member according to the signal corresponding to the shake.

* * * * *

UNITED STATES PATENT AND TRADEMARK OFFICE
CERTIFICATE OF CORRECTION

PATENT NO. : 5,672,862
DATED       : September 30, 1997
INVENTOR(S) : Ohara et al.

It is certified that error appears in the above-identified patent and that said Letters Patent is hereby corrected as shown below:

Col. 12, line 60,   delete "round" and insert -- around --.
Col. 15, line 53,   delete "description.." and insert -- description. --.
Col. 18, line 36,   delete "engages" and insert -- engage --.
Col. 23, line 25,   delete "Spring" and insert -- spring --.
Col. 27, line 65,   delete "increases" and insert -- increase --.

Signed and Sealed this

Tenth Day of March, 1998

Attest:

BRUCE LEHMAN

Attesting Officer    Commissioner of Patents and Trademarks